United States Patent
Suzuki et al.

(10) Patent No.: US 8,245,003 B2
(45) Date of Patent: Aug. 14, 2012

(54) COMPOSITE MEMORY DEVICE, DATA PROCESSING METHOD AND DATA PROCESSING PROGRAM

(75) Inventors: Kazuya Suzuki, Kanagawa (JP);
Hajime Nishimura, Kanagawa (JP);
Tetsuya Tamura, Kanagawa (JP);
Takeshi Sasa, Miyagi (JP)

(73) Assignee: Sony Corporation (JP)

( * ) Notice: Subject to any disclaimer, the term of this patent is extended or adjusted under 35 U.S.C. 154(b) by 234 days.

(21) Appl. No.: 11/368,833

(22) Filed: Mar. 6, 2006

(65) Prior Publication Data
US 2006/0206681 A1    Sep. 14, 2006

(30) Foreign Application Priority Data

Mar. 8, 2005 (JP) ................................. 2005-064518
Jul. 25, 2005 (JP) ................................. 2005-215105

(51) Int. Cl.
*G06F 12/00* (2006.01)

(52) U.S. Cl. ............ 711/165; 711/5; 711/103; 711/112; 711/202; 711/207; 714/42

(58) Field of Classification Search .................. None
See application file for complete search history.

(56) References Cited

U.S. PATENT DOCUMENTS

| | | | |
|---|---|---|---|
| 5,930,828 A * | 7/1999 | Jensen et al. .................. | 711/170 |
| 6,185,654 B1 * | 2/2001 | Van Doren ......................... | 711/5 |
| 6,854,028 B2 * | 2/2005 | Smith ............................ | 710/100 |
| 7,103,713 B2 * | 9/2006 | Saika et al. .................... | 711/112 |
| 7,174,421 B2 * | 2/2007 | Ehrlich ......................... | 711/112 |
| 2003/0191889 A1 * | 10/2003 | Forrer, Jr. ..................... | 711/112 |
| 2004/0093474 A1 * | 5/2004 | Lin et al. ....................... | 711/162 |

FOREIGN PATENT DOCUMENTS

| | | |
|---|---|---|
| JP | 09297659 A | 11/1997 |
| JP | 2000-324435 A | 11/2000 |
| JP | 2002-150699 A | 5/2002 |
| JP | 2003-123379 A | 4/2003 |
| JP | 2003-125358 A | 4/2003 |
| JP | 2004005778 A | 1/2004 |
| JP | 2004164193 A | 6/2004 |
| JP | 2004173244 A | 6/2004 |

* cited by examiner

*Primary Examiner* — Kevin Ellis
*Assistant Examiner* — Alan Otto
(74) *Attorney, Agent, or Firm* — Lerner, David, Littenberg, Krumholz & Mentlik, LLP

(57) ABSTRACT

A composite memory device, a data processing method and a data processing program can efficiently and selectively use a nonvolatile solid-state memory and a recording medium. The composite medium device includes a nonvolatile solid-state memory and a recording medium and is adapted to combine the data area of the recording medium and the data area of the nonvolatile solid-state memory and manage them as totally or partly integrated data area by means of a predetermined file system. The composite memory device is connected to a host appliance by way of an interface section.

16 Claims, 41 Drawing Sheets

| FAT value (hexadecimal expression) | Meaning |
|---|---|
| 0000h | Corresponding cluster is on "free" status. |
| 00002h~FFF6h | Corresponding cluster is on "assigned" status. Corresponding value is continuing cluster number. |
| FFF7h | Indicates a "defective" cluster. |
| FFF8h~FFFFh | Corresponding cluster is on "assigned" status. Indicates end of file (EOF). |

FIG.3

| 8Bytes | 3Bytes | 1Bytes | 10Bytes | 2Bytes | 2Bytes | 2Bytes | 4Bytes |
|---|---|---|---|---|---|---|---|
| Name | Extension | Attributes | Reserved area | Recording time | Recording date | Leading cluster number | File length |

FIG.4

| bit | 7 | 6 | 5 | 4 | 3 | 2 | 1 | 0 |
|---|---|---|---|---|---|---|---|---|
| Command | Move command code ||||||||
| Features | EN | | | | | | COPY | DRF |
| Sector Count | Starting cluster address(0-7) ||||||||
| Sector Number | Starting cluster address(8-15) ||||||||
| Cylinder Low | Starting cluster address(16-23) ||||||||
| Cylinder High | Starting cluster address(24-31) ||||||||
| Device/Head | obs | na | obs | DEV | na ||||

EN: Automatically move temporarily saved data produced during recording to data area DA1.
　0:Disable
　1:Enable(Other bits are invalid).

COPY: Select data moving method.
　0: Move data (Move).
　1: Copy data (Copy).

DRF(Direction Flag): Data moving direction
　0: Move from data area DA2 to data area DA1.
　1: Move from data area DA1 to data area DA2.

Starting Cluster Address: Leading cluster number of file before move (invalid when EN = 1)

FIG.8

| bit | 7 | 6 | 5 | 4 | 3 | 2 | 1 | 0 |
|---|---|---|---|---|---|---|---|---|
| Status | | | | Status code | | | | |
| Error | | | | Error code | | | | |
| Sector Count | Starting cluster address(0-7) | | | | | | | |
| Sector Number | Starting cluster address(8-15) | | | | | | | |
| Cylinder Low | Starting cluster address(16-23) | | | | | | | |
| Cylinder High | Starting cluster address(24-31) | | | | | | | |
| Device/Head | obs | na | obs | DEV | na | | | |

FIG.9

Starting cluster address: Leading cluster number of file after move or at destination of copy

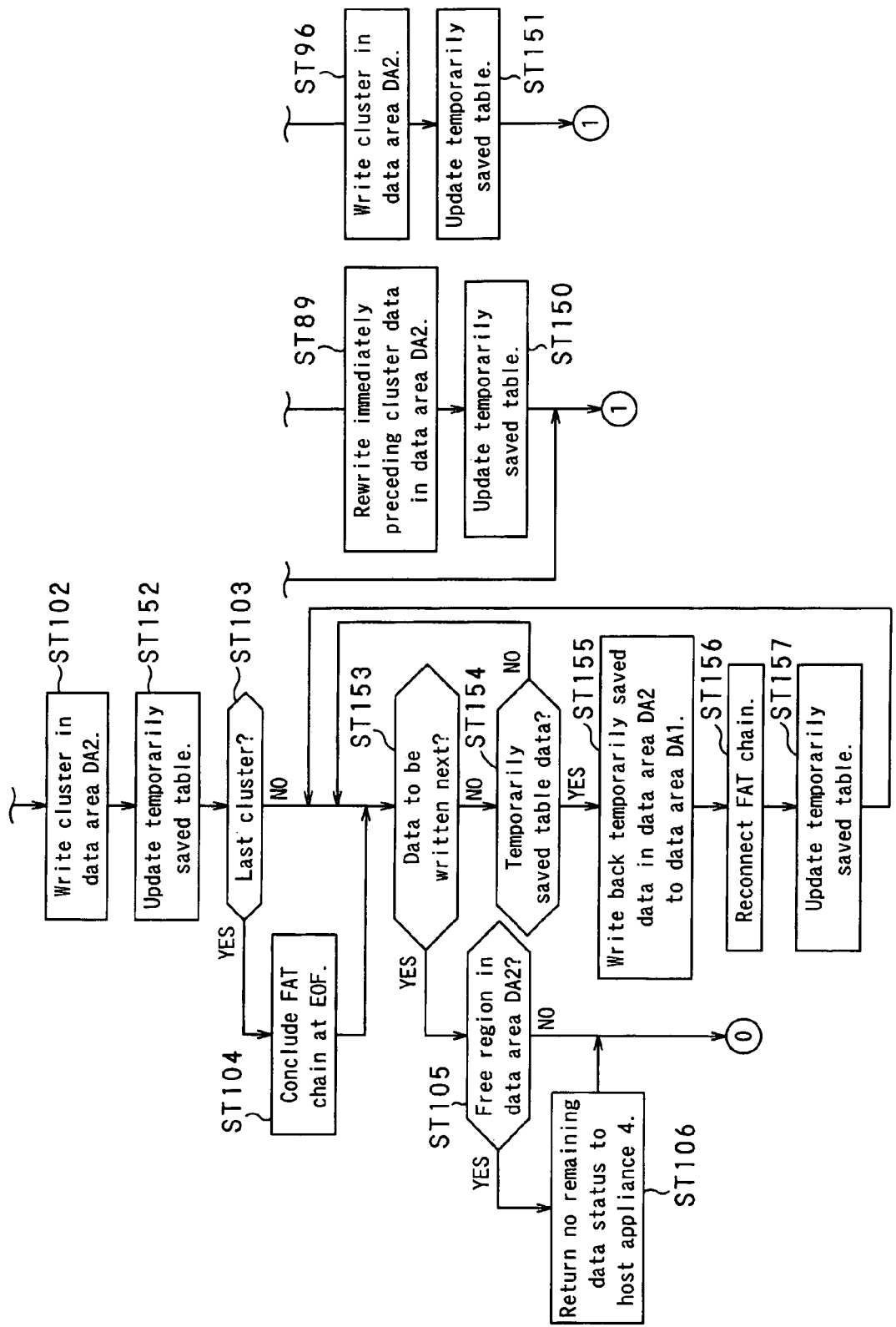

| Cluster before suspension of writing | Cluster of suspended writing | Replacement cluster |
|---|---|---|
| 01232h | 01233h | 20761h |
| 01233h | 01234h | 20762h |
| 01235h | 012346h | 20763h |
| 00000h | 00000h | 00000h |
| 00000h | 00000h | 00000h |
| 00000h | 00000h | 00000h |

FIG.35A

| Cluster before suspension of writing | Cluster of suspended writing | Replacement cluster |
|---|---|---|
| 01235h | 01236h | 20763h |
| 00000h | 00000h | 00000h |
| 00000h | 00000h | 00000h |
| 00000h | 00000h | 00000h |
| 00000h | 00000h | 00000h |
| 00000h | 00000h | 00000h |

FIG.35B

COMPOSITE MEMORY DEVICE, DATA PROCESSING METHOD AND DATA PROCESSING PROGRAM

CROSS REFERENCES TO RELATED APPLICATIONS

The present invention contains subject matter related to Japanese Patent Applications JP 2005-064518 and 2005-215105 filed in the Japanese Patent Office respectively on Mar. 8, 2005 and on Jul. 25, 2005, the entire contents of which being incorporated herein by reference.

BACKGROUND OF THE INVENTION

This invention relates to a composite memory device including a recording medium and a nonvolatile storage medium so that data may be written to and read out from it on the basis of a file system that is common to them and also to a data writing method and a data writing program for writing data to such a composite memory device.

Hard disc drives (to be referred to simply as HDDs hereinafter) are being popularly used as external storage devices for personal computers (PCs) and made to have larger memory capacities as a result of improvements on recording density. They have been finding and are being expected to find applications in the field of various consumer AV appliances including AV home servers and car AV appliances.

Additionally, the disc size of HDDs has been reduced and HDDs of a size as small as 1.8 inches or even 1 inch are expected to become widely available for mobile appliances such as digital still cameras (DSCs) and portable music players.

On the other hand, flash memories and other nonvolatile solid-state memories provide advantages including a low power consumption rate, a quick starting ability and a high impact-resistance and are being made to have larger capacities that are in excess of 1 GB. Thus, they can find various applications where the advantages can effectively be exploited.

Meanwhile, the requirements to be met by small storage devices that are applied to mobile appliances include low cost, a high storage capacity, a low power consumption rate and quick responsiveness.

However, HDDs require several seconds after the start of power supply to get to a ready state where data can be recorded to or reproduced from them. On the other hand, nonvolatile sold memory devices excel in quick responsiveness and become ready instantaneously after the start of power supply so that data can be recorded to or reproduced from them from the moment when power is supplied to the device.

Power is wasted when an HDD is held in an idle state (where it is ready for recording or reproducing data) to consequently reduce the efficiency of use of the power source in a mobile appliance whose power source has only a limited capacity. HDDs have an additional disadvantage that a replacing operation takes time to consequently give rise to a fall of the data transfer rate when a defective sector appears on a track.

Thus, so-called hybrid storage devices that are products of a harmonized combination of an HDD and a nonvolatile solid-state memory are expected to be developed so as to cover the disadvantages of HDDS with the advantages of nonvolatile solid-state memories. Inventors of the present invention have already proposed various hybrid storage devices that can be managed by a single file system to exploit their advantages (see, inter alia, Patent Document 1: Jpn. Pat. Appln. Laid-Open Publication No. 2003-123379, Patent Document 2: Jpn. Pat. Appln. Laid-Open Publication No. 2003-125358, Patent Document 3: Jpn. Pat. Appln. Laid-Open Publication No. 2002-150699 and Patent Document 4: Jpn. Pat. Appln. Laid-Open Publication No. 2000-324435).

In the past, the system data that are required when accessing the software and the data for controlling the HDD controller are stored in a predetermined area of the HDD and cannot be read out until the HDD comes into a ready state. In other words, the appliance containing the HDD cannot be used for a while after the start of power supply until the system data are read out from the HDD. In view of this problem, Patent Document 1 proposes a technique by means of which the system data are stored in the nonvolatile solid-state memory so that the appliance comes into a ready state the moment when power is supplied to the appliance.

As pointed out above, HDDs require several seconds after the start of power supply to get to a ready state where data can be recorded to or reproduced from them. In other words, data cannot be recorded to or reproduced from the HDD until it gets to a ready state. In view of this problem, Patent Document 2 proposes a technique by means of which data are written to the nonvolatile solid-state memory for a predetermined period of time from the start of operation and subsequently to the HDD since the time when the latter gets to a ready state in a data recording mode, whereas data are firstly read out from the nonvolatile solid-state memory and subsequently from the HDD since the time when the latter gets to a ready state in a data reading mode so that data can be recorded or reproduced from the moment when power is supplied to the appliance.

Patent Document 3 describes a technique for preventing a fall of the data transfer rate from taking place when a defective sector appears by using the nonvolatile solid-state memory as spare storage area.

When a video camera that is equipped with an HDD is inadvertently dropped or subjected to an impact while data are being recorded to the HDD, the power supply can be abruptly suspended to make the file system no longer operational for data registration. Then, it will be no longer possible to reproduce data from the HDD. Therefore, the file system needs to be periodically updated in a predetermined area of the HDD in order to prevent such a catastrophic situation from taking place. However the data recording rate of the HDD can be remarkably reduced by the arrangement for updating the file system. In view of this problem, Patent Document 4 describes a technique for assigning a storage area to be used for updating the file system to the nonvolatile solid-state memory so that data may be protected without reducing the transfer rate.

Thus, it is possible to provide a low cost high performance storage device by combining a small capacity nonvolatile solid-state memory and a large capacity HDD so as to utilize the nonvolatile solid-state memory as data storage area to be used only in a transitional state and the HDD as data storage area to be used in a steady state.

SUMMARY OF THE INVENTION

Meanwhile, when comparing a nonvolatile solid-state memory and an HDD from the viewpoint of reliability, the nonvolatile solid-state memory provides an operation assurance temperature range wider than the HDD. Additionally, the HDD is prone to be damaged by vibrations and impacts because it involves mechanical operations when accessing data.

Now, a memory card using a NAND flash memory (nonvolatile solid-state memory) and a 1 inch-1.8 inches HDD will be compared with each other for operation assurance ranges.

As for the operation assurance temperature range, it is between 0° C. and 70° C. for the memory card using a NAND flash memory and between 5° C. and 60° C. for the HDD. The assurance vibration limit in operation is 15 G (=147 m/s2) for the memory card using a NAND flash memory and 2 G (=19.6 m/s2) for the HDD. The permissible impact in operation is 3,000 G (29,400 m/s2) for the memory card using a NAND flash memory and 500 G (4,900 m/s2) for the HDD. Thus, the nonvolatile solid-state memory provides a wider permissible range relative to the HDD in terms of all the above listed parameters.

Thus, a highly efficient memory device can be realized by combining a nonvolatile solid-state memory and a large capacity HDD. More specifically, it will be possible to realize a low cost high reliability storage device when the nonvolatile solid-state memory is utilized as data storage area for storing data to be accessed frequently and to be used in a transient state while the HDD is utilized as recording area to be used in a steady state.

However, the capacity of the nonvolatile solid-state memory is by far smaller than that of the HDD due to the cost and the space-related restrictions. Therefore, it is vital for realizing such a memory device to effectively use the nonvolatile solid-state memory.

Additionally, if the memory area of the nonvolatile solid-state memory is frequently used to temporarily store video signals at the time of starting up the HDD and in a transient state, the available capacity of the nonvolatile solid-state memory that intrinsically has only a small storage capacity will become occupied very quickly. Similarly, it is an inefficient way of using such a memory device if the medium area of the nonvolatile solid-state memory is used to store a large number of files that are accessed only scarcely. Then, additional operations will be required to secure a free storage area by moving data.

There is also a demand for improved techniques for backing up management information for managing the data written to the HDD and the nonvolatile solid-state memory and important data.

In view of the above-identified circumstances, it is desirable to provide a highly reliable composite memory device, a data processing method and a data processing program that can efficiently and selectively use a nonvolatile solid-state memory and an HDD.

According to the present invention, there is provided a composite memory device including: a recording medium having a first data area with first addresses assigned to respective clusters of a predetermined size; a nonvolatile storage medium having a second data area with second addresses assigned to respective clusters of a predetermined size; an interface section to be connected to a host appliance; a retrieval means for retrieving the address of the leading cluster of the data to be moved or copied by referring to the directory area carrying the leading cluster address of the data written to the first data area or the second data area at the time of moving or copying data written to the first data area to the second data area or data written to the second data area to the first data area; a first notification means for notifying the host appliance of the address of the leading cluster retrieved by the retrieval means by way of the interface; a first reception means for receiving a first signal ordering to move or copy data from the first data area to the second data area or a second signal ordering to move or copy data from the second data area to the first data area through the interface section from the host appliance in response to the notification by the first notification means; a read means for reading the cluster chain of the address of the leading cluster of the data to be moved or copied from an identification information table constituted by logic addresses for managing the first address and the second address and carrying predetermined identification information for each of the logic addresses upon receiving the first signal or the second signal by the first reception means; a free area detection means for detecting a free area from the second data area at the time of moving or copying data from the first data area to the second data area and from the first data area at the time of moving or copying data from the second data area to the first data area; a moving/copying means for moving or copying the data to be moved or copied to the free area detected by the free area detection means; an updating means for updating the cluster chain read from the identification information table by the read means so as to carry the address of the site of move or copying at the time of move or copying of data by the moving/copying means; a second notification means for notifying the host appliance of the changed address of the leading cluster by way of the interface section at the time of completion of updating the cluster chain by the updating means; a second reception means for receiving a signal ordering to change the address of the leading cluster from the host appliance by way of the interface section in response to the notification by the second notification means; and a changing means for changing the address of the leading cluster in the directory area to the address of the leading cluster of the data moved or copied by the moving/copying means at the time of receiving a signal ordering to change the address of the leading cluster by the second reception means from the host appliance.

According to the present invention, there is provided a data processing method of a composite memory device having a recording medium having a first data area with first addresses assigned to respective clusters of a predetermined size, a nonvolatile storage medium having a second data area with second addresses assigned to respective clusters of a predetermined size and an interface section to be connected to a host appliance, the method including: a retrieval step of retrieving the address of the leading cluster of the data to be moved or copied by referring to the directory area carrying the leading cluster address of the data written to the first data area or the second data area at the time of moving or copying data written to the first data area to the second area or data written to the second data area to the first data area; a first notification step of notifying the host appliance of the address of the leading cluster retrieved in the retrieval step by way of the interface section; a first reception step of receiving a first signal ordering to move or copy data from the first data area to the second data area or a second signal ordering to move or copy data from the second data area to the first data area through the interface section from the host appliance in response to the notification in the first notification step; a read step of reading the cluster chain of the address of the leading cluster of the data to be moved or copied from an identification information table constituted by logic addresses for managing the first address and the second address and carrying predetermined identification information for each of the logic addresses upon receiving the first signal or the second signal in the first reception step; a free area detection step of detecting a free area from the second data area at the time of moving or copying data from the first data area to the second data area and from the first data area at the time of moving or copying data from the second data area to the first data area; a moving/copying step of moving or copying the data to be moved or copied to the free area detected in the free area detection step; an updating step of updating the cluster chain read from the identification information table in the read step so as to carry the address of the site of move or copying at the time of move or copying of data in the moving/copying step; a second notification step of notifying the host appliance of the changed address of the leading cluster by way of the interface section at the time of completion of updating the cluster chain in the updating step; a second reception step of receiving a signal ordering to change the address of the leading cluster from the host appliance by way of the interface section in response to the notification in the second notification step; and a changing step of changing the address of the leading cluster in the directory area to the address of the leading cluster of the data moved or copied in the moving/copying step at the time of receiving a signal ordering to change the address of the leading cluster in the second reception step from the host appliance.

According to the present invention, there is provided a data processing program for causing a computer to execute a data processing operation for a composite memory device having a recording medium having a first data area with first addresses assigned to respective clusters of a predetermined size, a nonvolatile storage medium having a second data area with second addresses assigned to respective clusters of a predetermined size and an interface section to be connected to a host appliance, the program including: a retrieval step of retrieving the address of the leading cluster of the data to be moved or copied by referring to the directory area carrying the leading cluster address of the data written to the first data area or the second data area at the time of moving or copying data written to the first data area to the second area or data written to the second data area to the first data area; a first notification step of notifying the host appliance of the address of the leading cluster retrieved in the retrieval step by way of the interface section; a first reception step of receiving a first signal ordering to move or copy data from the first data area to the second data area or a second signal ordering to move or copy data from the second data area to the first data area through the interface section from the host appliance in response to the notification in the first notification step; a read step of reading the cluster chain of the address of the leading cluster of the data to be moved or copied from an identification information table constituted by logic addresses for managing the first address and the second address and carrying predetermined identification information for each of the logic addresses upon receiving the first signal or the second signal in the first reception step; a free area detection step of detecting a free area from the second data area at the time of moving or copying data from the first data area to the second data area and from the first data area at the time of moving or copying data from the second data area to the first data area; a moving/copying step of moving or copying the data to be moved or copied to the free area detected in the free area detection step; an updating step of updating the cluster chain read from the identification information table in the read step so as to carry the address of the site of move or copying at the time of move or copying of data in the moving/copying step; a second notification step of notifying the host appliance of the changed address of the leading cluster by way of the interface section at the time of completion of updating the cluster chain in the updating step; a second reception step of receiving a signal ordering to change the address of the leading cluster from the host appliance by way of the interface section in response to the notification in the second notification step; and a changing step of changing the address of the leading cluster in the directory area to the address of the leading cluster of the data moved or copied in the moving/copying step at the time of receiving a signal ordering to change the address of the leading cluster in the second reception step from the host appliance.

Thus, a composite memory device according to the invention includes a nonvolatile solid-state memory and a recording medium and the data area of the nonvolatile solid-state memory and that of the recording medium are partly or totally integrally combined so that the data recorded in the nonvolatile solid-state memory can be partly or totally moved to the recording medium without transferring the data between the composite memory device and a host appliance and the file allocation table (FAT) can be reconstructed according to the configuration of the moved cluster, while the data recorded in the recording medium can be partly moved to the nonvolatile solid-state memory without transferring the data between the recording medium and the host appliance and the file allocation table can be reconstructed according to the configuration of the moved cluster. Additionally, the data recorded in the nonvolatile solid-state memory can be partly or totally copied to the recording medium without transferring the data between the composite memory device and a host appliance and the file allocation table can be reconstructed according to the configuration of the copied cluster, while the data recorded in the recording medium can be partly copied to the nonvolatile solid-state memory without transferring the data between the recording medium and the host appliance and the file allocation table can be reconstructed according to the configuration of the copied cluster.

Additionally, according to the invention, it is possible to automatically move the saved data temporarily written to the nonvolatile solid-state memory to the proper data region where the saved data are to be written without transferring the data between the composite memory device and a host appliance and reconstruct the file allocation table according to the configuration of the moved cluster.

Still additionally, according to the invention, it is possible to construct a highly reliable hybrid storage system that is equipped with a sensor for detecting impacts and vibrations and adapted to switch data from a nonvolatile solid-state memory to a recording medium or vice versa depending on the outcome of the detecting operation of the sensor so that a free region can be automatically secured in the nonvolatile solid-state memory by automatically writing back the saved data to the data region of the recording medium if the nonvolatile solid-state memory has only a small recording capacity.

BRIEF DESCRIPTION OF THE DRAWINGS

FIG. 3 is a schematic illustration of the meaning of each piece of identification information;

FIG. 4 is a schematic illustration of a directory area;

FIG. 8 is a schematic illustration of a command that can be used for the purpose of the present invention when ordering to move or copy data;

FIG. 9 is a schematic illustration of a command that can be used for the purpose of the present invention when notifying the address of the leading cluster at the site of a move or a copy;

FIG. 34 is a flowchart of the process of automatically moving the data recorded in a nonvolatile solid-state memory to a recording medium when related data are recorded over both the data area of the recording medium and that of the nonvolatile solid-state memory;

FIGS. 35A and 35B are schematic illustrations of a temporarily saved cluster tables;

DETAILED DESCRIPTION

The present invention relates to a composite memory device including a hard disc drive (HDD) carrying a disc-shaped recording medium and a nonvolatile storage medium such as flash memory and adapted to handle the data area of the HDD and that of the nonvolatile storage medium as partly or totally integrally combined data area on the basis of a predetermined file system. In the following description, it is assumed that an "MS-DOS compatible FAT file system is adopted as the file system of the composite memory device.

Figure 1:
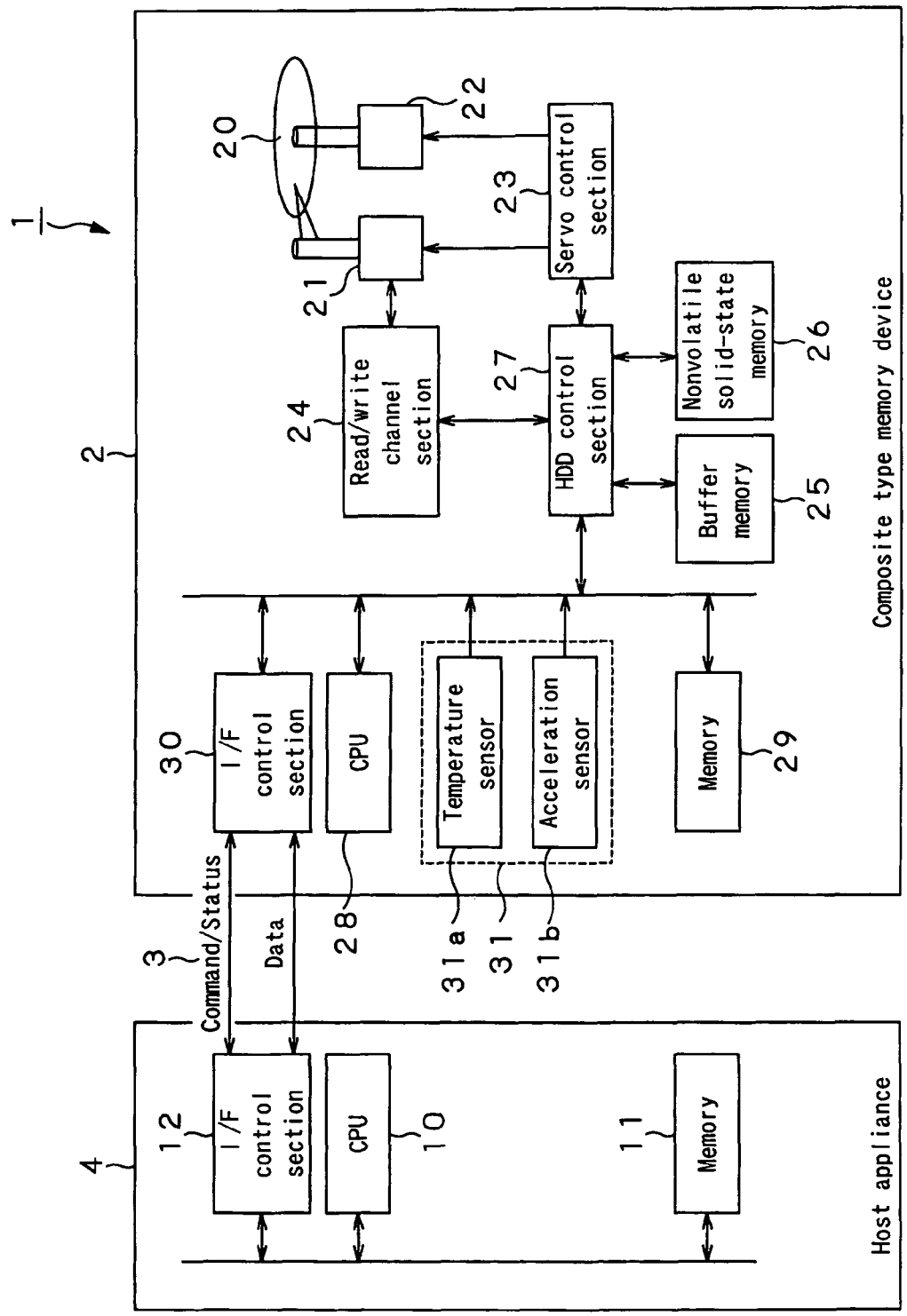
FIG. 1 is a schematic block diagram of a data access system that can be realized by using a composite memory device according to the present invention, illustrating the configuration thereof.

FIG. 1 illustrates a data access system 1 including a composite memory device (hybrid hard disc drive) 2 that is compositely formed by a recording medium and a nonvolatile storage medium and connected to a host appliance 4 by way of an interface section 3 conforming to an appropriate standard such as IDE, SCSI, FC or USB.

The host appliance 4 includes a CPU 10 adapted to perform predetermined processing operations, a memory 11 to be used for the processing operations of the CPU 10 and an interface control section 12 to be used for exchanging data and control information with the component type memory device.

The host appliance 4 is specifically an application appliance such as a video camera, a digital camera or a music player that is adapted to efficiently execute recording/reproduction processes, exploiting the advantages of the composite memory device 2. It typically issues an "identify device command" (ATA Standard) to the composite memory device 2 connected to it and acquires parameter information relating to the composite memory device 2 so that it can easily recognize that the composite memory device 2 is a device compositely formed by a recording medium and a nonvolatile solid-state memory 26. Alternatively, the host appliance 4 may be a personal computer or the like that is adapted to record/reproduce data on the basis of a file system incorporated in it.

As shown in FIG. 1, the composite memory device 2 includes a head section 21 that writes data to and reads data from the recording medium 20, a drive section 22 that drives the recording medium 20 to rotate in a predetermined sense at a predetermined number of revolutions per unit time, a servo control section 23 that controls the head section 21 and the drive section 22, a read/write channel section 24 that is connected to the head section 21 and executes a predetermined process on the data supplied to it, a buffer memory 25 that temporarily buffers data, a nonvolatile solid-state memory 26 that stores data, an HDD control section 27 that controls the servo control section 23 and the read/write channel section 24, a processor/controller (CPU) 28 that performs predetermined processing operations and selects commands and parameters for the servo control section 23, the read/write channel section 24 and so on necessary for operating them, a memory 29 to be used by the CPU 28 for processing operations, an interface control section 30 that exchanges data and control information with the host appliance 4 and a sensor 31 that detects environmental information.

Figure 2:
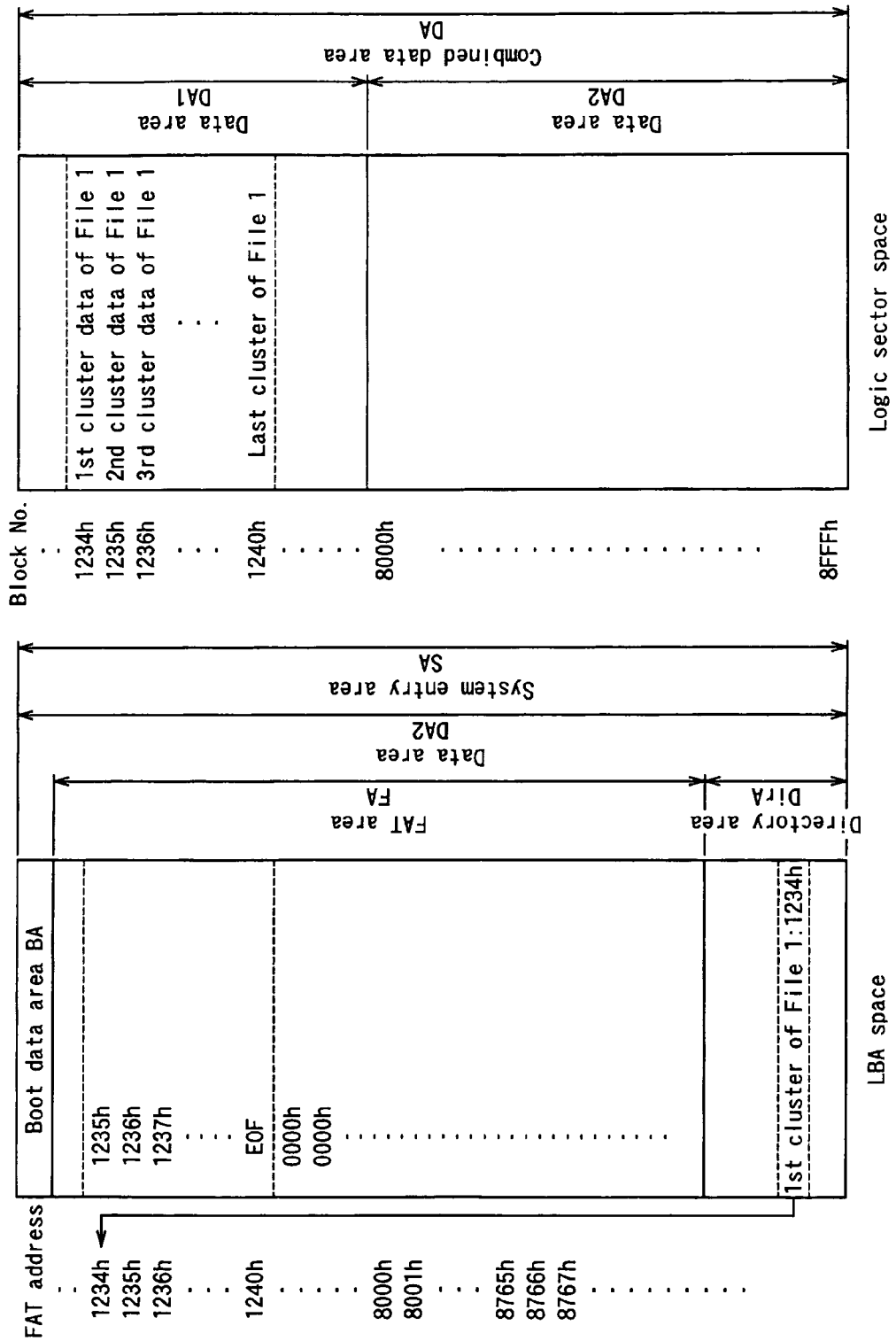
FIG. 2 is a schematic illustration of an LBA space and a logic sector space when the recording medium and the nonvolatile solid-state memory of a composite memory device according to the invention are managed by means of a predetermined file format.

Now, the relationship between the recording medium 20 and the nonvolatile solid-state memory 26 will be described by referring to FIG. 2. FIG. 2 is a schematic illustration of an LBA (logic block address) space and a logic sector space.

The recording medium 20 is managed by a FAT (file allocation table) file system, which will be described in greater detail hereinafter and formed by a disc-shaped recording medium such as HD (hard disc) having at least a data area DA1, where addresses (to be referred to as physical addresses hereinafter) are applied to respective clusters of a predetermined data size.

On the other hand, the nonvolatile solid-state memory 26 is a NAND type flash memory card (memory stick, compact flash, SD card or the like) for which a FAT file system is adopted and includes a data area DA2, where addresses (to be referred to as memory addresses hereinafter) are applied in series from the leading address of the data area DA1 of the recording medium 20 to respective clusters of a predetermined data size and a system entry area SA for storing system information. The system entry area SA by turn includes boot data area BA for storing boot information, a FAT area FA for storing identification information table (FAT) where predetermined identification information is written for each predetermined address (to be referred to as logic address hereinafter) and a directory area DirA for storing directory information.

According to the present invention, the data area DA1 of the recording medium 20 and the data area DA2 of the nonvolatile solid-state memory 26 are combined by a FAT file system and managed as a partly or totally integrally combined data area (to be referred to as combined data area DA hereinafter).

A FAT file system will be described here. A FAT is a table where link information of clusters is described when a file is divided into a plurality of clusters and recorded. It is a table adopted for the formatting system for managing the host appliance 4. Formatting is an operation of partitioning a data storage area into areas of a predetermined size and assigning numbers (physical addresses) to those areas. It includes so-called physical formatting of dividing the track formed on the recording medium 20 into areas that are referred to as sectors and logical formatting of combining a plurality of sectors into a unit that is referred to as cluster and forming a system entry area SA, a data area DA1 and another data area DA2.

A sector is the smallest unit to be used in the recording medium 20 for storing data (of normally 512 bytes). For the purpose of the present invention, a sector is also the smallest unit. The host appliance 4 accesses the recording medium 20 by means of a logical block address (LBA) In a FAT file system for managing files, a plurality of (N) sectors is combined to a cluster, which is used as the smallest unit for reading/writing data.

The system entry area SA produced by formatting includes a boot data area BA, a FAT area FA where a FAT is written and a directory area DirA. The boot data area BA is a sector with LBA "0000" as viewed from the host appliance 4, where a bootstrap code and a partition table are recorded.

As shown in FIG. 3, predetermined information such as free space information on the data areas is shown in the FAT as identification information. For example, identification information "0000h" indicates that the corresponding cluster is in an "idle" state and identification information "0002h through FFF6h" indicates that the corresponding clusters are in an "assigned" state and the corresponding numerical values are the cluster numbers to be continued. Identification number "FFF7h" indicates that the corresponding cluster is a "defective cluster", whereas identification numbers "FFF8h through FFFFh" indicate that the corresponding clusters are end of file (EOF) or in an "assigned" state.

The data area includes a directory area to be used for managing file information and a data area where data are actually written. As shown in FIG. 4, the directory area is used to store information on each directory (each file) including the file name, the extension, the attributes, a reserved area (RES), recording time, recording date, the number (address) of the leading (starting) cluster and the file size (file length) of the file.

According to the present invention, the system entry area SA that is read out first after the start of power supply to the composite memory device 2 is arranged not in the recording medium 20 that requires a predetermined time period after the start of power supply to get to a ready state where data can be accessed but in the nonvolatile solid-state memory 26 that instantaneously gets to a ready state where data can be accessed. Therefore, the recording medium 20 has a data area DA1 that is partitioned into areas of a predetermined size, to which respective physical addresses are assigned, whereas the nonvolatile solid-state memory 26 has a data area DA2 that is also partitioned into areas of a predetermined size, to which respective memory addresses are assigned, and a system entry area SA that includes a FAT formed by arranging logical addresses that correspond to the physical addresses of the data area DA1 and the memory addresses of the data area DA2.

Because of the above-described arrangement, as soon as the composite memory device 2 is connected to the host appliance 4 and power is supplied to the device 2, it is possible to read out data from the system entry area SA.

The servo control section 23 controls the drive section 22 so as to drive the recording medium 20 to rotate in a predetermined sense at a predetermined number of revolutions per unit time and also controls the head section 21 so as to make it access a predetermined spot on the recording medium 20.

At the time of a data writing operation, the read/write channel section 24 encodes (modulates) the supplied data, transforms them into a series of digital bits adapted to the recording/reproduction system and subsequently supplies the transformed data to the head section 21. At the time of a data reading operation, the read/write channel section 24 removes high frequency noises from the reproduced signals supplied from the head section 21, subsequently digitizes them by means of an analog/digital converter (ADC), executes a predetermined process on them typically by means of a maximum likelihood decoding method and demodulates them.

At the time of a data writing operation, the buffer memory 25 temporarily buffers the data supplied from the host appliance 4 under the control of the HDD control section 27 and, when the quantity of the data accumulated there gets to a predetermined level, the data are read out and supplied to the read/write channel section 24. At the time of a data reading operation, the buffer memory 25 temporarily buffers the data supplied from the read/write channel section 24 under the control of the HDD control section 27 and, when the quantity of the data accumulated there gets to a predetermined level, the data are read out and supplied to the host appliance 4 by way of the interface control section 30. Additionally, at the time of a data writing operation or a data reading operation, the buffer memory 25 temporarily buffers data in order to reduce the degradation, if any, of the performance that can occur due to a difference of transfer rate.

The HDD control section 27 manages the operation of data transmission/reception between the buffer memory 25 and the read/write channel section 23 by means of a FAT file system, which will be described in greater detail hereinafter, and executes processes relating to data formatting. When executing a process relating to data formatting, the HDD control section 27 also executes an encoding process, using error correction codes, and a process relating to error detection and error correction.

The sensor 31 includes a temperature sensor 31a for observing the internal temperature of the composite memory device 2 and an acceleration sensor 31b for detecting the acceleration or the change in the speed that the composite memory device 2 is subjected to. When the observed internal temperature is found below and above a predetermined temperature range, the temperature sensor 31a generates a signal S1 telling that the internal temperature has gone out of the predetermined range and supplies the signal it generates to the HDD control section 27. When the signal S1 is supplied from the temperature sensor 31a while data are being written to the recording medium 20, the HDD control section 27 suspends the data writing operation and controls the operation so as to write the cluster of data that is being written to the recording medium 20 to the nonvolatile solid-state memory 26.

When the internal temperature gets back to the predetermined range, the temperature sensor 31a generates a signal S2 telling that the internal temperature has returned to the predetermined range and supplies the signal S2 it generates to the HDD control section 27. When the signal S2 is supplied from the temperature sensor 31a, the HDD control section 27 terminates the operation of writing data to the nonvolatile solid-state memory 26 and controls the operation so as to write the cluster of data that is written to the nonvolatile solid-state memory 26 to the recording medium 20.

The acceleration sensor 31b detects the acceleration or the change in the speed that the composite memory device 2 is subjected to and computationally determines the degree of impact from the acceleration or the change in the speed. If the computationally determined degree of impact is found out of a predetermined range, it generates a signal S3 telling that the degree of impact is found out of the predetermined range and supplies the signal S3 it generates to the HDD control section 27. When the signal S3 is supplied from the acceleration sensor 31b while data are being written to the recording medium 20, the HDD control section 27 suspends the data writing operation and controls the operation so as to write the cluster of data that is being written to the recording medium 20 to the nonvolatile solid-state memory 26.

When the degree of impact gets back to the predetermined range, the acceleration sensor 31b generates a signal S4 telling that the degree of impact has returned to the predetermined range and supplies the signal S4 it generates to the HDD control section 27. When the signal S4 is supplied from the acceleration sensor 31b, the HDD control section 27 terminates the operation of writing data to the nonvolatile solid-state memory 26 and controls the operation so as to write the cluster of data that is written to the nonvolatile solid-state memory 26 to the recording medium 20.

Additionally, the acceleration sensor 31b detects the acceleration and the frequency that the composite memory device 2 is subjected to and computationally determines the degree of vibration from the acceleration and the frequency it detects. If the computationally determined degree of vibration is found out of a predetermined range, it generates a signal S5 telling that the degree of vibration is found out of the predetermined range and supplies the signal S5 it generates to the HDD control section 27. When the signal S5 is supplied from the acceleration sensor 31b while data are being written to the recording medium 20, the HDD control section 27 suspends the data writing operation and controls the operation so as to write the cluster of data that is being written to the recording medium 20 to the nonvolatile solid-state memory 26.

When the degree of vibration gets back to the predetermined range, the acceleration sensor 31b generates a signal S6 telling that the degree of vibration has returned to the predetermined range and supplies the signal S6 it generates to the HDD control section 27. When the signal S6 is supplied from the acceleration sensor 31b, the HDD control section 27 terminates the operation of writing data to the nonvolatile solid-state memory 26 and controls the operation so as to write the cluster of data that is written to the nonvolatile solid-state memory 26 to the recording medium 20.

The sensor 31 may additionally includes a falling speed detection sensor for detecting the falling speed of the composite memory device 2. When the falling speed detection sensor detects a falling speed of the composite memory device 2 that continues for more than a predetermined time period, it generates a signal S7 telling that the falling speed of the composite memory device is found to be continuing for more than a predetermined time period and supplies the signal S7 it generates to the HDD control section 27. When the signal S7 is supplied from the falling speed detection sensor while data are being written to the recording medium 20, the HDD control section 27 suspends the data writing operation and controls the operation so as to write the cluster of data that is being written to the recording medium 20 to the nonvolatile solid-state memory 26.

Now, as an example, the operation of the composite memory device 2 that is conducted when the host appliance 4 of the data access system 1 is a PC and the composite memory device 2 is used as an ordinary HDD will be described below by referring to FIG. 3. Note, however, unlike an ordinary HDD, the composite memory device 2 includes a nonvolatile solid-state memory 26.

When the host appliance 4 is started by way of a predetermined starting sequence, it reads out the information (to be referred to as directory information hereinafter) and the FAT written in the directory area of the system entry area SA of the nonvolatile solid-state memory 26 of the composite memory device 2 and unfolds the directory information and the FAT it reads out in the memory 11. Additionally, each time the host appliance 4 prepares, erases or modifies a file, it updates or alters the directory information and the FAT in the inside of the memory 11 and, at the same time, reflects the updated or altered contents to the system entry area SA of the nonvolatile solid-state memory 26 of the composite memory device 2.

Additionally, in this embodiment, a system entry area SA including a FAT area FA for storing a FAT and a directory area DirA for storing directory information is formed in the nonvolatile solid-state memory 26, the remaining area of the nonvolatile solid-state memory 26 being a combined data area DA that includes a data area DA2.

In this embodiment, the FAT integrally handles the combined data area DA that includes the data area DA1 of the recording medium 20 and the data area DA2 of the nonvolatile solid-state memory 26. Thus, addresses 0000h through 7FFFh are allocated as logic addresses that correspond to the data area DA1 and addresses 8000h through 8FFFh are allocated as logic addresses that correspond to the data area DA2. Therefore, in a data writing operation that is conducted according to the FAT, data are written to the data area DA2 only when all the data area DA1 has been assigned to data. As will be described hereinafter, in the combined data area DA that includes the data area DA1 of the recording medium 20 and the data area DA2 of the nonvolatile solid-state memory 26, part of the data area DA1 and part of the data area DA2 may be overlapping each other from the viewpoint of LBA.

If the capacity of each sector produced by formatting is 512 bytes and a cluster is formed by using 64 sectors, the capacity of a cluster is 64×512 B□32 KB.

Since the data capacity of the data area DA1 of the recording medium 20 corresponds to 32,767 (7FFF) clusters, it is 32 KB×32,767□1 GB.

On the other hand, since the data capacity of the data area DA2 of the nonvolatile solid-state memory 26 corresponds to 4,096 clusters, it is 32 KB×4,096□128 MB.

Figure 5:
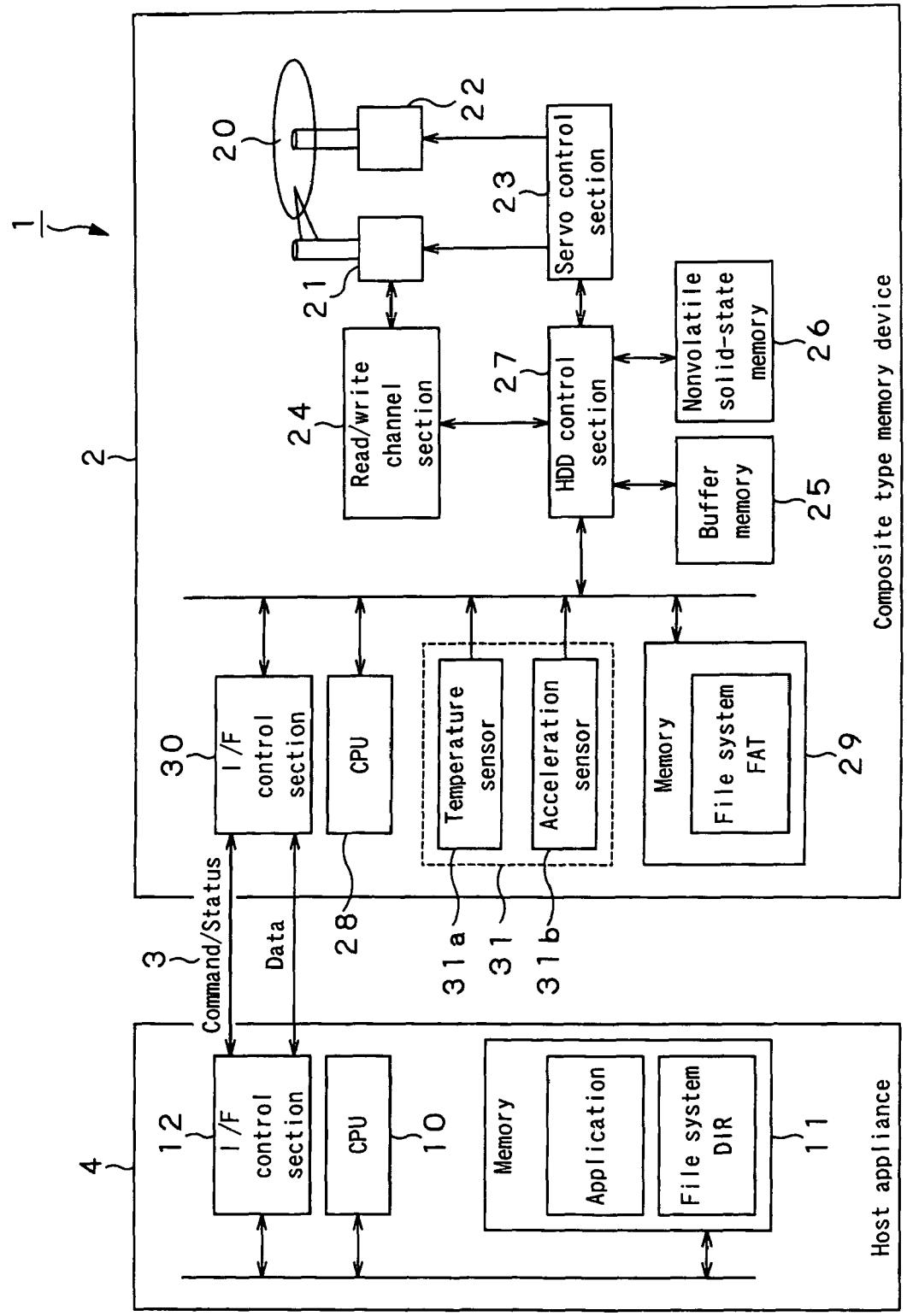
FIG. 5 is a schematic illustration of a data access system realized by a composite memory device according to the invention and a host appliance, wherein the directory information stored in the directory area is managed by the host appliance and the FAT (file allocation table) of the file system is managed by the composite memory device.

As shown in FIG. 5, when the data access system 1 is started, it reads out the directory information from the directory area DirA of the nonvolatile solid-state memory 26 and unfolds the directory information it reads out in the memory 11 of the host appliance 4, while it also reads out the FAT from the FAT area FA and unfolds the FAT in the memory 29. As a result of doing this, the host appliance 4 possesses the decision making power for the directory, whereas the composite memory device 2 possesses the decision making power for the FAT. Thus, the composite memory device 2 determines the available free area (free clusters) in the combined data area DA and also the FAT chain (link information of clusters that constitute a file) by itself. On the other hand, the host appliance 4 only specifies the starting point of the FAT chain (the leading cluster number) and the composite memory device 2 specifies all the subsequent free clusters by itself.

EXAMPLE 1

The (Move) Process of Moving Data from the Data Area DA2 to Data Area DA1

Figure 6:
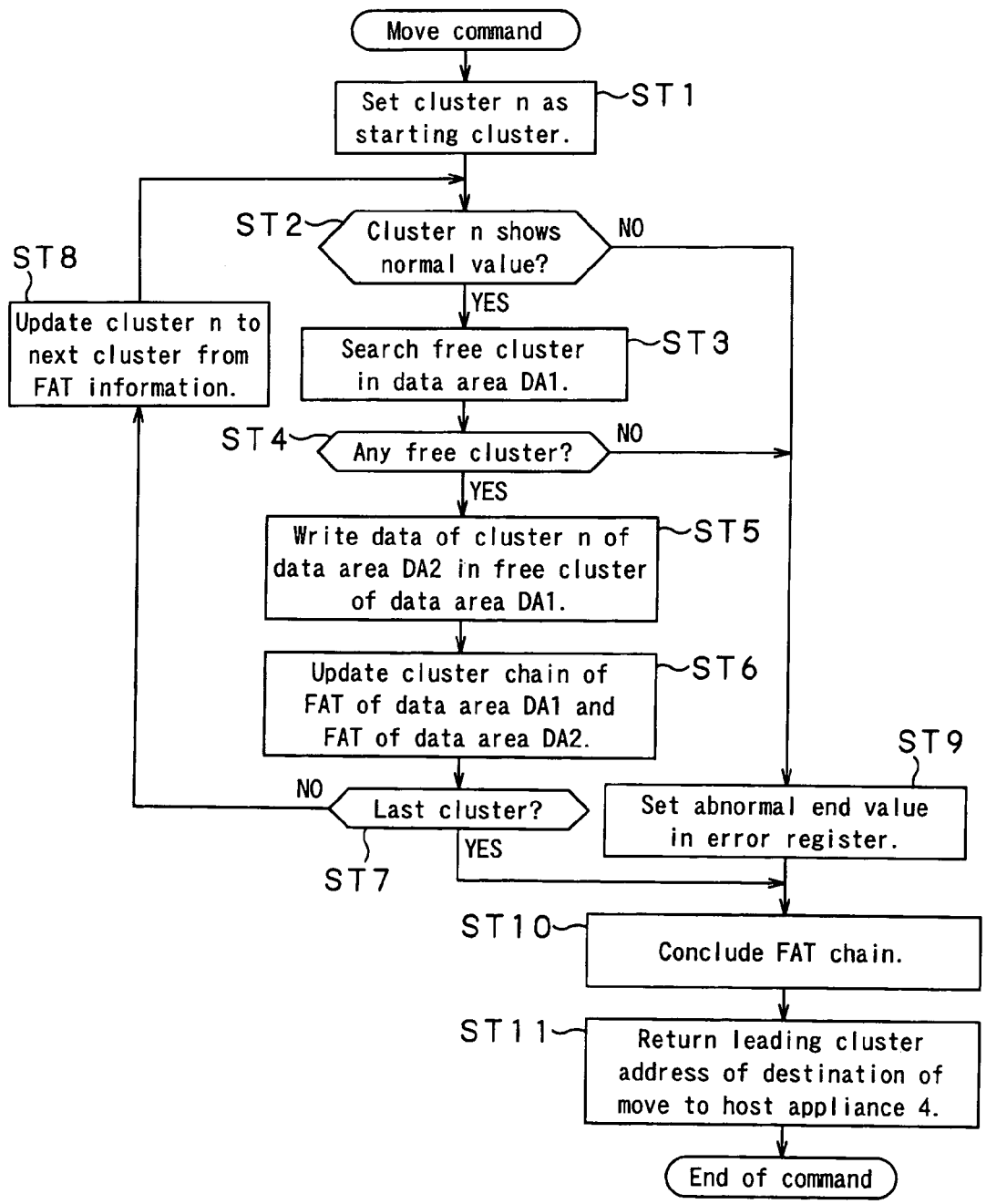
FIG. 6 is a flowchart of the operation of moving data recorded in the data area of the nonvolatile solid-state memory to the data area of the recording medium (move process), illustrating the sequence of operation.
Figure 7:
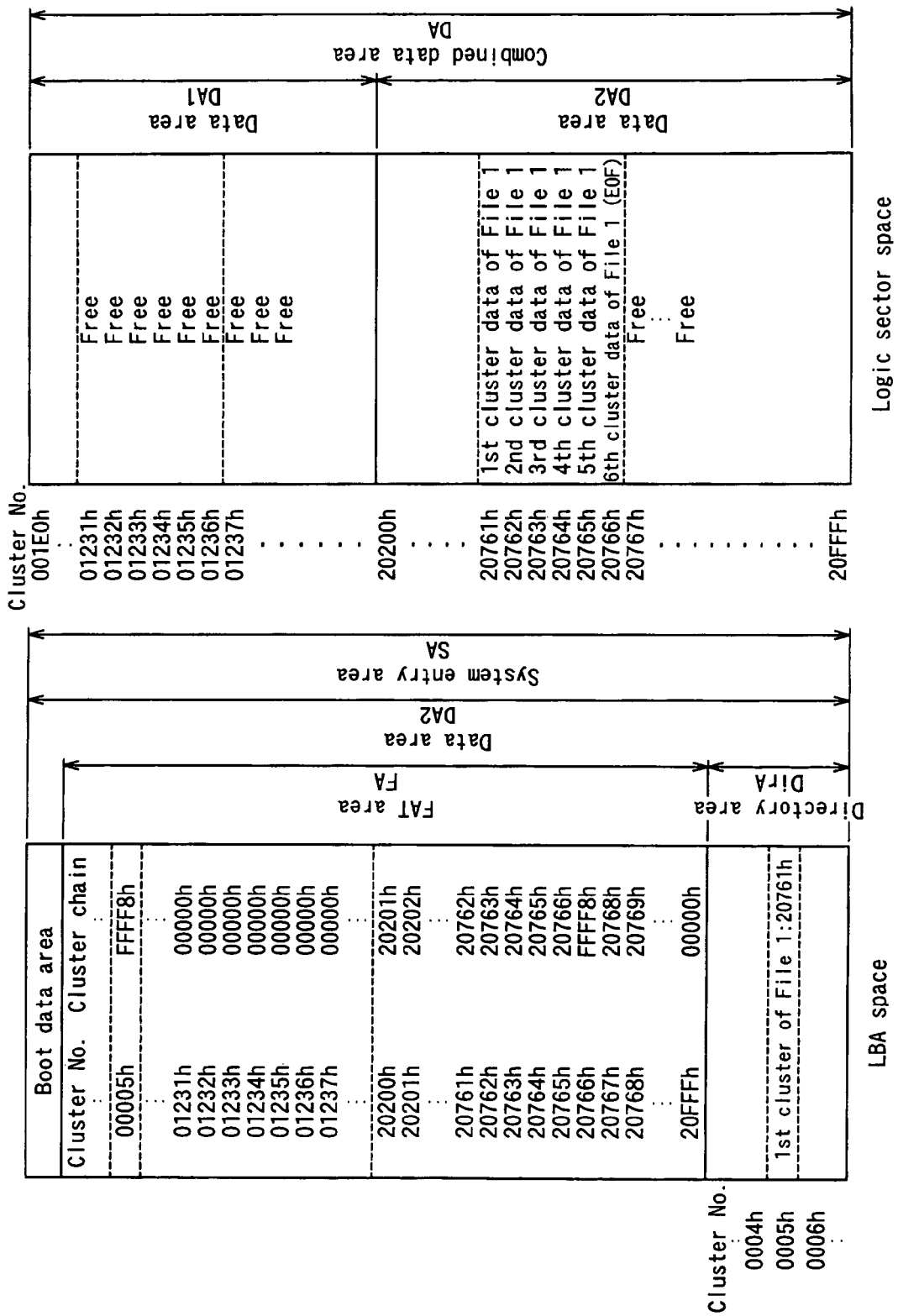
FIG. 7 is a schematic illustration of a file that can be used for the purpose of the present invention before a move process of moving data from the nonvolatile solid-state memory to the recording medium.

Now, the sequence of the process of moving the data file (File 1) recorded in the data area DA2 of the nonvolatile solid-state memory 26 of the composite memory device 2 to the data area DA1 of the recording medium 20 (move process) when File 1 is a file that is accessed scarcely will be described below by referring to the flowchart of FIG. 6. More specifically, it is assumed here that File 1 that is written to "20761h-20766h" of data area DA2 is moved to the free area "01231h-01236h" of the data area DA1 by using the LBA (logical block address) space and the logic sector space as shown in FIG. 7. Note that FIG. 7 illustrates the state of the file before the move process.

The host appliance 4 issues a command to the composite memory device 2, asking to notify it of the leading cluster address of File 1. In response to the command issued from the host appliance 4, the composite memory device 2 transmits the leading cluster address "20761h" of File 1 from the directory area DirA. Then, the host appliance 4 issues a command for moving File 1 from the data area DA2 to the data area DA1 on the basis of the leading cluster address it receives (FIG. 8). FIG. 8 shows "EN" under the item of Feature, which means that the temporarily saved data that are written to the data area DA2 are moved to the data area DA1 due to a cause that arises during a data writing operation ("0" indicates "disable", whereas "1" indicates "enable"), the data moving method under the item of Copy ("0" indicates moving data, whereas "1" indicates copying data) and the data moving direction under the item of "DRF (direction flag)" ("0" indicates moving data written in the data area DA2 to the data area DA1, whereas "1" indicates moving data written in the data area DA1 to the data area DA2).

Referring back to FIG. 6, in Step ST1, the composite memory device 2 sets the leading cluster address of the file to be moved in the register as argument of the command issued from the host appliance 4. In this example, "20761h" is set as the leading cluster address.

Then, in Step ST2, the composite memory device 2 determines if the set cluster address shows a normal value or not. Upon receiving the command, the composite memory device 2 reads out the cluster chain of the leading cluster address "20761h" of File 1 to be moved from the FAT area FA and stores it in the memory 29. Then, it determines if the set cluster address shows a normal value or not by referring to the cluster chain. The composite memory device 2 proceeds to Step ST3 when the set cluster address shows a normal value, whereas it proceeds to Step ST9 when the set cluster address shows a value other than a normal value.

In Step ST3, the composite memory device 2 retrieves a free cluster from the cluster region "001E0h-201FFh" of the data area DA1.

In Step ST4, the composite memory device 2 determines if any free cluster is detected as a result of the retrieval operation in Step ST3 or not. The composite memory device 2 proceeds to Step ST5 when it is determined that a free cluster is detected, whereas it proceeds to Step ST10 when it is determined that no cluster is detected. It is assumed in the following that the cluster "01231h" is retrieved as free cluster.

In Step ST5, the composite memory device 2 reads out the corresponding data from the data area DA2 on the basis of the cluster address set in Step ST1 or Step ST8 and writes the data it reads out to the free cluster detected in Step ST4. For example, the composite memory device 2 reads out the first cluster data of File 1 and moves them to "01231h" on the basis of "20761h".

In Step ST6, the composite memory device 2 updates the cluster chain stored in the memory 29 and rewrites the FAT information. For example, it may write identification information indicating the free cluster in the cluster chain that corresponds to the origin of the move "20761h" and identification information indicating an assigned status in the cluster chain that corresponds to the destination of the move "01231h".

In Step ST7, the composite memory device 2 determines if the data moved in Step ST5 are those that correspond to the last cluster address or not by referring to the cluster chain stored in the memory 29. The composite memory device 2 proceeds to Step ST8 when they are not the data that corresponds to the last cluster address, whereas it proceeds to Step ST10 when they are the data that corresponds to the last cluster address.

In Step ST8, the composite memory device 2 retrieves the next cluster address by referring to the cluster chain stored in the memory 29.

On the other hand, in Step ST9, the composite memory device 2 sets an abnormal end value in the error register.

In Step ST10, the composite memory device 2 concludes the FAT chain. In this example, it writes the identification information that indicates EOF in the FAT that corresponds to "01236h".

In Step ST11, the composite memory device 2 notifies the host appliance 4 of the leading cluster address of File 1 after the move (FIG. 9). The leading cluster address is "01231h" in this example.

Figure 10:
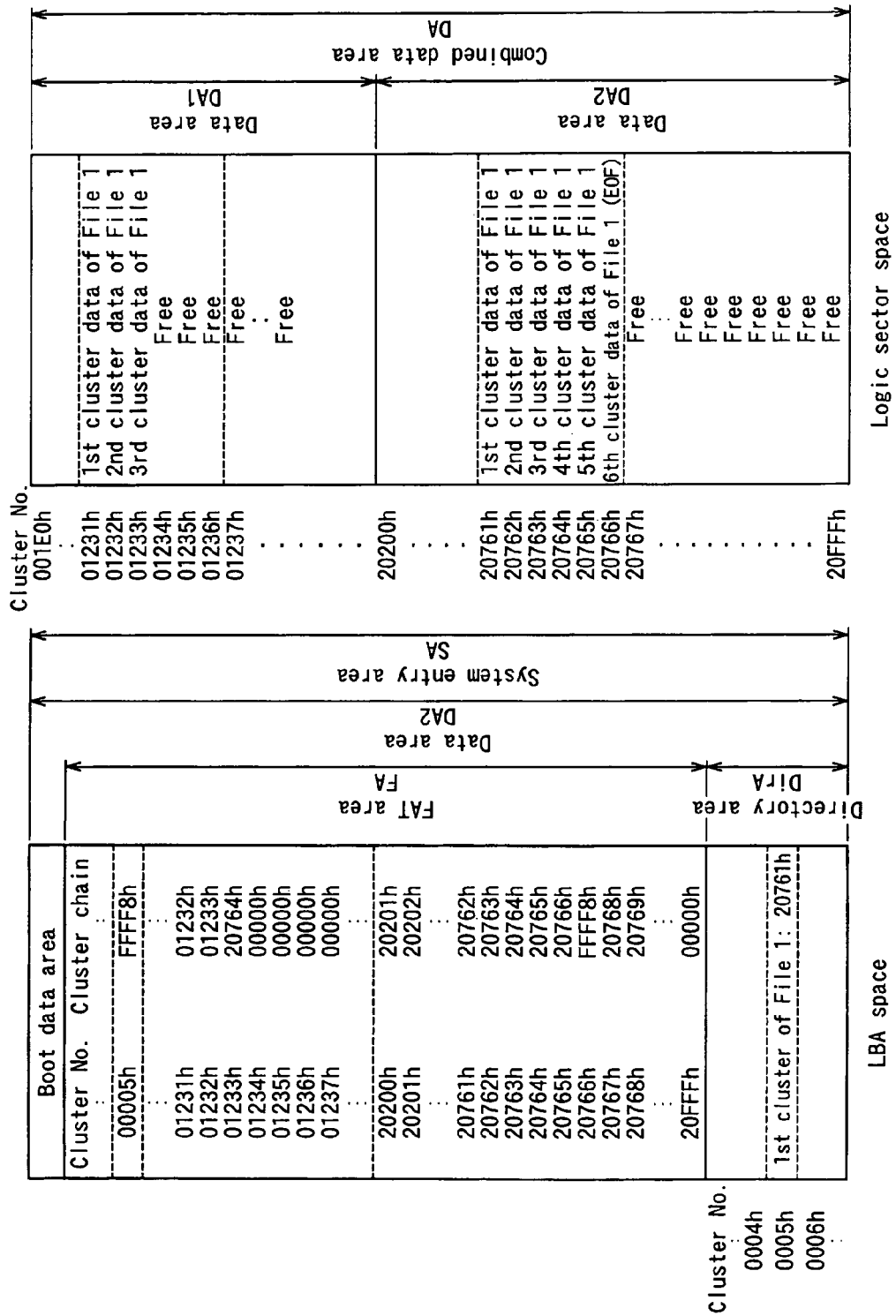
FIG. 10 is a schematic illustration of the file of FIG. 7 when a move process of moving data from the nonvolatile solid-state memory to the recording medium is in progress.
Figure 11:
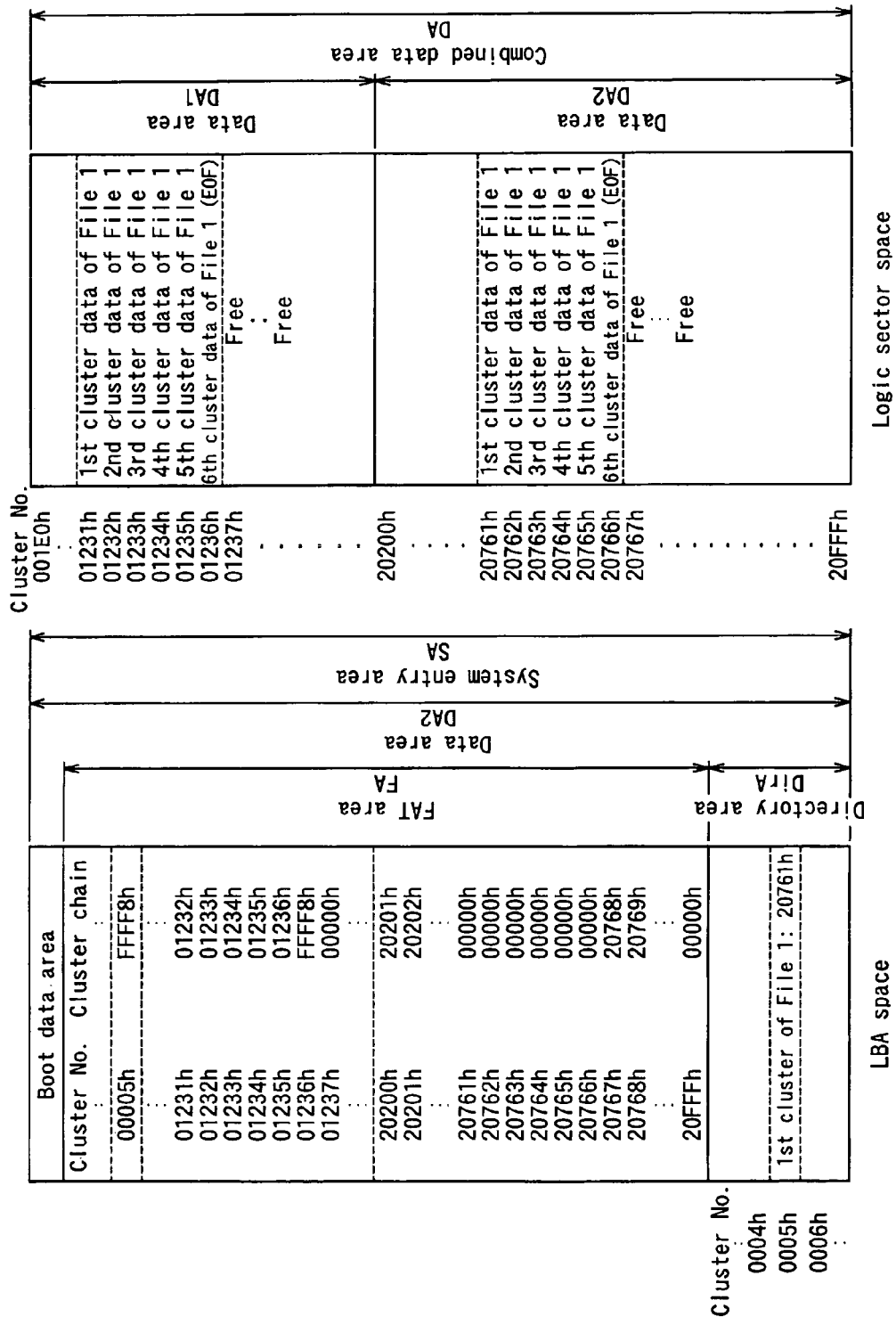
FIG. 11 is a schematic illustration of the file of FIG. 7 after a move process of moving data from the nonvolatile solid-state memory to the recording medium.

FIG. 10 illustrates the status of the file during the move process and FIG. 11 illustrates the status of the file after the move process.

The host appliance 4 changes the directory information of File 1 in terms the leading cluster address notified to it in Step ST11 and orders the composite memory device 2 to update the directory information.

The composite memory device 2 can secure a free area in the data area DA2 by executing the above-described process and writing identification information that indicates the free status in the original FAT chain as shown in FIG. 11.

EXAMPLE 2

The (Move) Process of Moving Data from the Data Area DA1 to Data Area DA2

Figure 12:
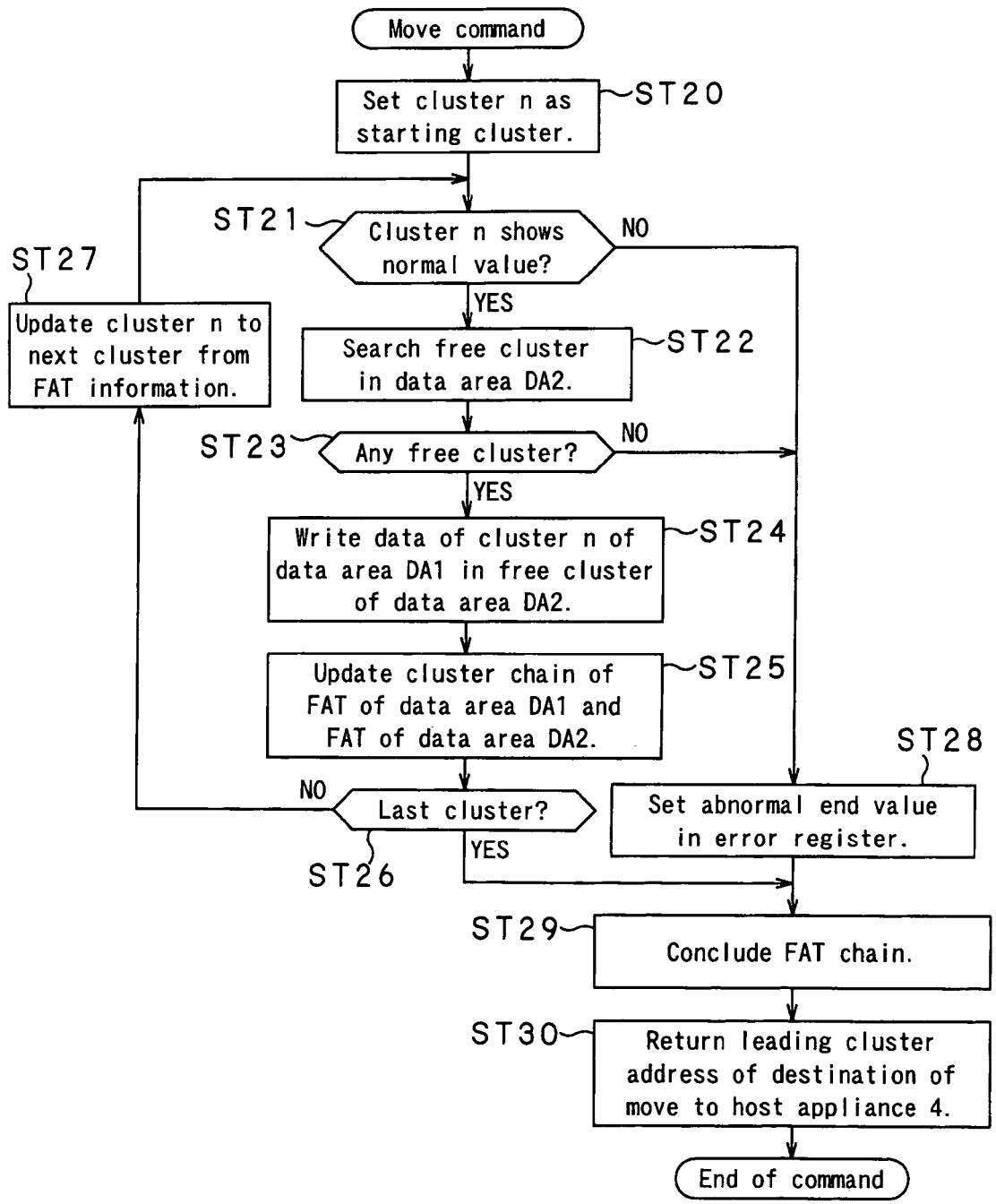
FIG. 12 is a flowchart of the operation of moving data recorded in the data area of the recording medium to the data area of the nonvolatile solid-state memory (move process), illustrating the sequence of operation.
Figure 13:
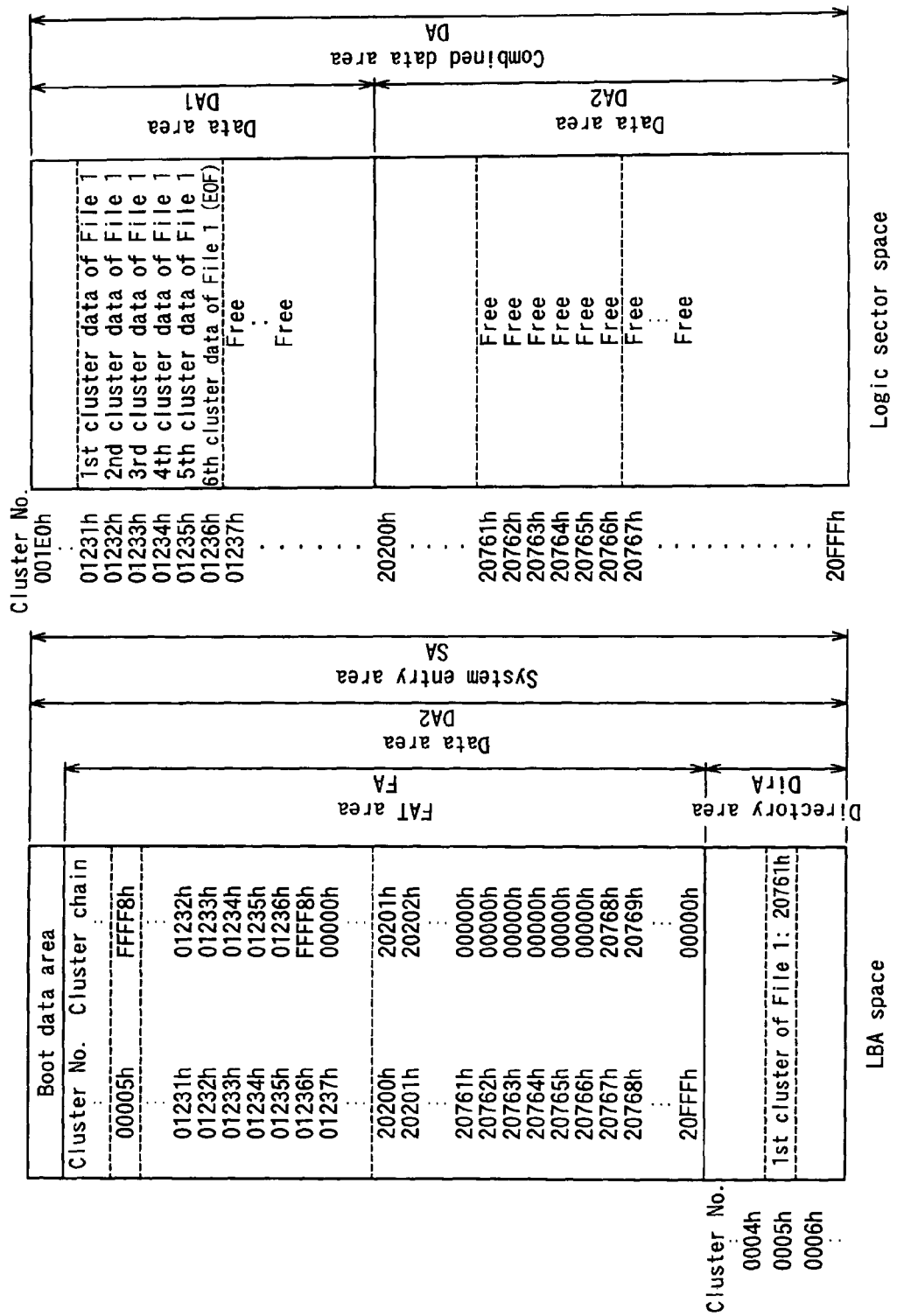
FIG. 13 is a schematic illustration of a file that can be used for the purpose of the present invention before a move process of moving data from the recording medium to the nonvolatile solid-state memory.

Now, the sequence of the process of moving the data file (File 1) recorded in the data area DA 1 of the recording medium 20 of the composite memory device 2 to the data area DA2 of the nonvolatile solid-state memory 26 (move process) when File 1 is a file that is accessed frequently will be described below by referring to the flowchart of FIG. 12. More specifically, File 1 that is written to "01231h-01236h" of data area DA1 is moved to the free area "20761h-20766h" of the data area DA2 by using the LBA (logical block address) space and the logic sector space as shown in FIG. 13.

The host appliance 4 issues a command to the composite memory device 2, asking to notify it of the leading cluster address of File 1. In response to the command issued from the host appliance 4, the composite memory device 2 transmits the leading cluster address "01231h" of File 1 from the directory area DirA. Then, the host appliance 4 issues a command for moving File 1 from the data area DA1 to the data area DA2 on the basis of the leading cluster address it receives (FIG. 8).

In Step ST20, the composite memory device 2 sets the leading cluster address of the file to be moved as argument of the command issued from the host appliance 4. In this example, "01231h" is set as the leading cluster address.

Then, in Step ST21, the composite memory device 2 determines if the set cluster address shows a normal value or not. Upon receiving the command, the composite memory device 2 reads out the cluster chain of the leading cluster address "01231h" of File 1 to be moved from the FAT area FA and stores it in the memory 29. Then, it determines if the set cluster address shows a normal value or not by referring to the cluster chain. The composite memory device 2 proceeds to Step ST22 when the set cluster address shows a normal value, whereas it proceeds to Step ST28 when the set cluster address shows a value other than a normal value.

In Step ST22, the composite memory device 2 retrieves a free cluster from the cluster region "20200h-20FFFh" of the data area DA2.

In Step ST23, the composite memory device 2 determines if any free cluster is detected as a result of the retrieval operation in Step ST22. The composite memory device 2 proceeds to Step ST24 when it is determined that a free cluster is detected, whereas it proceeds to Step ST29 when it is determined that no cluster is detected. It is assumed in the following that the cluster "20761h" is retrieved as free cluster.

In Step ST24, the composite memory device 2 reads out the corresponding data from the data area DA1 on the basis of the cluster address set in Step ST20 or Step ST27 and writes the data it reads out to the free cluster detected in Step ST23. For example, the composite memory device 2 reads out the first cluster data of File 1 and moves them to "20761h" on the basis of "01231h".

In Step ST25, the composite memory device 2 updates the cluster chain stored in the memory 29 and rewrites the FAT information. When the data that correspond to the leading cluster address are moved, identification information that indicates an "assigned" status is written to update the cluster chain. For example, it may write identification information indicating the free cluster in the cluster chain that corresponds to the origin of the move "01231h" and identification information indicating an assigned status in the cluster chain that corresponds to the destination of the move "20761h".

In Step ST26, the composite memory device 2 determines if the data moved in Step ST24 are those that correspond to the last cluster address or not by referring to the cluster chain stored in the memory 29. The composite memory device 2 proceeds to Step ST27 when they are not the data that corresponds to the last cluster address, whereas it proceeds to Step ST29 when they are the data that corresponds to the last cluster address.

In Step ST27, the composite memory device 2 retrieves the next cluster address by referring to the cluster chain stored in the memory 29.

On the other hand, in Step ST28, the composite memory device 2 sets an abnormal end value in the error register.

In Step ST29, the composite memory device 2 concludes the FAT chain. In this example, it writes the identification information that indicates EOF in the FAT that corresponds to "20766h".

In Step ST30, the composite memory device 2 notifies the host appliance 4 of the leading cluster address of File 1 after the move (FIG. 9). The leading cluster address is "20761h" in this example.

Figure 14:
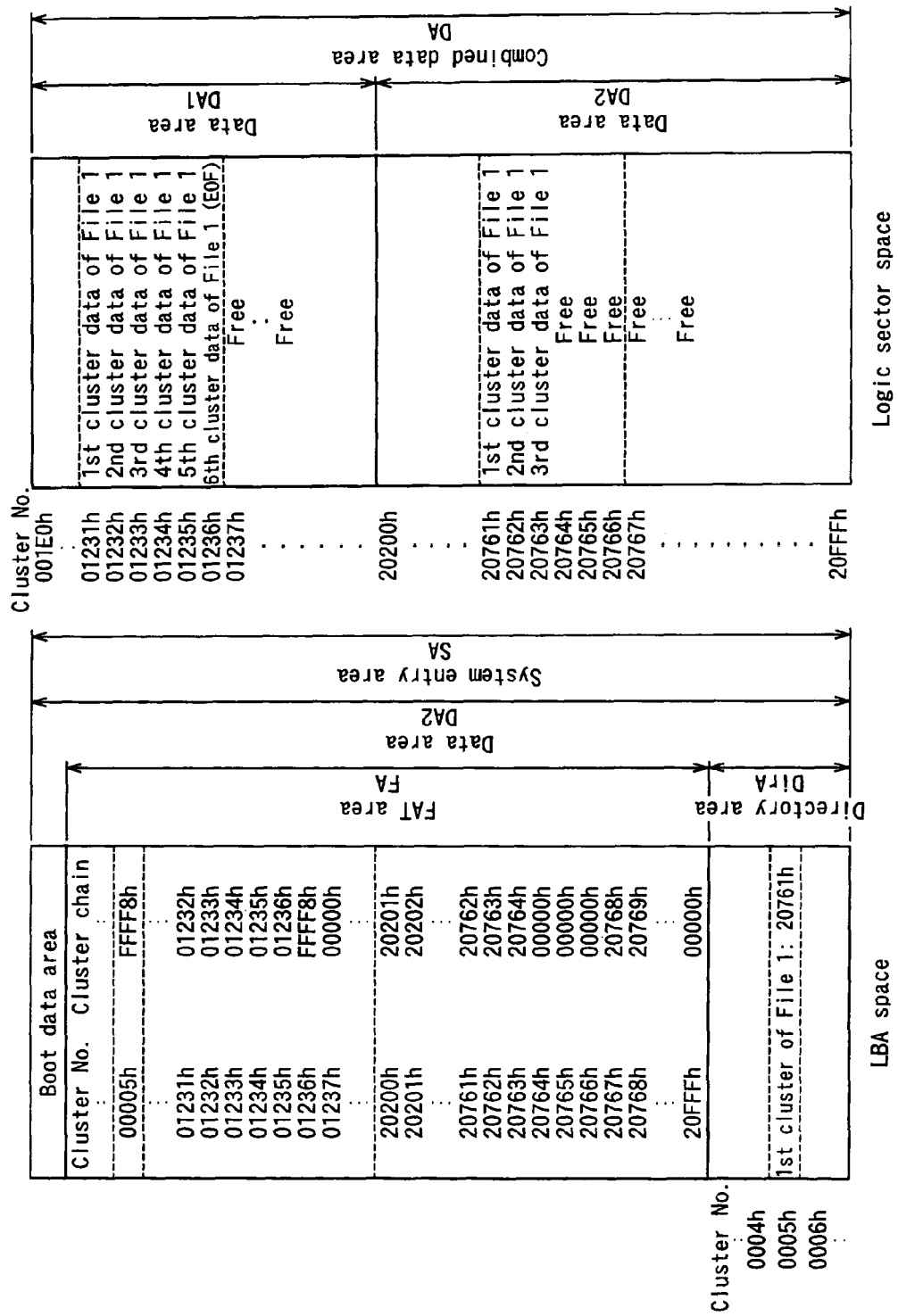
FIG. 14 is a schematic illustration of the file of FIG. 13 when a move process of moving data from the recording medium to the nonvolatile solid-state memory is in progress.
Figure 15:
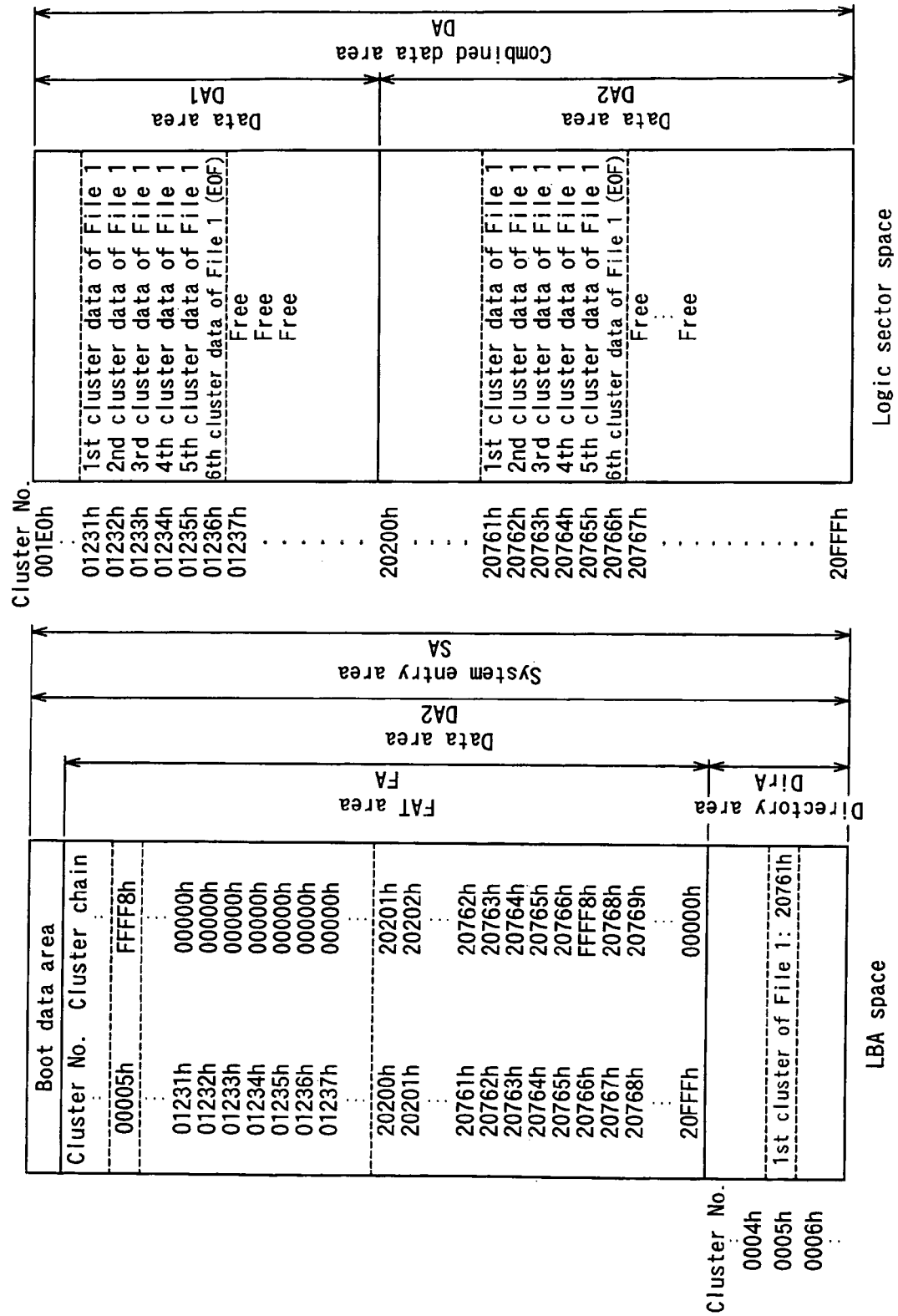
FIG. 15 is a schematic illustration of the file of FIG. 13 after a move process of moving data from the recording medium to the nonvolatile solid-state memory.

FIG. 13 illustrates the status of the file before the move process and FIG. 14 illustrates the status of the file during the move process, whereas FIG. 15 illustrates the status of the file after the move process.

The host appliance 4 changes the directory information of File 1 in terms the leading cluster address notified to it in Step ST30 and orders the composite memory device 2 to update the directory information.

The composite memory device 2 can secure a free area in the data area DA1 by executing the above-described process and writing identification information that indicates the free status in the original FAT chain as shown in FIG. 15.

EXAMPLE 3

The (Copy) Process of Copying Data from the Data Area DA2 to Data Area DA1

Figure 16:
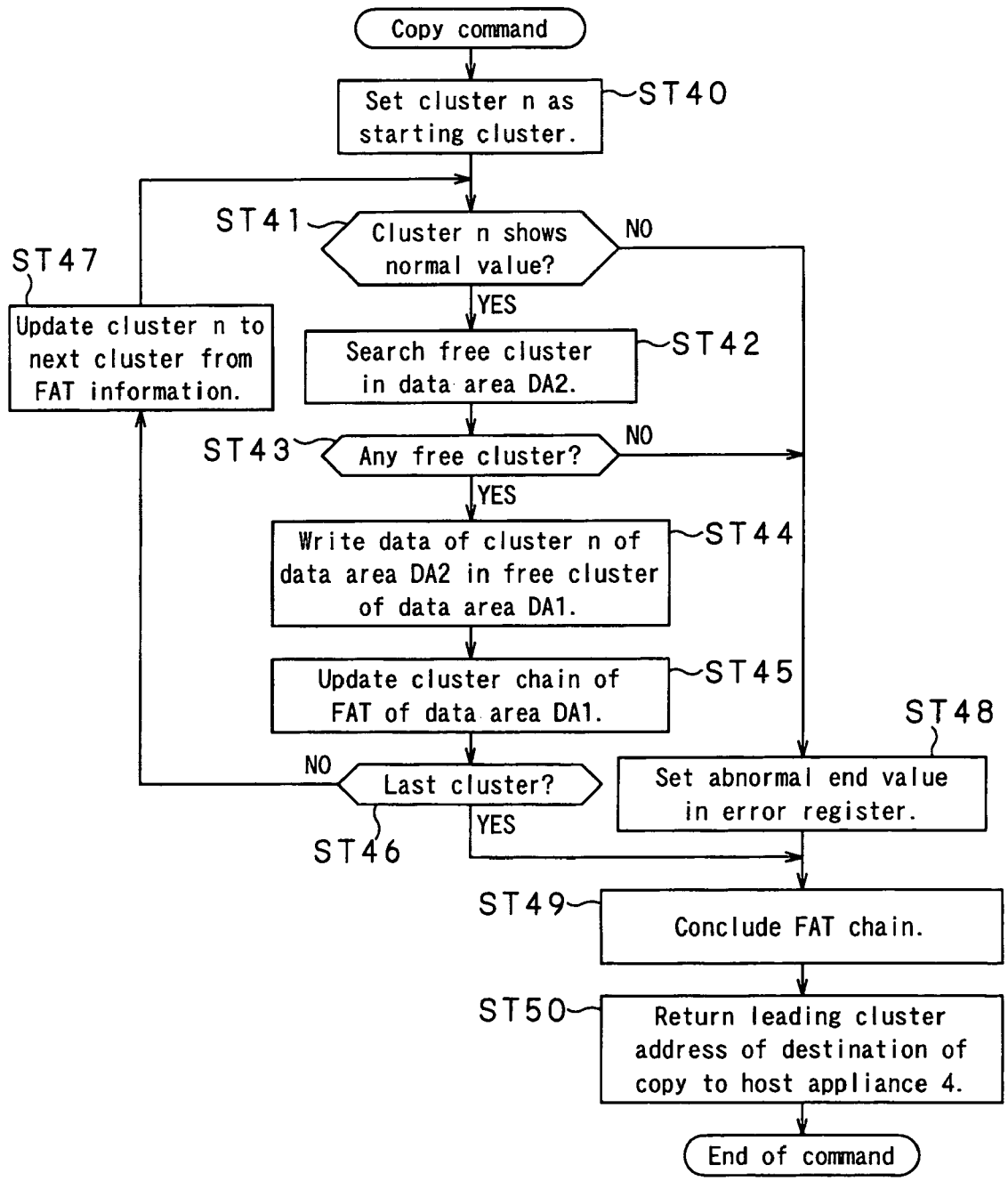
FIG. 16 is a flowchart of the operation of copying data recorded in the data area of the nonvolatile solid-state memory to the data area of the recording medium (copying process), illustrating the sequence of operation.

Now, the sequence of the process of copying the data file (File 1) recorded in the data area DA 2 of the nonvolatile solid-state memory 26 of the composite memory device 2 to the data area DA1 of the recording medium 20 (copy process) when File 1 is a file that is accessed scarcely will be described below by referring to the flowchart of FIG. 16. More specifically, File 1 that is written to "120761h-20766h" of data area DA2 is copied to the free area "01231h-01236h" of the data area DA1 by using the LBA (logical block address) space and the logic sector space.

The host appliance 4 issues a command to the composite memory device 2, asking to notify it of the leading cluster address of File 1. In response to the command issued from the host appliance 4, the composite memory device 2 transmits the leading cluster address "20761h" of File 1 from the directory area DirA. Then, the host appliance 4 issues a command for copying File 1 from the data area DA2 to the data area DA1 on the basis of the leading cluster address it receives (FIG. 8).

In Step ST40, the composite memory device 2 sets the leading cluster address of the file to be copied as argument of the command issued from the host appliance 4. In this example, "20761h" is set as the leading cluster address.

Then, in Step ST41, the composite memory device 2 determines if the set cluster address shows a normal value or not.

Upon receiving the command, the composite memory device 2 reads out the cluster chain of the leading cluster address "20761h" of File 1 to be copied from the FAT area FA and stores it in the memory 29. Then, it determines if the set cluster address shows a normal value or not by referring to the cluster chain. The composite memory device 2 proceeds to Step ST42 when the set cluster address shows a normal value, whereas it proceeds to Step ST48 when the set cluster address shows a value other than a normal value.

In Step ST42, the composite memory device 2 retrieves a free cluster from the cluster region "001E0h-201FFh" of the data area DA1.

In Step ST43, the composite memory device 2 determines if any free cluster is detected as a result of the retrieval operation in Step ST42. The composite memory device 2 proceeds to Step ST44 when it is determined that a free cluster is detected, whereas it proceeds to Step ST48 when it is determined that no cluster is detected. It is assumed in the following that the cluster "01231h" is retrieved as free cluster.

In Step ST44, the composite memory device 2 reads out the corresponding data from the data area DA2 on the basis of the cluster address set in Step ST40 or Step ST47 and writes the data it reads out to the free cluster detected in Step ST43. For example, the composite memory device 2 reads out the first cluster data of File 1 and copies them to "01231h" on the basis of "20761h".

In Step ST45, the composite memory device 2 updates the cluster chain stored in the memory 29 and rewrites the FAT information. For example, it may write identification information indicating the free cluster in the cluster chain that corresponds to the origin of the copying "20761h".

In Step ST46, the composite memory device 2 determines if the data copied in Step ST44 are those that correspond to the last cluster address or not by referring to the cluster chain stored in the memory 29. The composite memory device 2 proceeds to Step ST47 when they are not the data that corresponds to the last cluster address, whereas it proceeds to Step ST49 when they are the data that corresponds to the last cluster address.

In Step ST47, the composite memory device 2 retrieves the next cluster address by referring to the cluster chain stored in the memory 29.

On the other hand, in Step ST48, the composite memory device 2 sets an abnormal end value in the error register.

In Step ST49, the composite memory device 2 concludes the FAT chain. In this example, it writes the identification information that indicates EOF in the FAT that corresponds to "01236h".

In Step ST50, the composite memory device 2 notifies the host appliance 4 of the leading cluster address of File 1 after the copying (FIG. 9). The leading cluster address is "01231h" in this example.

The host appliance 4 changes the directory information of File 1 in terms the leading cluster address notified to it in Step ST50 and orders the composite memory device 2 to update the directory information.

EXAMPLE 4

The (Copy) Process of Copying Data from the Data Area DA1 to Data Area DA2

Figure 17:
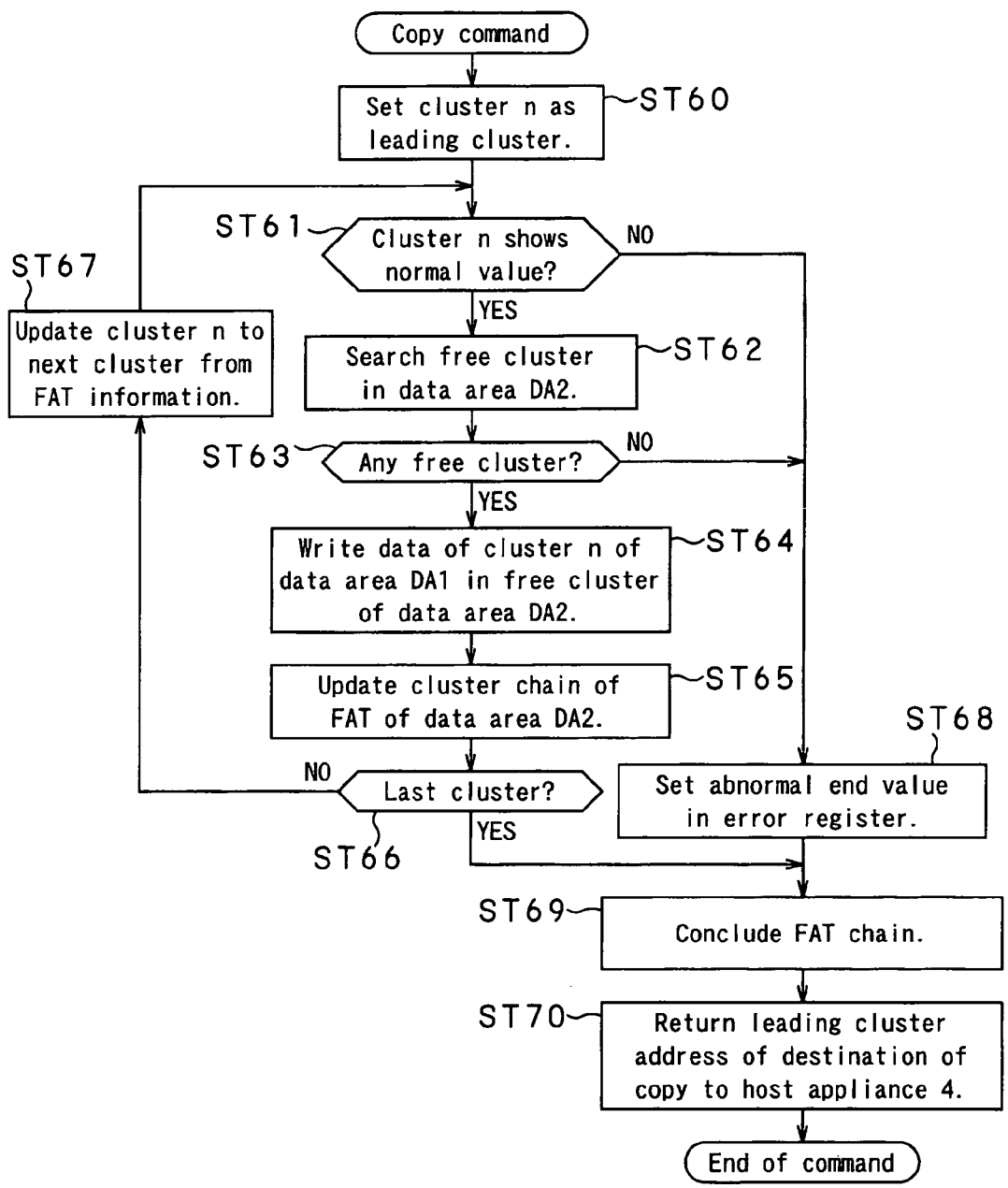
FIG. 17 is a flowchart of the operation of copying data recorded in the data area of the recording medium to the data area of the nonvolatile solid-state memory (copying process), illustrating the sequence of operation.
Figure 18:
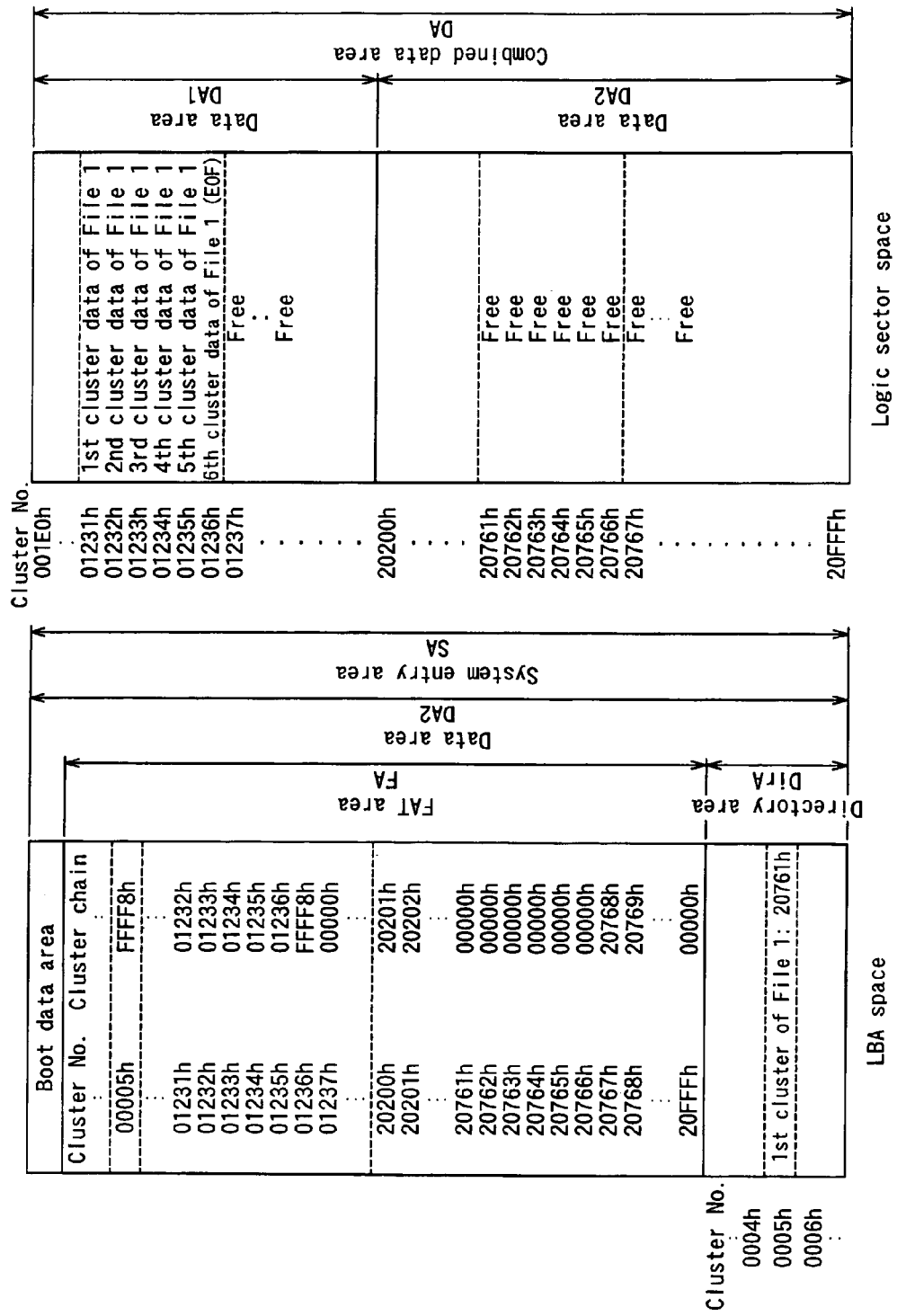
FIG. 18 is a schematic illustration of a file that can be used for the purpose of the present invention before a copying process of copying data from the recording medium to the nonvolatile solid-state memory.

Now, the sequence of the process of copying the data file (File 1) recorded in the data area DA1 of the recording medium 20 of the composite memory device 2 to the data area DA2 of the nonvolatile solid-state memory 26 (copy process) when File 1 is a file that is accessed frequently will be described below by referring to the flowchart of FIG. 17. More specifically, File 1 that is written to "01231h-01236h" of data area DA1 is copied to the free area "20761h-20766h" of the data area DA2 by using the LBA (logical block address) space and the logic sector space as shown in FIG. 18.

The host appliance 4 issues a command to the composite memory device 2, asking to notify it of the leading cluster address of File 1. In response to the command issued from the host appliance 4, the composite memory device 2 transmits the leading cluster address "01231h" of File 1 from the directory area DirA. Then, the host appliance 4 issues a command for copying File 1 from the data area DA1 to the data area DA2 on the basis of the leading cluster address it receives (FIG. 8).

In Step ST60, the composite memory device 2 sets the leading cluster address of the file to be copied in the register as argument of the command issued from the host appliance 4. In this example, "01231h" is set as the leading cluster address.

Then, in Step ST61, the composite memory device 2 determines if the set cluster address shows a normal value or not. Upon receiving the command, the composite memory device 2 reads out the cluster chain of the leading cluster address "01231h" of File 1 to be copied from the FAT area FA and stores it in the memory 29. Then, it determines if the set cluster address shows a normal value or not by referring to the cluster chain. The composite memory device 2 proceeds to Step ST62 when the set cluster address shows a normal value, whereas it proceeds to Step ST68 when the set cluster address shows a value other than a normal value.

In Step ST62, the composite memory device 2 retrieves a free cluster from the cluster region "20200h-20FFFh" of the data area DA2.

In Step ST63, the composite memory device 2 determines if any free cluster is detected as a result of the retrieval operation in Step ST62. The composite memory device 2 proceeds to Step ST64 when it is determined that a free cluster is detected, whereas it proceeds to Step ST69 when it is determined that no cluster is detected. It is assumed in the following that the cluster "20761h" is retrieved as free cluster.

In Step ST64, the composite memory device 2 reads out the corresponding data from the data area DA1 on the basis of the cluster address set in Step ST60 or Step ST67 and writes the data it reads out to the free cluster detected in Step ST63. For example, the composite memory device 2 reads out the first cluster data of File 1 and copies them to "20761h" on the basis of "01231h".

In Step ST65, the composite memory device 2 updates the cluster chain stored in the memory 29 and rewrites the FAT information. When the data that correspond to the leading cluster address are copied, identification information that indicates an "assigned" status is written to update the cluster chain. For example, it may write identification information indicating the free cluster in the cluster chain that corresponds to the origin of the copying "01231h".

In Step ST66, the composite memory device 2 determines if the data copied in Step ST64 are those that correspond to the last cluster address or not by referring to the cluster chain stored in the memory 29. The composite memory device 2 proceeds to Step ST67 when they are not the data that corresponds to the last cluster address, whereas it proceeds to Step ST69 when they are the data that corresponds to the last cluster address.

In Step ST67, the composite memory device 2 retrieves the next cluster address by referring to the cluster chain stored in the memory 29.

On the other hand, in Step ST68, the composite memory device 2 sets an abnormal end value in the error register.

In Step ST69, the composite memory device 2 concludes the FAT chain. In this example, it writes the identification information that indicates EOF in the FAT that corresponds to "20766h".

In Step ST70, the composite memory device 2 notifies the host appliance 4 of the leading cluster address of File 1 after the copying (FIG. 9). The leading cluster address is "120761h" in this example.

Figure 19:
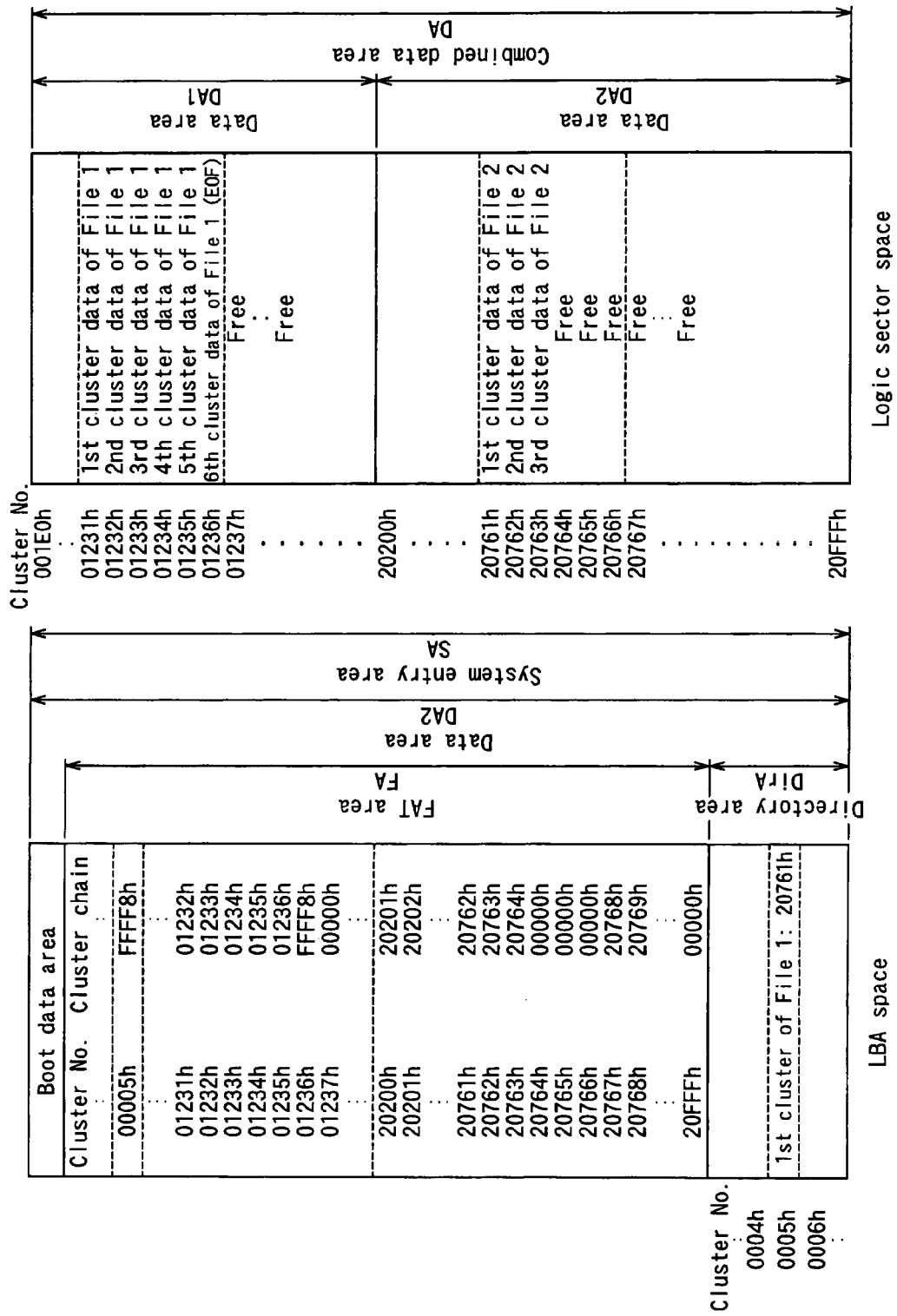
FIG. 19 is a schematic illustration of the file of FIG. 18 when a copying process of copying data from the recording medium to the nonvolatile solid-state memory is in progress.
Figure 20:
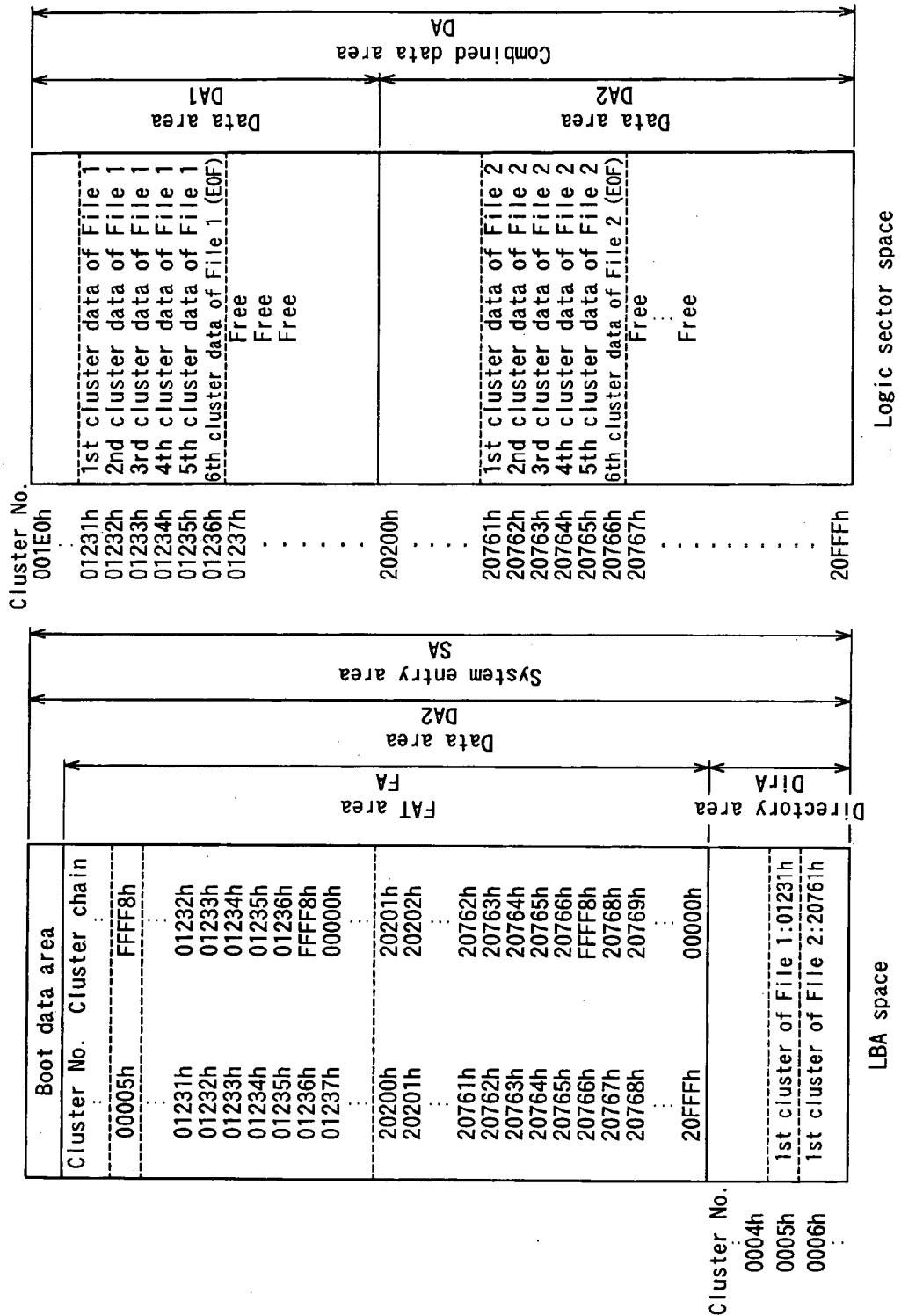
FIG. 20 is a schematic illustration of the file of FIG. 18 after a copying process of copying data from the recording medium to the nonvolatile solid-state memory.

FIG. 18 illustrates the status of the file before the copy process and FIG. 19 illustrates the status of the file during the copy process, whereas FIG. 15 illustrates the status of the file after the copy process.

The host appliance 4 changes the directory information of File 1 in terms the leading cluster address notified to it in Step ST70 and orders the composite memory device 2 to update the directory information.

EXAMPLE 5

Figure 21A:
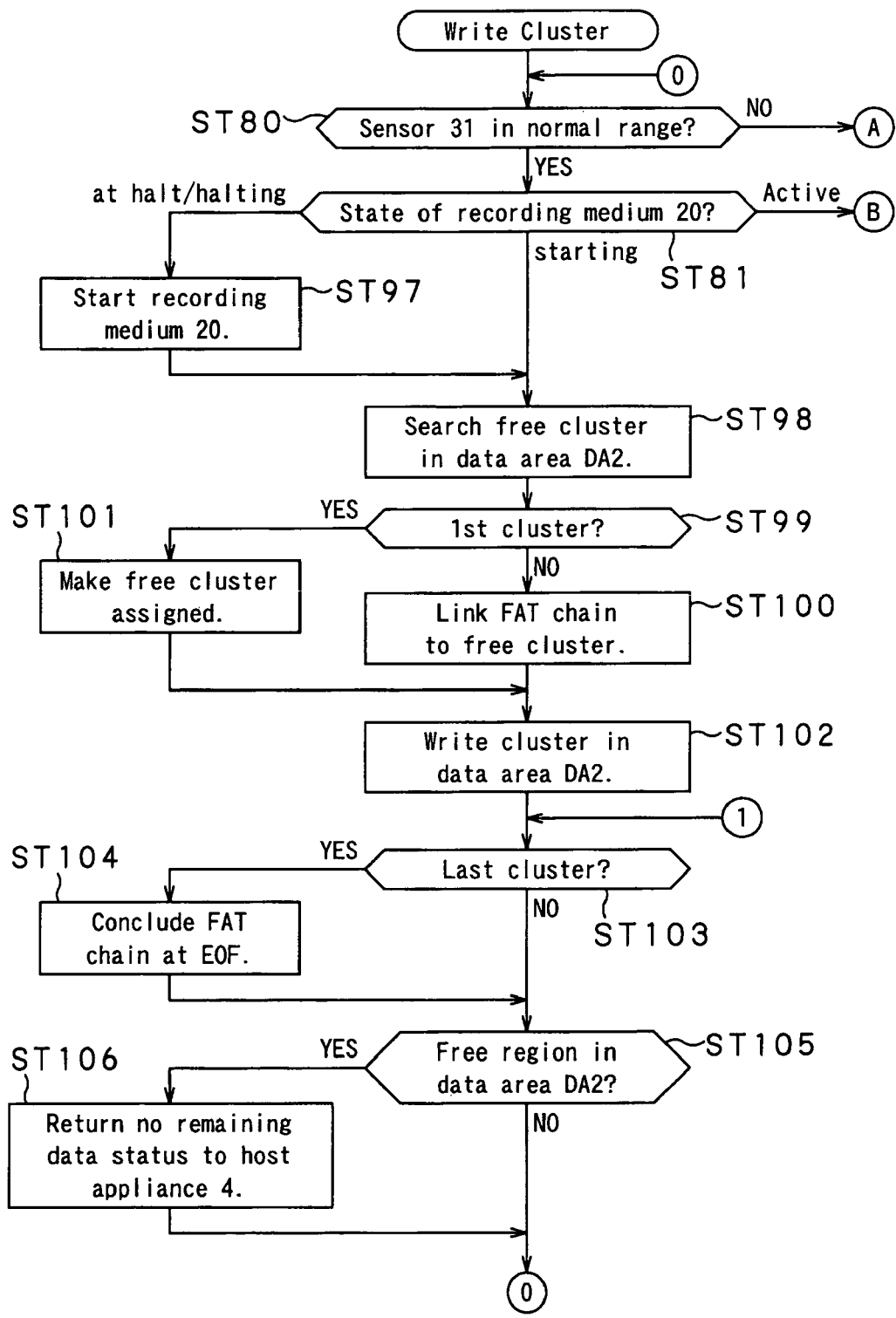
FIG. 21A is a first flowchart of the operation of writing data to the composite memory device of a data access system, illustrating the sequence of operation.
Figure 21B:
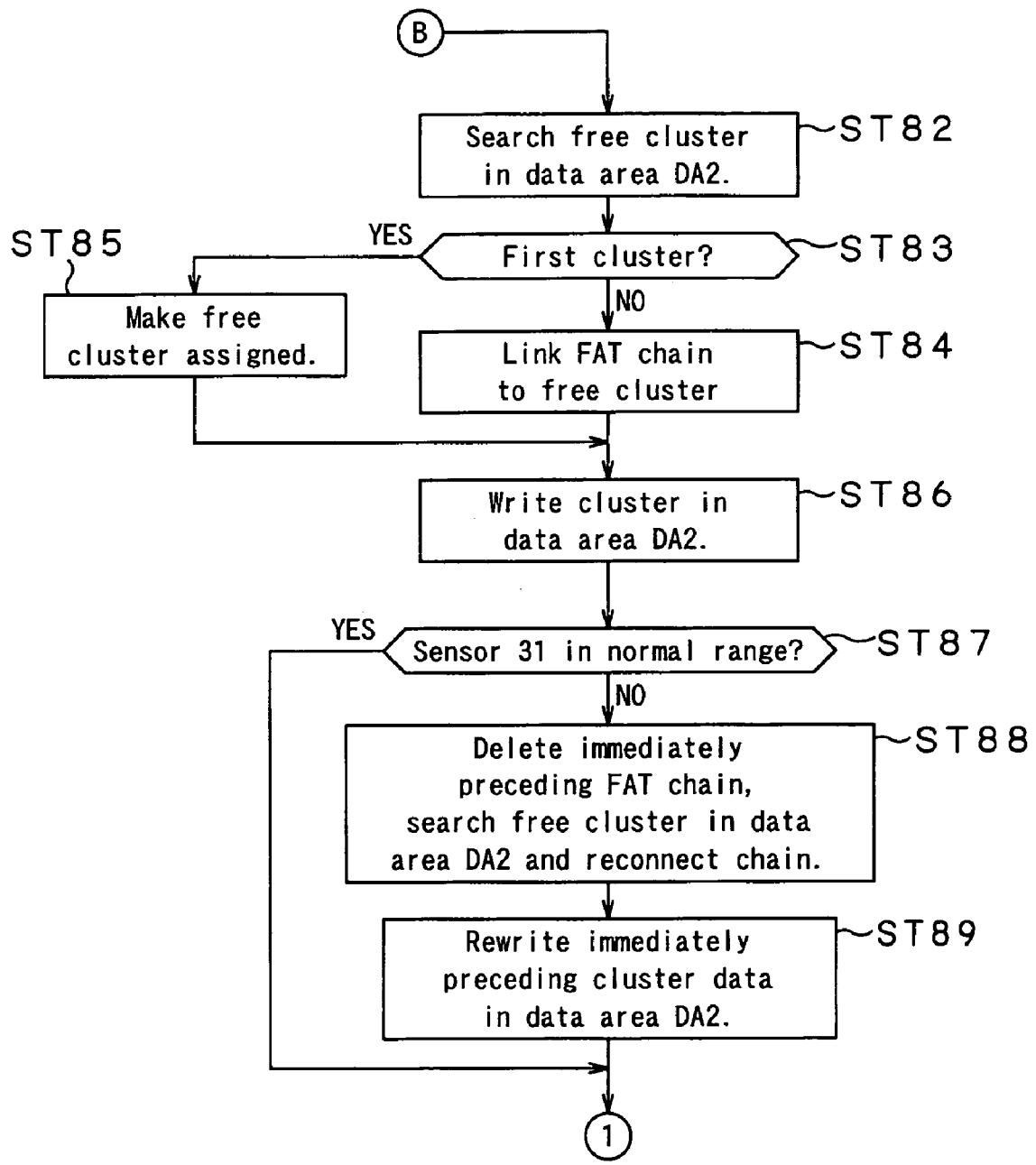
FIG. 21B is a second flowchart of the operation of writing data to the composite memory device of a data access system, illustrating the sequence of operation.
Figure 21C:
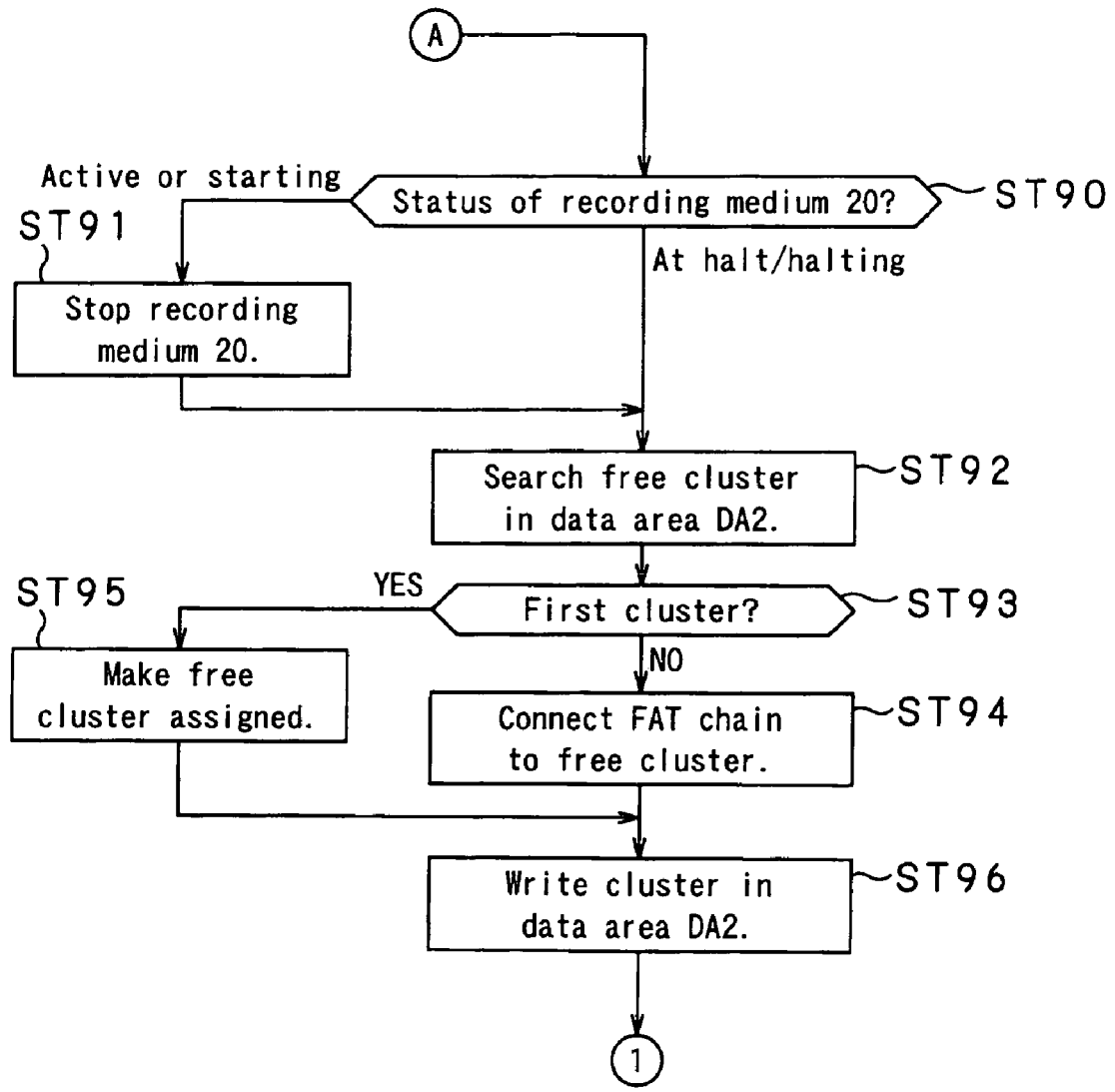
FIG. 21C is a third flowchart of the operation of writing data to the composite memory device of a data access system, illustrating the sequence of operation.

Now, the sequence of operation according to which the composite memory device 2 writes the data supplied from the host appliance 4 in the combined data area DA depending on if the sensor 31 detects an abnormal condition in an operation of writing data in the combined data area DA that is formed by the recording medium 20 and the nonvolatile solid-state memory 26 of the composite memory device 2, where the host appliance 4 manages directory information and the composite memory device 2 manages the FAT, will be described below by referring to the flowcharts of FIGS. 21A, 21B and 21C.

In Step ST80, the HDD control section 27 determines if the sensor 31 detects an abnormal condition or not as shown in FIG. 21A. If the sensor 31 detects an abnormal condition, it generates signal S1, S3, S5 or S7 and supplies the signal to the HDD control section 27. The composite memory device 2 proceeds to Step ST81 (see FIG. 21C) when the sensor 31 does not detect any abnormal condition and hence detects a normal condition, whereas it proceeds to Step ST90 when the sensor 31 detects an abnormal condition.

In Step ST81, the HDD control section 27 determines if the recording medium 20 is in an active state and hence ready for a data writing operation or not typically by seeing if the number of revolutions per unit time of the disc that is contained in the recording medium 20 has reached a specified number or not. The composite memory device 2 proceeds to Step ST82 (see FIG. 21B) when the HDD control section 27 determines that the recording medium 20 is in an active state but proceeds to Step ST97 when the disc is at halt or halting, whereas it proceeds to Step ST98 when the recording medium 20 has just been started and hence is not ready for a data writing operation.

In Step ST82, the HDD control section 27 retrieves a free cluster from the data area DA1 of the recording medium 20. Since the recording medium 20 is in an active state, the HDD control section 27 retrieves a free cluster from the data area DA1 of the recording medium 20.

In Step ST83, the HDD control section 27 determines if the data to be recorded in the free cluster detected in Step ST82 are the first data and hence the cluster is the first cluster or not. The composite memory device 2 proceeds to Step ST85 when the detected cluster is the first cluster, whereas it proceeds to Step ST84 when the detected cluster is not the first cluster.

In Step ST84, the HDD control section 27 executes a process for connecting the FAT chain to the free cluster where the data are to be written. The HDD control section 27 changes the address "0000h" of the cluster retrieved in Step ST82 on the FAT unfolded in the memory 29 to the address of the cluster where the data are to be written and updates the FAT chain.

On the other hand, in Step ST85, the HDD control section 27 makes the free cluster where the data are to be written "assigned". The HDD control section 27 writes information that indicates an "assigned" status to the address of the free cluster where the data are to be written on the FAT unfolded in the memory 29.

In Step ST86, the HDD control section 27 writes the data in the data area DA1 where the free cluster is detected in Step ST82.

In Step ST87, the HDD control section 27 determines if the sensor 31 detects an abnormal condition or not. The composite memory device 2 proceeds to Step ST96 when the sensor 31 does not detect any abnormal condition and hence detects a normal condition, whereas it proceeds to Step ST88 when the sensor 31 detects an abnormal condition.

In Step ST88, the HDD control section 27 deletes the FAT chain that is updated in Step ST84 or Step ST85, retrieves a free cluster in the data area DA2 and reconnects the FAT chain.

In Step ST89, the HDD control section 27 writes the data in the data area DA2 where the free cluster is detected in Step ST88. Subsequently, the composite memory device 2 proceeds to Step ST103.

Now, the Steps ST88 and ST89 and related issues will be described below.

EXAMPLE 5-1

The composite memory device 2 is adapted to observe the internal temperature of the composite memory device 2 by means of the temperature sensor 31a. The temperature sensor 31a may be a thermocouple, a thermister or some other similar element. The HDD control section 27 determines if the internal temperature exceeds the upper limit or the lower limit of the operation assurance temperature range of the recording medium 20 or not according to the signal supplied from the temperature sensor 31a and also determines if the operation of writing data to the recording medium 20 is to be continued or switched from the recording medium 20 to the nonvolatile solid-state memory 26. Now, the operation assurance temperature of the recording medium 20 will be described by referring to FIG. 22.

Figure 22:
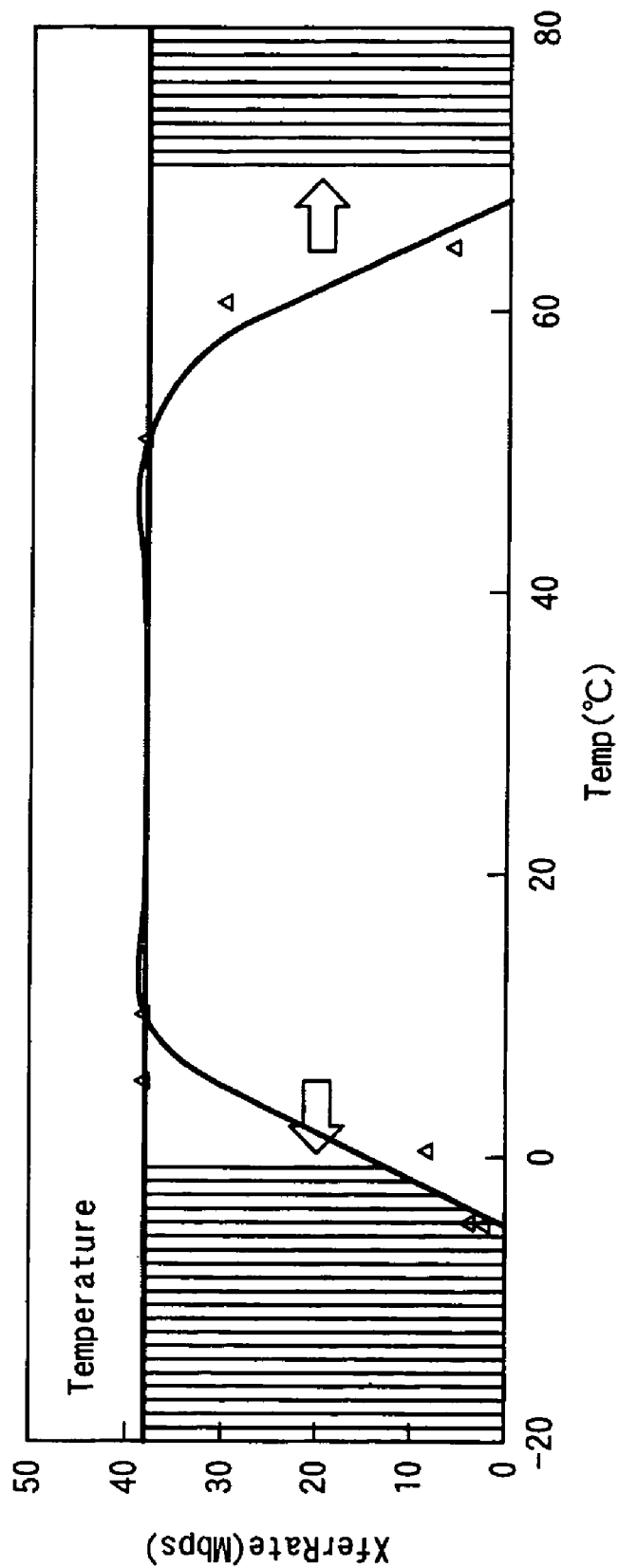
FIG. 22 is a schematic illustration of the temperature dependency of a composite memory device.

FIG. 22 is a schematic illustration of the temperature dependency of the recording medium 20 that is determined by actual observations. From FIG. 22, it will be seen that the operation assurance range of the recording medium 20 is between 5° C. and 50° C. The triangles in FIG. 22 indicate the data obtained by actual observations and the curve indicates an approximation line of the data obtained by actual observations. In the graph of FIG. 22, the horizontal axis indicates temperature (° C.) and the vertical axis indicates the data transfer rate (Mbits/s) in a sequential data writing operation where data are continuously written in a continuous area. In FIG. 22, the shaded areas (below about 0° C. and above about 70° C.) indicate temperature zones that are out of the operation assurance temperature range of the nonvolatile solid-state memory 26.

The composite memory device 2 can hold the operation assurance temperature range between about 0° C. and about 70° C. as a whole by selectively driving the recording medium 20 and the nonvolatile solid-state memory 26 according to the data of the graph of FIG. 22.

Thus, the temperature sensor 31a is adapted to generate signal S1 for notifying an abnormal condition when the internal temperature falls below about 0C or rises above about 70° C. and transmits the signal S1 to the HDD control section 27. On the other hand, the temperature sensor 31a generates signal S2 for notifying a normal condition when the internal temperature returns to the temperature range between about 0° C. and about 70° C. and transmits the signal S2 to the HDD control section 27.

Figure 23:
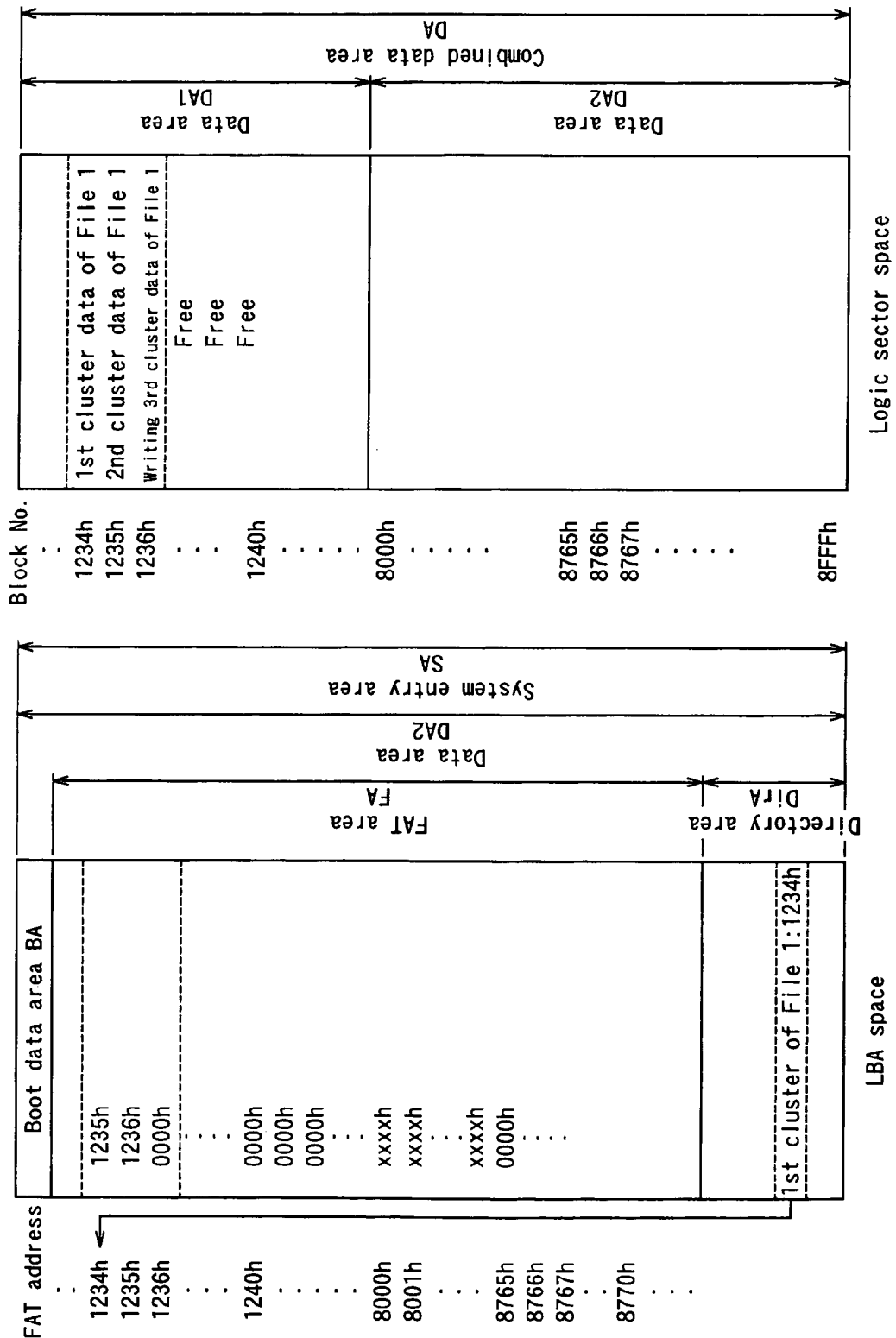
FIG. 23 is a schematic illustration of detection by a temperature sensor of an abnormal condition while data being written to the data area of a recording medium.

For example, assume that the internal temperature gets to 70° C. when the third cluster data of File 1 are being written to "1236h" of the data area DA1 after completion of the operation of writing the first cluster data and the second cluster data of File 1 respectively to "1234h" and "1235h" of the data area DA1 (FIG. 23). Then, the HDD control section 27 receives signal S1 from the temperature sensor 31a. Therefore, the HDD control section 27 presumes that an abnormal condition takes place in the recording medium 20 before it sends an "end writing" command to the host appliance 4 and stops driving the recording medium 20. Thus, the HDD control section 27 determines that the operation of writing the data (the third cluster data) to the recording medium 20 is not properly completed and undoes the specification of the cluster at the end of the FAT chain. Then, the HDD control section 27 retrieves a free cluster on the nonvolatile solid-state memory 26. Thereafter, the HDD control section 27 updates the FAT chain according to the address "8765h" of the retrieved free cluster and rewrites the data (the third cluster data) to "8765h" of the data area DA2. After completing the rewriting operation, the HDD control section 27 sends an "end writing" command to the host appliance 4.

Figure 24:
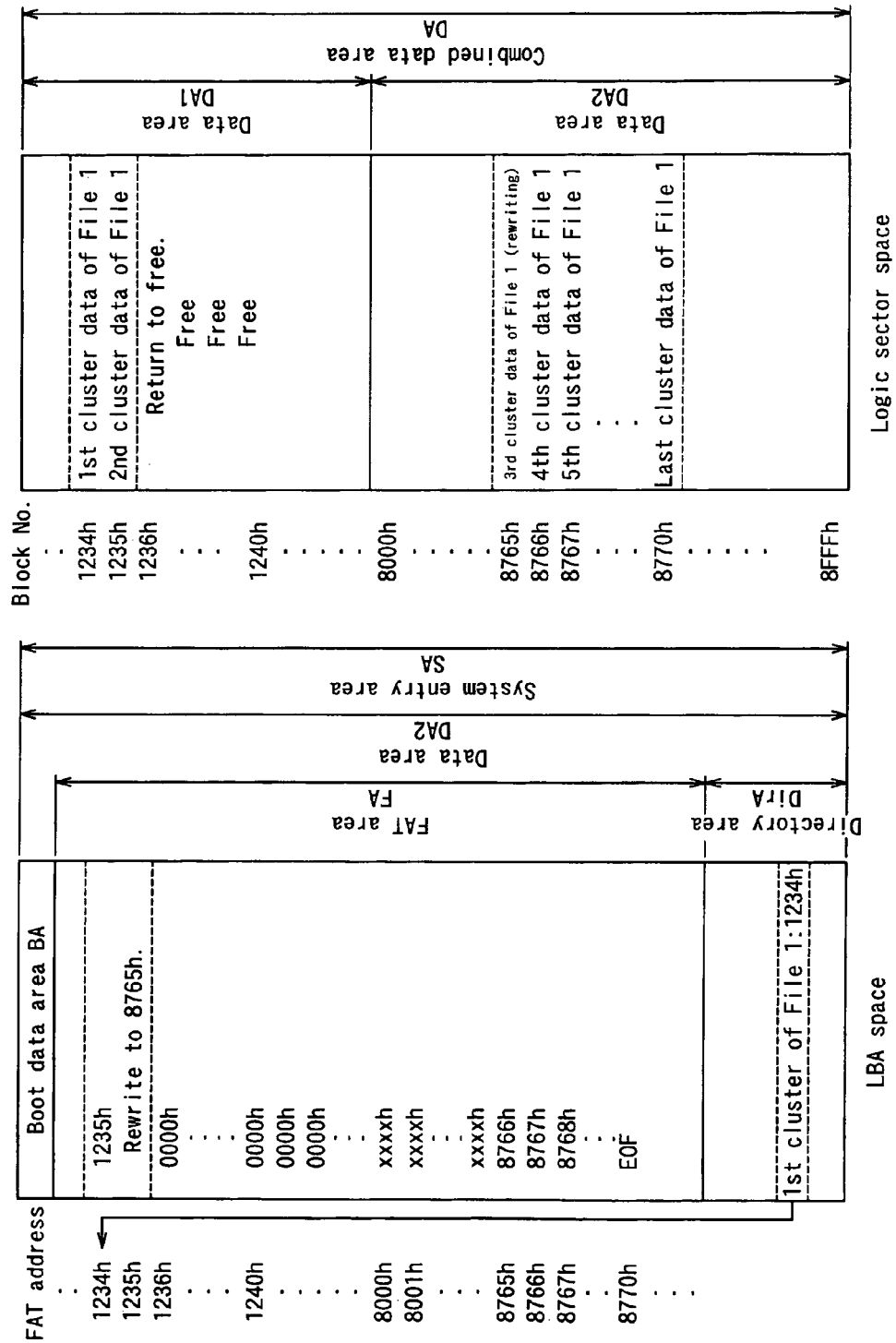
FIG. 24 is a schematic illustration of a situation where the internal temperature of a recording medium rises above the operation assurance temperature range of the recording medium and all the remaining data are written to the data area of a nonvolatile solid-state memory.

FIG. 24 schematically illustrates the final configuration of the memory area when the third cluster data and all the subsequent data of File 1 are being written to the data area DA2 after the detection by the temperature sensor 31a of the internal temperature exceeding the upper limit (about 70° C.). Note that, in FIG. 24, the data of File 1 are connected by the FAT chain "1234h →1235h→8765h→8766h . . . 8770h (EOF)".

Figure 25:
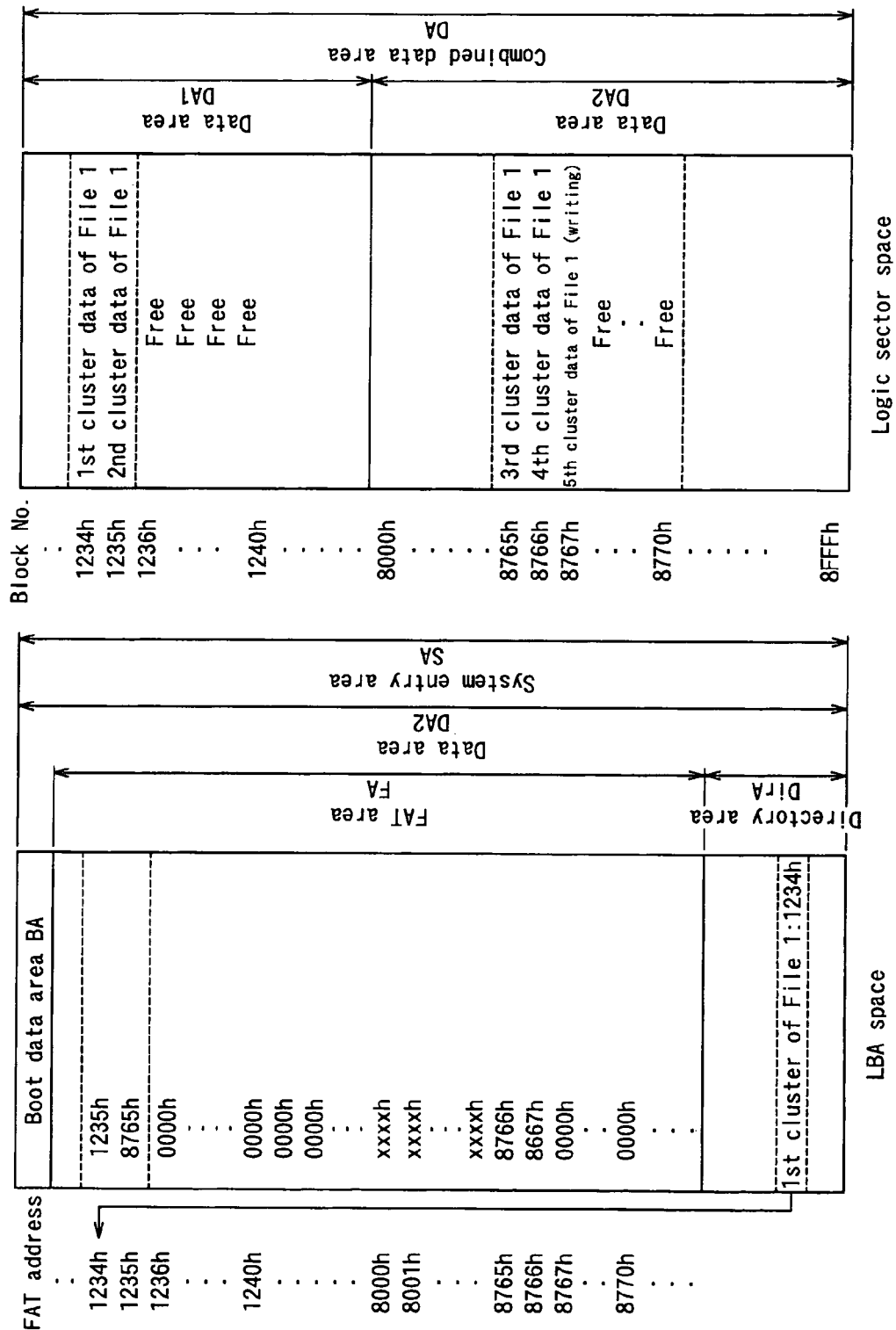
FIG. 25 is a first schematic illustration of an operation of writing data in a situation where the internal temperature of a recording medium rises above the operation assurance temperature range of the recording medium and subsequently falls back to the operation assurance temperature range.

FIG. 25 schematically illustrates the configuration of the combined data area DA when the internal temperature exceeds the upper limit (about 70° C.) of the operation assurance temperature range while the third cluster data of File 1 are being written to "1236h" after completion of the operation of writing the first cluster data and the second cluster data of File 1 respectively to "1234h" and "1235h" of the data area DA1 and the internal temperature returns to the operation assurance temperature range (between about 0° C. and about 70° C.) while the fifth fluster data are being written to "8767h" after completion of the operation of writing the third cluster data and the fourth cluster data of File 1 respectively to "8765h" and "8766h" of the data area DA2. The operation of the HDD control section 27 in the case of FIG. 25 will be described below.

As the HDD control section 27 receives signal S2 from the temperature sensor 31a telling that the internal temperature returns to the operation assurance temperature range while the fifth cluster data are being writing to "8767h", it executes a process of starting the recording medium 20. The HDD control section 27 keeps on writing data to the data area DA2 until the recording medium 20 is started and brought completely into an active state. Therefore, in this embodiment, the HDD control section 27 controls the data writing operation in such a way that the fifth cluster data and the sixth cluster data are written respectively to "8767h" and "8768h". It stops the operation of writing data to the data area DA2 only when it confirms that the recording medium 20 has become completely ready and then controls the data writing operation in such a way that the seventh cluster data and the subsequent cluster data are written to the data area DA1 (FIG. 26).

Figure 26:
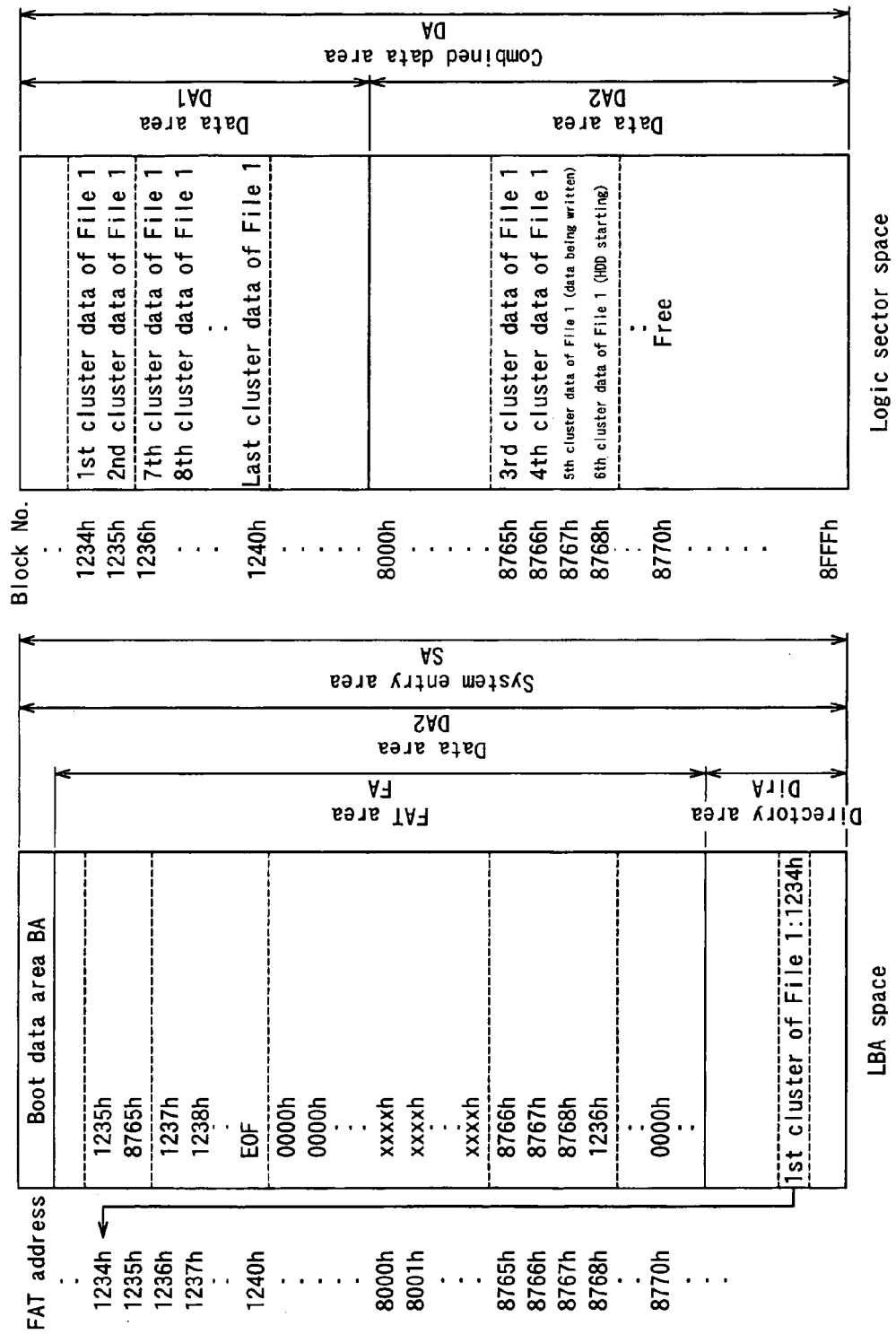
FIG. 26 is a second schematic illustration of an operation of writing data in a situation where the internal temperature of a recording medium rises above the operation assurance temperature range of the recording medium and subsequently falls back to the operation assurance temperature range.

Note that, in FIG. 26, the data of File 1 are connected by the FAT chain "1234h→1235h→8765h→8766h→8767h→8768h→1236h→1237h→1238h . . . 123Ch (EOF)".

While it is assumed that the internal temperature exceeds the upper limit of the operation assurance temperature range in the above description, a similar process may be executed when the internal temperature falls below the lower limit (about 0° C.)

EXAMPLE 5-2

The composite memory device 2 is adapted to observe the vibrations applied to it by means of the acceleration sensor 31*b*. An element that can observe vibrations in one-dimensional directions, two-dimensional directions or three-dimensional direction may selectively be used for the acceleration sensor 31*b*. The acceleration sensor 31*b* can acquire (computationally determine) the frequency and intensity of vibrations from the frequency and intensity of vibrations input to it. Then, it determines if the values exceed the tolerance range of the recording medium 20 and also if the operation of writing data to the recording medium 20 is to be continued or switched from the recording medium 20 to the nonvolatile solid-state memory 26. Now, the tolerance range for operation induced vibrations of the recording medium 20 will be discussed below by referring to FIG. 27.

Figure 27:
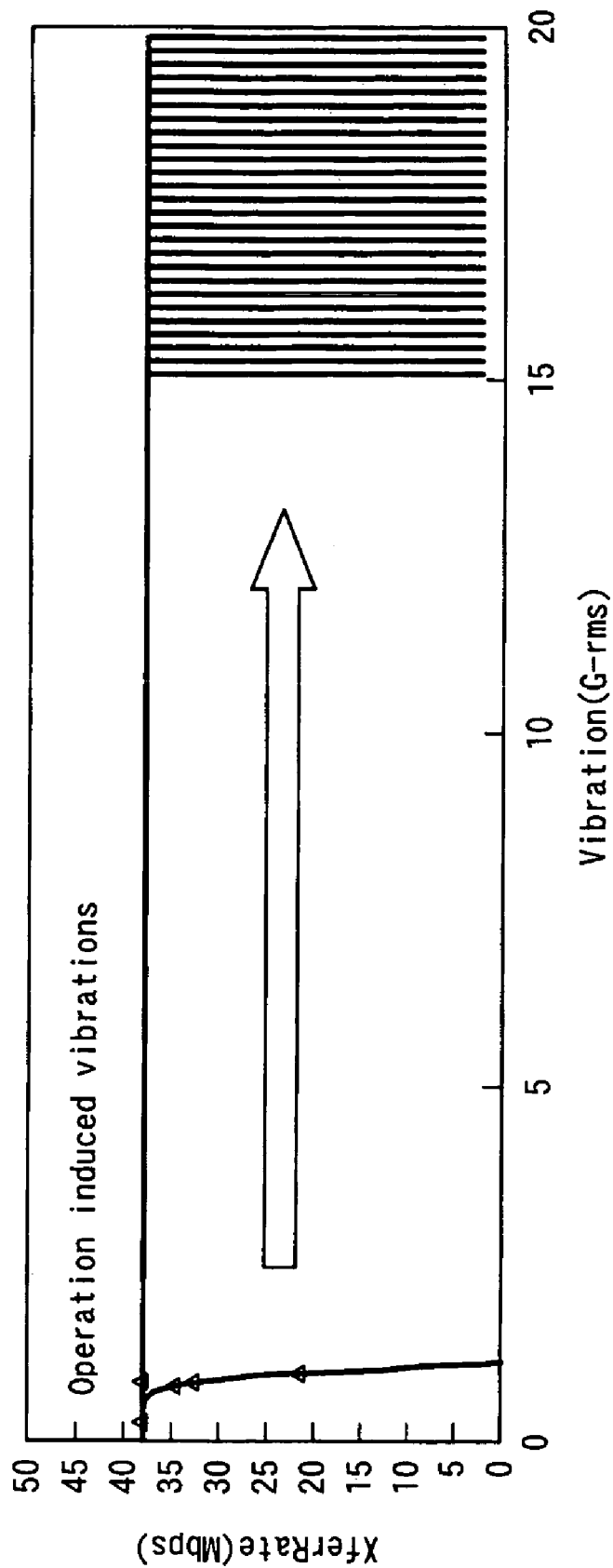
FIG. 27 is a schematic illustration of the operation vibration dependency of a composite memory device.

FIG. 27 is a schematic illustration of the vibration dependency of the recording medium 20 that is determined by actual observations. From FIG. 27, it will be seen that the tolerance range for operation induced vibrations of the recording medium 20 is between 0 G and 2 G. The triangles in FIG. 27 indicate the data obtained by actual observations and the curve indicates an approximation line of the data obtained by actual observations. In the graph of FIG. 27, the horizontal axis indicates vibration intensity (G) and the vertical axis indicates the data transfer rate (Mbits/s) in a sequential data writing operation where data are continuously written in a continuous area. In FIG. 27, the shaded area (above about 15 G) indicates a vibration zone that is out of the tolerance range of operation induced vibrations of the nonvolatile solid-state memory 26, where the operation of the recording medium 26 is not assured.

The composite memory device 2 can hold the tolerance range for operation induced vibrations between about 0 G and 15 G as a whole by selectively driving the recording medium 20 and the nonvolatile solid-state memory 26 according to the data of the graph of FIG. 27. The processing operation to be executed for vibrations is similar to the above-described one to be executed for temperature except that no lower limit exists for vibrations and only the upper limit is referred to.

Thus, the acceleration sensor 31*b* is adapted to generate signal S3 for notifying an abnormal condition when the internal vibrations rises above about 15 G and transmits the signal S3 to the HDD control section 27. On the other hand, the acceleration sensor 31*b* generates signal S4 for notifying a normal condition when the internal vibrations return to the tolerance range for operation induced vibrations not higher than 15 G and transmits the signal S4 to the HDD control section 27.

Normally, the intensity of vibrations in a frequency band between about 10 Hz and 150 Hz is defined for operating vibrations assurance range of the recording medium 20. This frequency band is sufficiently lower than the servo band between about 500 Hz and about 1,500 Hz and hence can provide a sufficient servo gain. Error compression cannot be expected in frequency zones near and above the servo band and hence vibrations will directly be transmitted to the head section 21. Vibrations of such a high frequency may be applied to the device by sounds (vibrations of air). It is possible to fully exploit the characteristics of the composite memory device 2 and select a data area with vibrations of such a relatively high frequency.

EXAMPLE 5-3

The composite memory device 2 is adapted to observe the intensity of the impact applied to it by means of the acceleration sensor 31*b*. An element that can observe vibrations in one-dimensional directions, two-dimensional directions or three-dimensional direction may selectively be used for the acceleration sensor 31*b*. Unlike vibrations and temperature changes, impacts are not regular happenings but a discrete and transitional phenomenon. Known recording mediums having an acceleration sensor arranged in the inside include those that are provided with a mechanism for protecting the disc being driven by it that retracts the head section 21 from the top of the recording medium 20 when an acceleration above a predetermined level is detected and those that are adapted to monitor the servo lock and the PLL lock and, if either of them shows an abnormal condition, judge that the recording medium 20 is subjected to an abnormal phenomenon such as an impact (without identifying the cause) so that the head section 21 is retracted from the top of the recording medium 20. The present invention is effective for such a recording medium 20 that is already provided with a mechanism for retracting the head section 21 from the top of the recording medium 20. According to the present invention, data are written to the nonvolatile solid-state memory 26 when the head section 21 is retracted from the top of the recording medium 20 and, when the impact no longer continues, the recording medium 20 is started anew so that thereafter data will be recorded to the recording medium 20.

Figure 28:
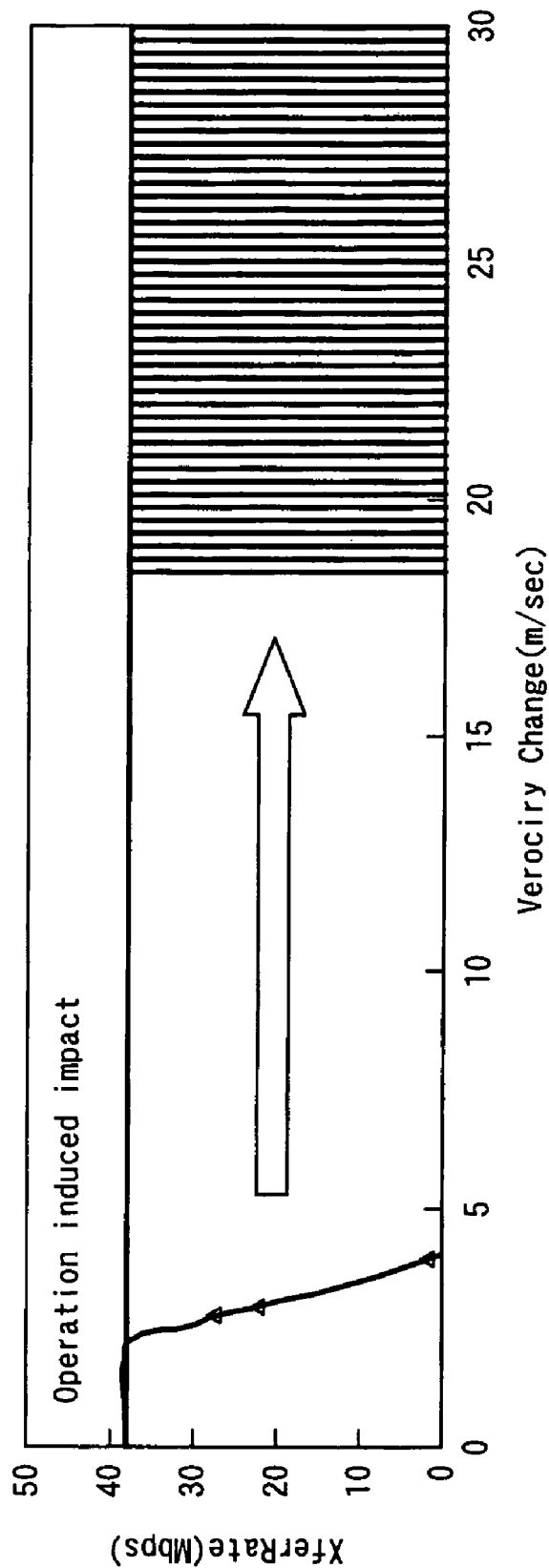
FIG. 28 is a schematic illustration of the operation impact dependency of a composite memory device.

Now, the tolerance range for impacts of the recording medium 20 will be discussed below by referring to FIG. 28. FIG. 28 is a schematic illustration of the impact dependency of the recording medium 20 that is determined by actual observations. From FIG. 28, it will be seen that the tolerance range for impacts is below 3.1 m/s in terms of velocity change (e.g., at the time of 500 G, 1 ms-half-sine). The triangles in FIG. 28 indicate the data obtained by actual observations and the curve indicates an approximation line of the data obtained by actual observations. In the graph of FIG. 28, the horizontal axis indicates the velocity change (m/s) and the vertical axis indicates the data transfer rate (Mbits/s) in a sequential data writing operation where data are continuously written in a continuous area. In FIG. 28, the shaded area (above about 18.7 m/s) indicates an impact zone that is out of the tolerance range of impacts of the nonvolatile solid-state memory 26, where the operation of the recording medium 20 is not assured.

The composite memory device 2 can hold the tolerance range for impacts below 18.7 m/s (e.g., at the time of 3,000 G, 1 ms-half-sine) as a whole by selectively driving the recording medium 20 and the nonvolatile solid-state memory 26 according to the data of the graph of FIG. 28.

While the intensity of acceleration is often expressed by G(9.8 m/s2), it may alternatively be expressed by the velocity change (m/s) that takes the duration of continuation of acceleration into consideration. The same process can be used when the velocity change is used as index. An impact at the time of 100 G, 10 msec-half-sine can be translated into velocity change as follows.

$$\text{velocity change} = 100 \times 9.8 (m/s2) \times 10e\text{-}3(\text{sec}) \times 2/3.14159 = 6.2(m/s)$$

EXAMPLE 5-4

The composite memory device 2 is adapted to observe the intensity of the impact applied to it by means of the acceleration sensor 31*b*. An element that can observe vibrations in one-dimensional directions, two-dimensional directions or three-dimensional direction may selectively be used for the acceleration sensor 31*b*. When an object is made to fall freely from a stationary state, the object is subjected to an acceleration of 1 G (9.8 m/s2). If the falling direction is not constant, it is difficult to observe the constant acceleration by means of an acceleration sensor 31*b* that can observe acceleration only in one-dimensional directions. Particularly, in the case of a free fall of an object where the object is revolving, it is necessary to observe the acceleration by way of the intensity of a three-dimensional vector. Therefore, it is strongly advisable to use an element adapted to observe acceleration in three-dimensional directions for the acceleration sensor 31*b*.

When the acceleration sensor 31*b* judges that acceleration of about 1 G (9.8 m/s2) is continuing for a predetermined time period, it generates signal S7 telling about that and supplies signal S7 it generates to the HDD control section 27. Thus, the composite memory device 2 can protect the recording medium 20 before it collides with the ground and retract the head section 21 before the latter collides with the recording medium 20.

In Step ST90, the HDD control section 27 determines if the recording medium 20 is in an active state and hence ready for a data writing operation or not typically by seeing if the number of revolutions per unit time of the disc that is contained in the recording medium 20 has reached a specified number or not. The composite memory device 2 proceeds to Step ST91 when the HDD control section 27 determines that the recording medium 20 is in an active state or starting but proceeds to Step ST92 when the disc is at halt or halting.

In Step ST91, the HDD control section 27 generates a signal (status) for halting the recording medium 20 and transmits the signal it generates to the recording medium 20. Upon receiving the signal that prompts it to halt from the HDD control section 27, the recording medium 20 halts the rotation of the disc contained in it.

In Step ST92, the HDD control section 27 retrieves a free cluster from the data area DA2 of the nonvolatile solid-state memory 26 in the combined data area DA.

In Step ST93, the HDD control section 27 determines if the data to be recorded in the free cluster detected in Step ST92 are the first data and hence the cluster is the first cluster or not. The composite memory device 2 proceeds to Step ST95 when the detected cluster is the first cluster, whereas it proceeds to Step ST94 when the detected cluster is not the first cluster.

In Step ST94, the HDD control section 27 executes a process for connecting the FAT chain to the free cluster where the data are to be written. The HDD control section 27 changes the address "0000h" of the cluster retrieved in Step ST92 on the FAT unfolded in the memory 29 to the address of the cluster where the data are to be written and updates the FAT chain.

On the other hand, in Step ST95, the HDD control section 27 makes the free cluster where the data are to be written "assigned". The HDD control section 27 writes information that indicates an "assigned" status to the address of the free cluster where the data are to be written on the FAT unfolded in the memory 29.

In Step ST96, the HDD control section 27 writes the data in the data area DA2 that corresponds to the free cluster detected in Step ST98. Thereafter, the composite memory device 2 proceeds to Step ST103.

In Step ST97, the HDD control section 27 generates a signal (status) for starting the recording medium 20 and transmits the signal it generates to the recording medium 20. Upon receiving the signal that prompts it to start from the HDD control section 27, the recording medium 20 starts rotating the disc contained in it and brings it into a state (an active state) where data can be recorded in it.

In Step ST98, the HDD control section 27 retrieves a free cluster from the data area DA2 of the nonvolatile solid-state memory 26. Because the recording medium 20 is not in an active state yet, the HDD control section 27 retrieves a free cluster from the data area DA2 of the nonvolatile solid-state memory 26 in the combined data area DA.

In Step ST99, the HDD control section 27 determines if the data to be recorded in the free cluster detected in Step ST98 are the first data and hence the cluster is the first cluster or not. The composite memory device 2 proceeds to Step ST101 when the detected cluster is the first cluster, whereas it proceeds to Step ST100 when the detected cluster is not the first cluster.

In Step ST100, the HDD control section 27 executes a process for connecting the FAT chain to the free cluster where the data are to be written. The HDD control section 27 changes the address "0000h" of the cluster retrieved in Step ST98 on the FAT unfolded in the memory 29 to the address of the cluster where the data are to be written and updates the FAT chain.

On the other hand, in Step ST101, the HDD control section 27 makes the free cluster where the data are to be written "assigned". The HDD control section 27 writes information that indicates an "assigned" status to the address of the free cluster where the data are to be written on the FAT unfolded in the memory 29.

In Step ST102, the HDD control section 27 writes the data in the data area DA2 that corresponds to the free cluster detected in Step ST98.

In Step ST103, the HDD control section 27 determines if the data written in the combined data area DA in Step ST89, Step ST96 and Step ST102 are the data of the last cluster and hence the last data for constituting a file or not. The composite memory device 2 proceeds to Step ST104 when the cluster is the last cluster, whereas it proceeds to Step ST105 when the cluster is not the last cluster.

In Step ST104, the HDD control section 27 executes a process for concluding the FAT chain at the EOF of data. The HDD control section 27 changes the address that corresponds to the last cluster in the FAT unfolded in the memory 29 to the information that corresponds to the EOF and updates the FAT chain.

In Step ST105, the HDD control section 27 checks if there is a free area in the data area DA2 of the nonvolatile solid-state memory 26 in the combined data area DA or not. More specifically, the HDD control section 27 checks if there is a free area in the data area DA2 by referring to the FAT unfolded in the memory 29. The composite memory device 2 proceeds to Step ST106 when there is not any free area in the data area DA2, whereas it returns to Step ST80 when there is a free area in the data area DA2.

In Step ST106, the HDD control section 27 generates a signal (status) telling that there is no free area in the data area DA2 and transmits the signal it generates to the host appliance 4. Thereafter, the composite memory device 2 returns to Step ST80. The HDD control section 27 determines if the data remaining in the data area DA2 have reached a predetermined quantity or not and generates a status when the data have already reached a predetermined quantity.

EXAMPLE 6

Move Process when Related Data are Recorded Over Data area DA1 and Data Area DA2

Figure 29:
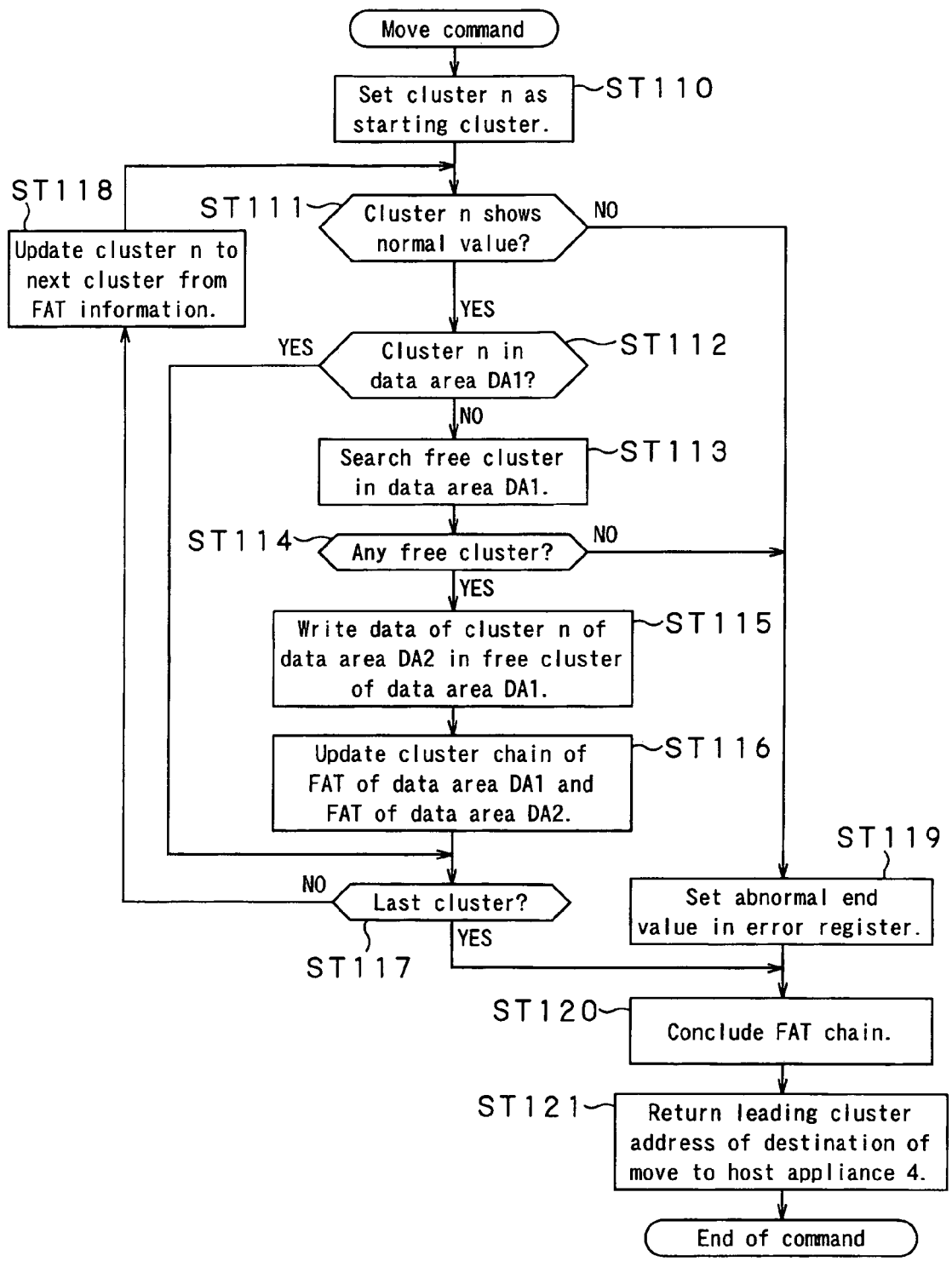
FIG. 29 is a flowchart of the process of moving the data recorded in a nonvolatile solid-state memory to a recording medium when related data are recorded over both the data area of the recording medium and that of the nonvolatile solid-state memory.
Figure 30:
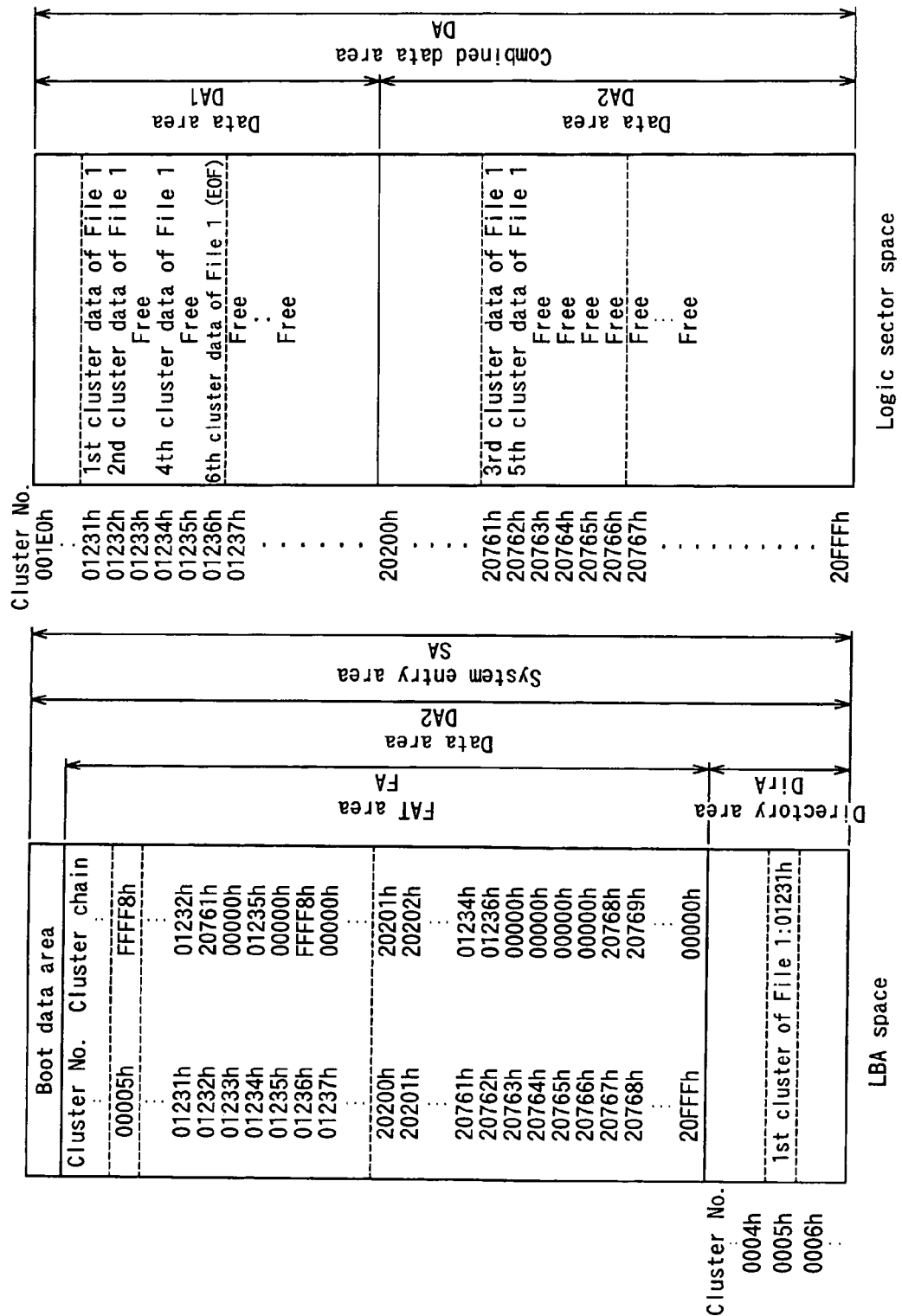
FIG. 30 is a schematic illustration of the condition of a file before a process of moving the data in a nonvolatile solid-state memory to a recording medium when related data are recorded over both the data area of the recording medium and that of the nonvolatile solid-state memory.

The sequence of the process that is executed to move data from the data area DA2 to the data area DA1 in a case where a temperature change or an impact takes place or vibrations occur while video signals are being recorded in the data area DA1 so that data are saved from the data area DA1 to the data area DA2 (see example 5) and the data of File 1 are recorded over the data area DA1 and the data area DA2 will be described below by referring to the flowchart of FIG. 29. More specifically, it is assumed here that the data of the third cluster of File 1 that are saved to "20761h" of the data area DA2 are moved to "01233h" and the data of the fifth cluster of File 1 that are saved to "20762h" of the data area DA2 are moved to "01235h" by using the LBA (logical block address) space and the logic sector space as shown in FIG. 30.

The host appliance 4 issues a command to the composite memory device 2, asking to notify it of the leading cluster address of File 1. In response to the command issued from the host appliance 4, the composite memory device 2 transmits the leading cluster address "01231h" of File 1 from the directory area DirA. Then, the host appliance 4 issues a command for moving the data of File 1 recorded in the data area DA2 to the data area DA1 on the basis of the leading cluster address it receives provided that the data of File 1 are recorded over the data area DA1 and the data area DA2.

In Step ST110, the composite memory device 2 sets the leading cluster address of the file to be moved in the register as argument of the command issued from the host appliance 4.

Then, in Step ST111, the composite memory device 2 determines if the set cluster address shows a normal value or not. Upon receiving the command, the composite memory device 2 reads out the cluster chain of the leading cluster address of File 1 to be moved from the FAT area FA and stores it in the memory 29. Then, it determines if the set cluster address shows a normal value or not by referring to the cluster chain. The composite memory device 2 proceeds to Step ST112 when the set cluster address shows a normal value, whereas it proceeds to Step ST119 when the set cluster address shows a value other than a normal value.

In Step ST112, the composite memory device 2 determines if the cluster address set in Step ST110 belongs to the data area DA1 "001E0h-201FFh" or not. The composite memory device 2 proceeds to Step ST117 when the cluster address belongs to the data area DA1. On the other hand, the composite memory device 2 proceeds to Step ST113 when the cluster address does not belong to the data area DA1 and hence belongs to the data area DA2.

In Step ST113, the composite memory device 2 retrieves a free cluster from the cluster region "001E0h-201FFh" of the data area DA1.

In Step ST114, the composite memory device 2 determines if any free cluster is detected as a result of the retrieval operation in Step ST113 or not. The composite memory device 2 proceeds to Step ST115 when it is determined that a free cluster is detected, whereas it proceeds to Step ST119 when it is determined that no cluster is detected. It is assumed in the following that the cluster "01233h" is retrieved as free cluster.

In Step ST115, the composite memory device 2 reads out the corresponding data from the data area DA2 on the basis of the cluster address set in Step ST110 or Step ST118 and writes the data it reads out to the free cluster detected in Step ST114. It is assumed in the following that "20761h" is set in Step ST118, which will be described hereinafter. Then, therefore, the composite memory device 2 reads out the third cluster data of File 1 and moves them to "01233h" on the basis of "20761h".

In Step ST116, the composite memory device 2 updates the cluster chain stored in the memory 29 and rewrites the FAT information. For example, it may write identification information indicating the free cluster in the cluster chain that corresponds to the origin of the move "20761h" and identification information indicating an assigned status in the cluster chain that corresponds to the destination of the move "012331h".

In Step ST117, the composite memory device 2 determines if the data moved in Step ST115 are those that correspond to the last cluster address or not by referring to the cluster chain stored in the memory 29. The composite memory device 2 proceeds to Step ST118 when they are not the data that corresponds to the last cluster address, whereas it proceeds to Step ST120 when they are the data that corresponds to the last cluster address.

In Step ST118, the composite memory device 2 retrieves the next cluster address by referring to the cluster chain stored in the memory 29.

On the other hand, in Step ST119, the composite memory device 2 sets an abnormal end value in the error register.

In Step ST120, the composite memory device 2 concludes the FAT chain. In this example, however, this step is not executed because EOF is already written to "01236h".

In Step ST121, the composite memory device 2 notifies the host appliance 4 of the leading cluster address of File 1 after the move. The leading cluster address remains to be "01231h" in this example. The operation of moving the data of the fifth cluster of File 1 that are saved to "20762h" is also performed in a similar manner, following the above-described steps.

Figure 31:
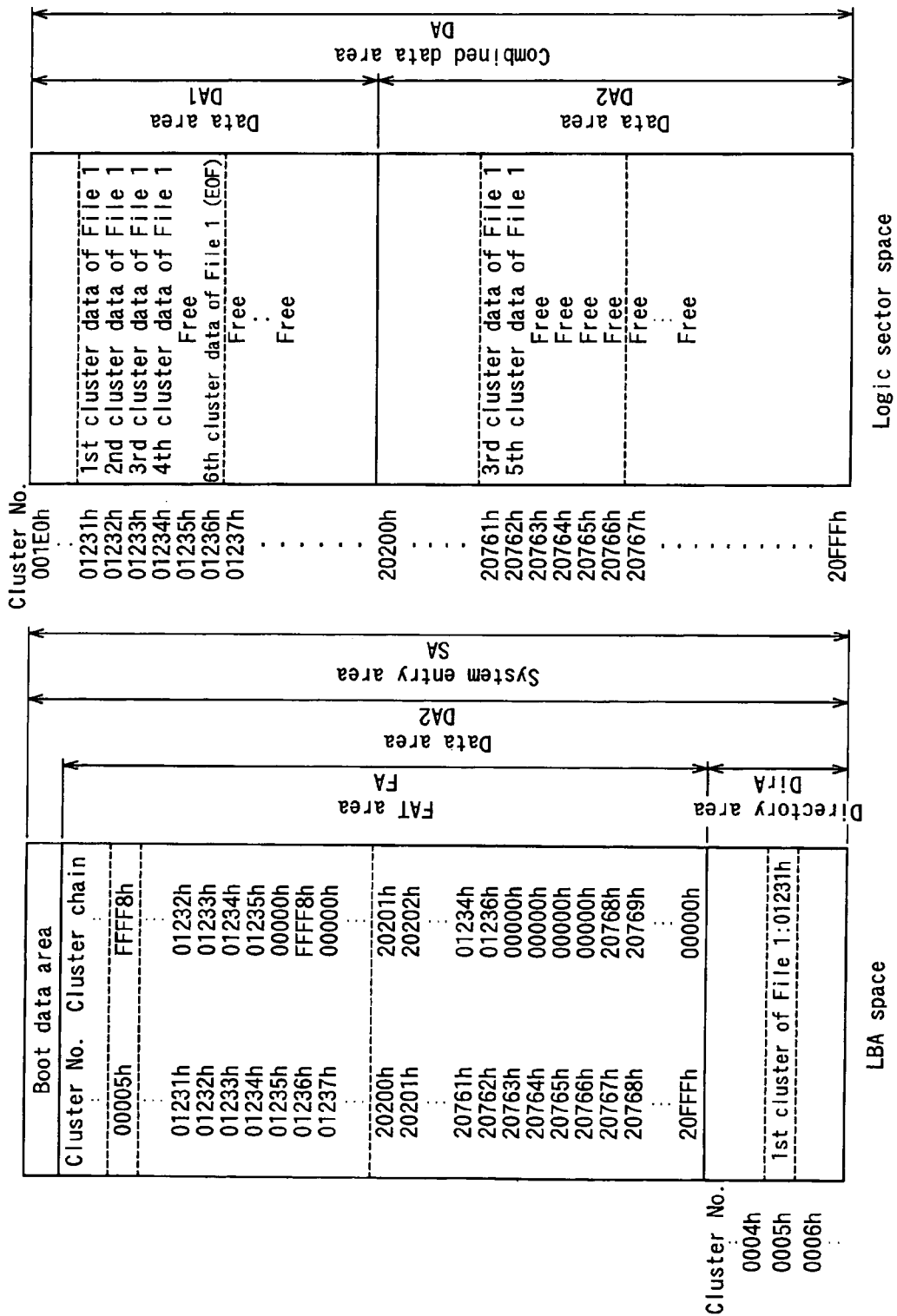
FIG. 31 is a schematic illustration of the condition of a file during a process of moving the data in a nonvolatile solid-state memory to a recording medium when related data are recorded over both the data area of the recording medium and that of the nonvolatile solid-state memory.
Figure 32:
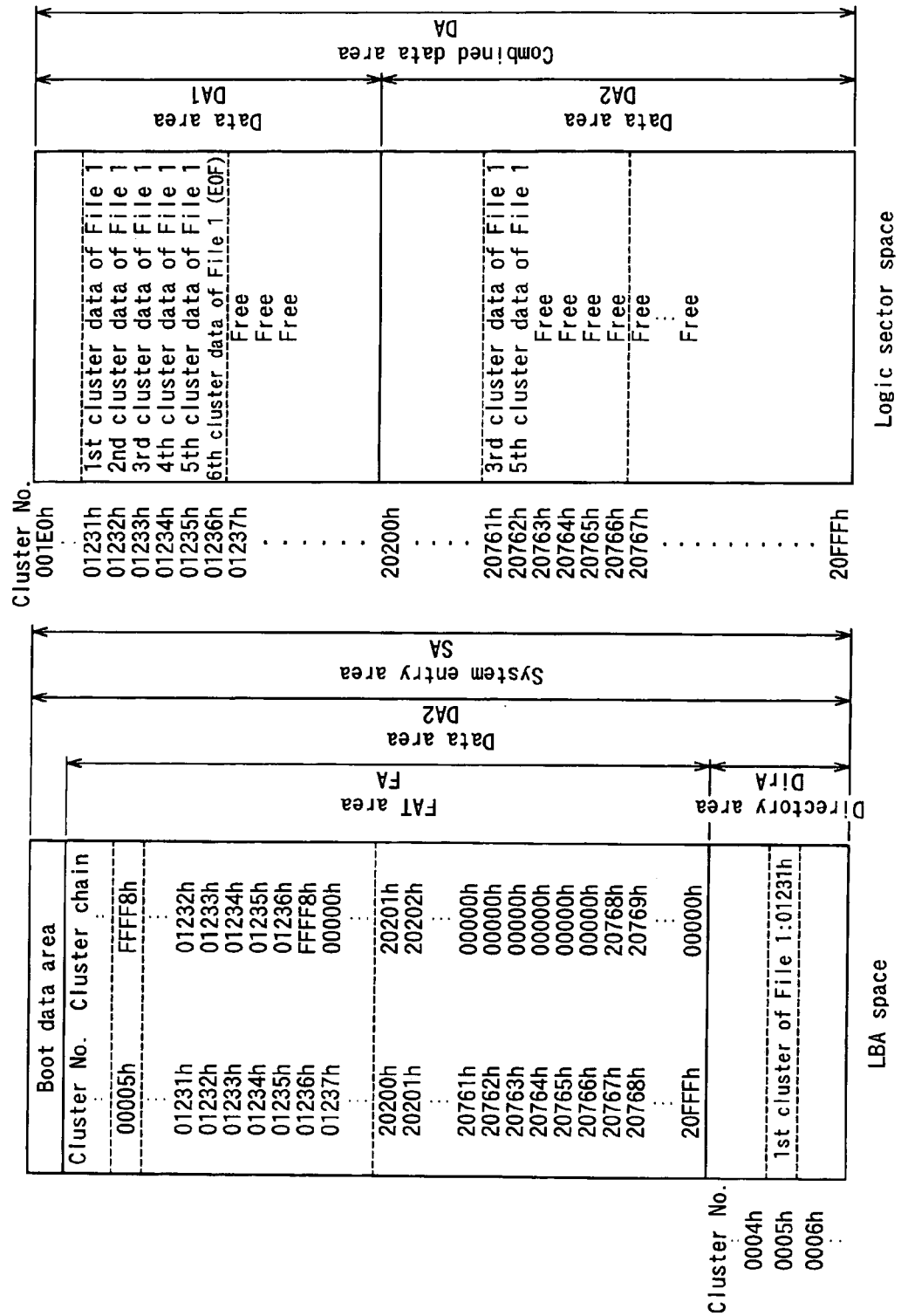
FIG. 32 is a schematic illustration of the condition of a file after a process of moving the data in a nonvolatile solid-state memory to a recording medium when related data are recorded over both the data area of the recording medium and that of the nonvolatile solid-state memory.

FIG. 30 illustrates the status of the file during the move process and FIG. 31 illustrates the status of the file during the copy process, whereas FIG. 32 illustrates the status of the file after the move process.

The composite memory device 2 can secure a free area in the data area DA2 by executing the above-described process and writing identification information that indicates the free status in the original FAT chain as shown in FIG. 32.

EXAMPLE 7

Move Process when Related Data are Recorded Over Data Area DA1 and Data Area DA2

Figure 33:
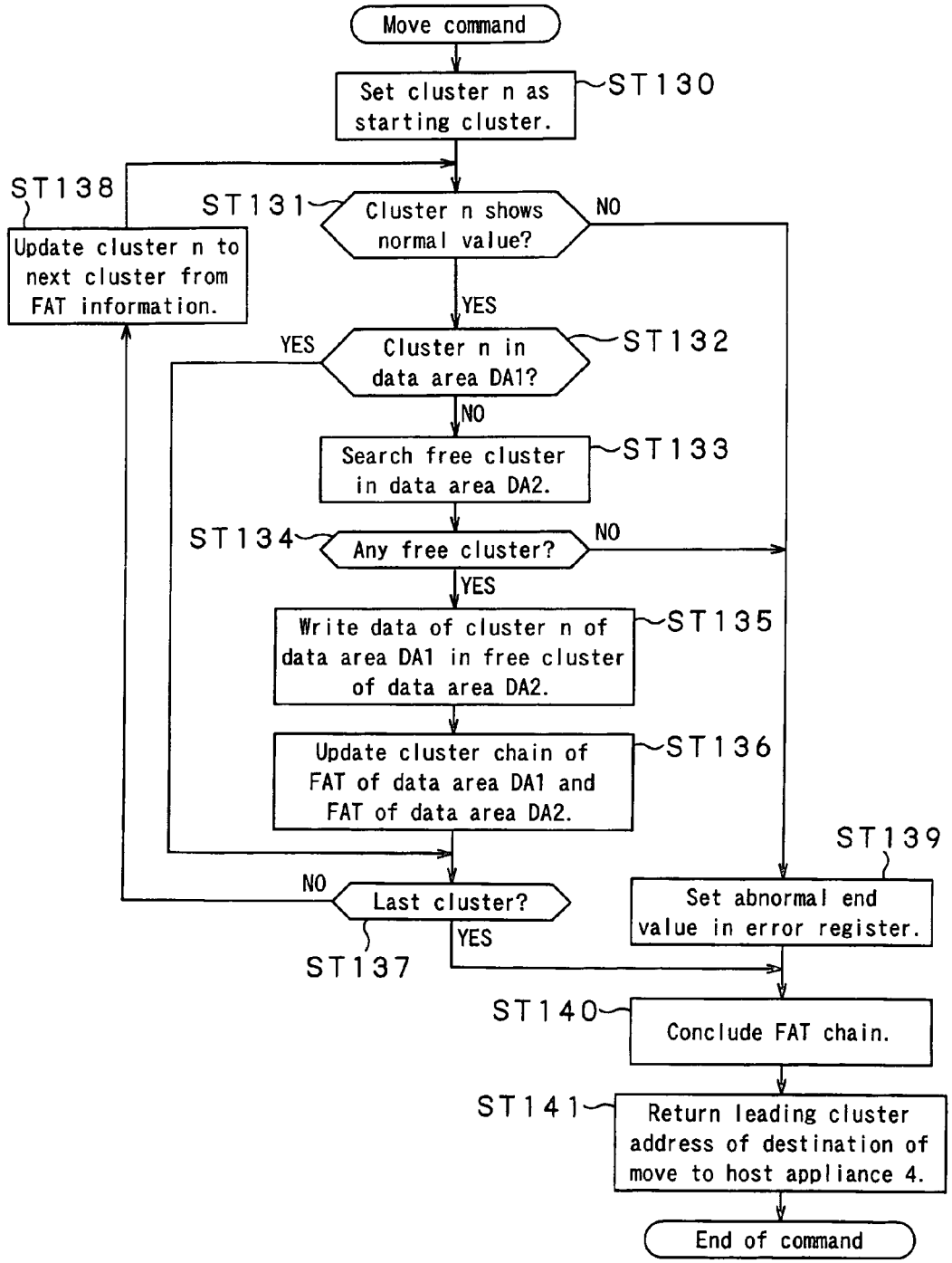
FIG. 33 is a flowchart of the process of moving data recorded in a recording medium to a nonvolatile solid-state memory when related data are recorded over both the data area of the recording medium and that of the nonvolatile solid-state memory.

The sequence of the process that is executed to move data from the data area DA1 to the data area DA2 in a case where a temperature change or an impact takes place or vibrations occur while video signals are being recorded in the data area DA1 so that data are saved from the data area DA1 to the data area DA2 (see example 5) and the data of File 1 are recorded over the data area DA1 and the data area DA2 will be described below by referring to the flowchart of FIG. 33.

The host appliance 4 issues a command to the composite memory device 2, asking to notify it of the leading cluster address of File 1. In response to the command issued from the host appliance 4, the composite memory device 2 transmits the leading cluster address of File 1 from the directory area DirA. Then, the host appliance 4 issues a command for moving the data of File 1 recorded in the data area DA1 to the data area DA2 on the basis of the leading cluster address it receives provided that the data of File 1 are recorded over the data area DA1 and the data area DA2.

In Step ST130, the composite memory device 2 sets the leading cluster address of the file to be moved in the register as argument of the command issued from the host appliance 4.

Then, in Step ST131, the composite memory device 2 determines if the set cluster address shows a normal value or not. Upon receiving the command, the composite memory device 2 reads out the cluster chain of the leading cluster address of File 1 to be moved from the FAT area FA and stores it in the memory 29. Then, it determines if the set cluster address shows a normal value or not by referring to the cluster chain. The composite memory device 2 proceeds to Step ST132 when the set cluster address shows a normal value, whereas it proceeds to Step ST139 when the set cluster address shows a value other than a normal value.

In Step ST132, the composite memory device 2 determines if the cluster address set in Step ST130 belongs to the data area DA1 "001E0h-201FFh" or not. The composite memory device 2 proceeds to Step ST133 when the cluster address belongs to the data area DA1. On the other hand, the composite memory device 2 proceeds to Step ST137 when the cluster address does not belong to the data area DA1 and hence belongs to the data area DA2.

In Step ST133, the composite memory device 2 retrieves a free cluster from the cluster region "20200h-20FFFh" of the data area DA2.

In Step ST134, the composite memory device 2 determines if any free cluster is detected as a result of the retrieval operation in Step ST133 or not. The composite memory device 2 proceeds to Step ST135 when it is determined that a free cluster is detected, whereas it proceeds to Step ST139 when it is determined that no cluster is detected.

In Step ST135, the composite memory device 2 reads out the corresponding data from the data area DA1 on the basis of the cluster address set in Step ST130 or Step ST138 and writes the data it reads out to the free cluster detected in Step ST134.

In Step ST136, the composite memory device 2 updates the cluster chain stored in the memory 29 and rewrites the FAT information.

In Step ST137, the composite memory device 2 determines if the data moved in Step ST135 are those that correspond to the last cluster address or not by referring to the cluster chain stored in the memory 29. The composite memory device 2 proceeds to Step ST138 when they are not the data that corresponds to the last cluster address, whereas it proceeds to Step ST140 when they are the data that corresponds to the last cluster address.

In Step ST138, the composite memory device 2 retrieves the next cluster address by referring to the cluster chain stored in the memory 29.

On the other hand, in Step ST139, the composite memory device 2 sets an abnormal end value in the error register.

In Step ST140, the composite memory device 2 concludes the FAT chain.

In Step ST141, the composite memory device 2 notifies the host appliance 4 of the leading cluster address of File 1 after the move.

EXAMPLE 8

The sequence of the process that is executed automatically to move data from the data area DA2 to the data area DA1 in a case where a temperature change or an impact takes place or vibrations occur while video signals are being recorded in the data area DA1 so that data are saved from the data area DA1 to the data area DA2 (see example 5) and the data of File 1 are recorded over the data area DA1 and the data area DA2 but the host appliance 4 does not access the composite memory device 2 for a predetermined time period will be described below.

In this example, as shown in FIG. 34, a step of updating the temporarily saved cluster table (ST150) is inserted after Step ST89 of the flowchart of FIG. 21, which is referred to in example 5, and a step of updating the temporarily saved cluster table (ST151) is inserted after Step ST96 of the flowchart of FIG. 21, while a step of updating the temporarily saved cluster table (ST152) is inserted after Step ST102 of the flowchart of FIG. 21.

The process of preparing a temporarily saved cluster table will be described below. When the composite memory device 2 is subjected to vibrations or an impact while video signals are being recorded to data area DA1 and the recording medium 20 falls into a state where its operation is stopped and data can no longer be written to the recording medium 20 for a predetermined time period, the composite memory device 2 temporarily switches the area for recording data from data area DA1 to data area DA2 for a predetermined time period during which the spindle is restarted so that data can be written to the recording medium 20 once again.

When the area for recording data is temporarily switched to the data area DA2 as pointed out above, the HDD control section 27 prepares a temporarily saved cluster table that contains cluster chain information (the cluster number of the data area DA1 immediately preceding the one where the abnormal write condition occurs, the cluster number of the data area DA1 where the abnormal write condition occurs and the cluster number of the data area DA2 that operates as replacement) after completing the data saving operation and stores it in the memory 29. If, for example, there arises three saved clusters, a temporarily saved cluster table as shown in FIG. 35A will be prepared.

In this example, as shown in FIG. 34, Steps ST153 through ST157 are inserted after Step ST103 or Step ST104 of the flowchart of FIG. 21, which is referred to in example 5.

In Step ST153, the HDD control section 27 determines if there is a data to be written next or not. The composite memory device 2 proceeds to Step ST105 when there is a data to be written next, whereas it proceeds to Step ST154 when there is not any data to be written next.

In Step ST154, the HDD control section 27 determines if the temporarily saved cluster table is automatically updated or not when the host appliance 4 does not access the composite memory device 2 for a predetermined time period. More specifically, the HDD control section 27 accesses the memory 29 and checks if the temporarily saved cluster table is updated in Step ST150, Step ST151 or Step ST152 or not. The composite memory device 2 proceeds to Step ST155 when the temporarily saved cluster table is updated, whereas it returns to Step ST153 when the temporarily saved cluster table is not updated.

In Step ST155, the HDD control section 27 moves the data temporarily saved in the data area DA2 to the data area DA1 by referring to the temporarily saved cluster table. Then, the HDD control section 27 writes the data of the temporarily saved cluster to the buffer memory 25 according to the replacement cluster information in the data area DA2. Thereafter, the HDD control section 27 writes the data in the cluster where they are to be preserved (write suspended cluster).

In Step ST156, the HDD control section 27 updates the cluster chain in the data area DA1 and the cluster chain in the data area DA2 according to the cluster chain information.

Figure 36:
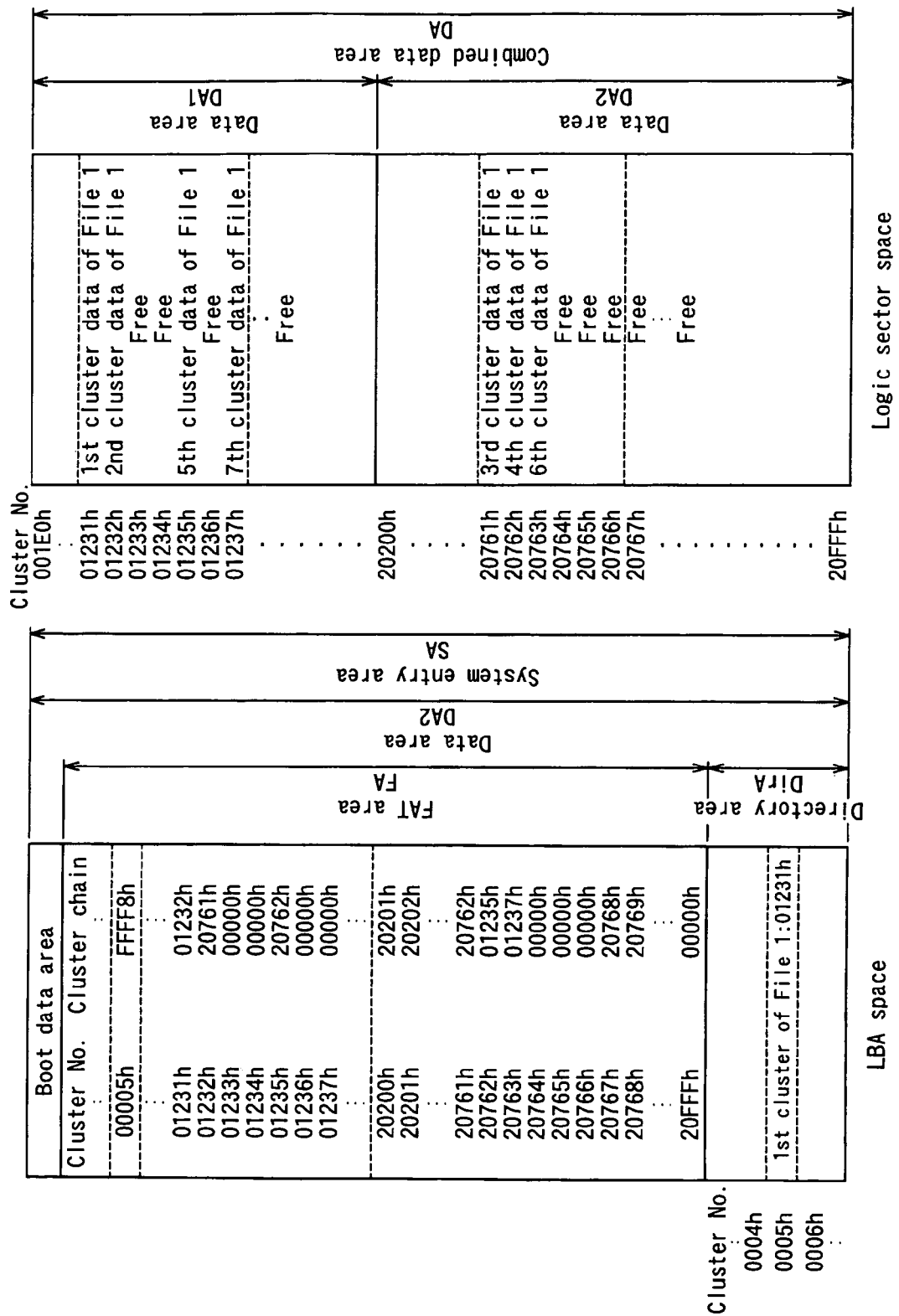
FIG. 36 is a schematic illustration of the condition of a file when related data are recorded over both the data area of the recording medium and that of the nonvolatile solid-state memory.
Figure 37:
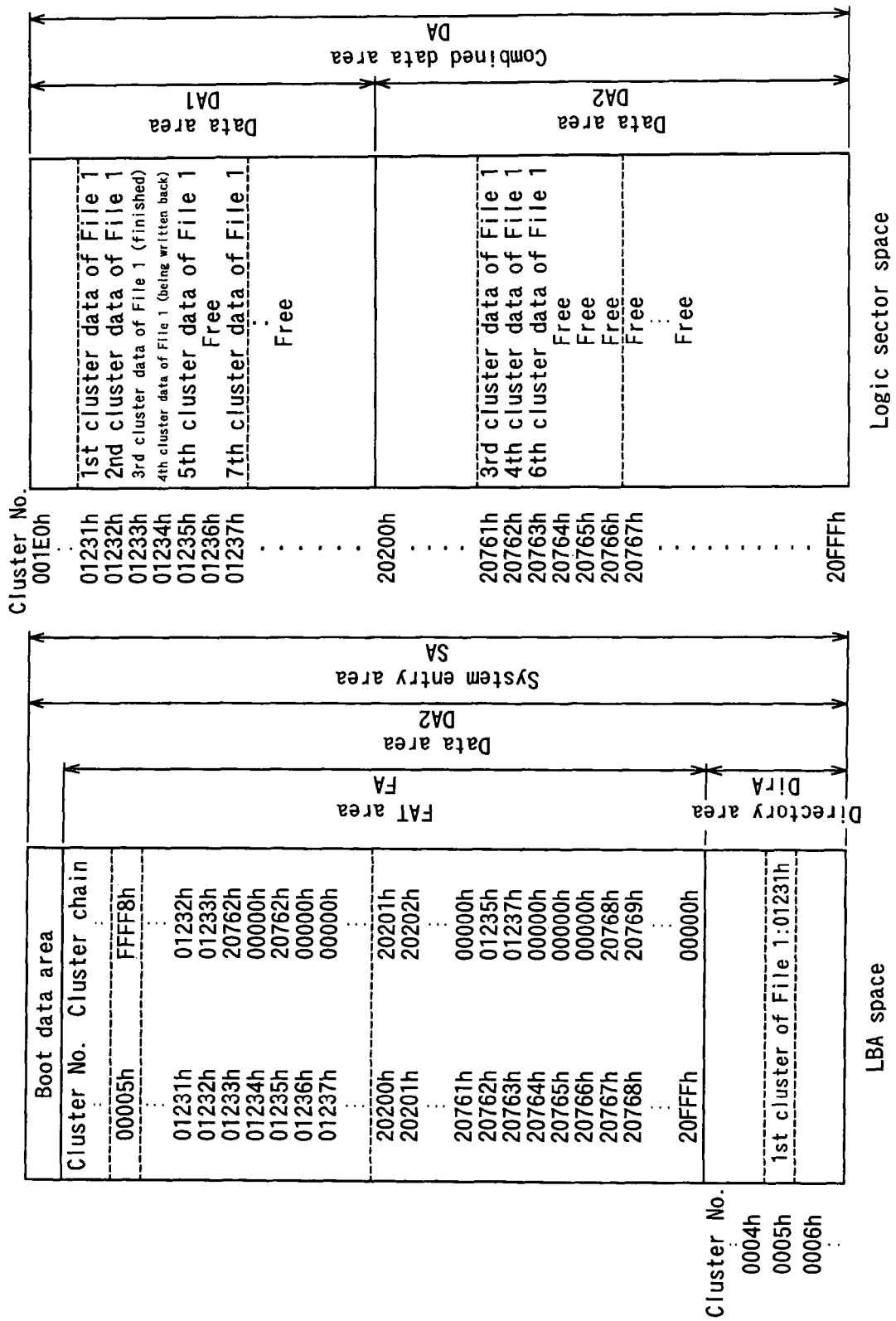
FIG. 37 is a schematic illustration of the condition of a file during a (repairing) process where the data recorded in the data area of a nonvolatile solid-state memory are automatically being moved to a recording medium when related data are recorded over both the data area of the recording medium and that of the nonvolatile solid-state memory.
Figure 38:
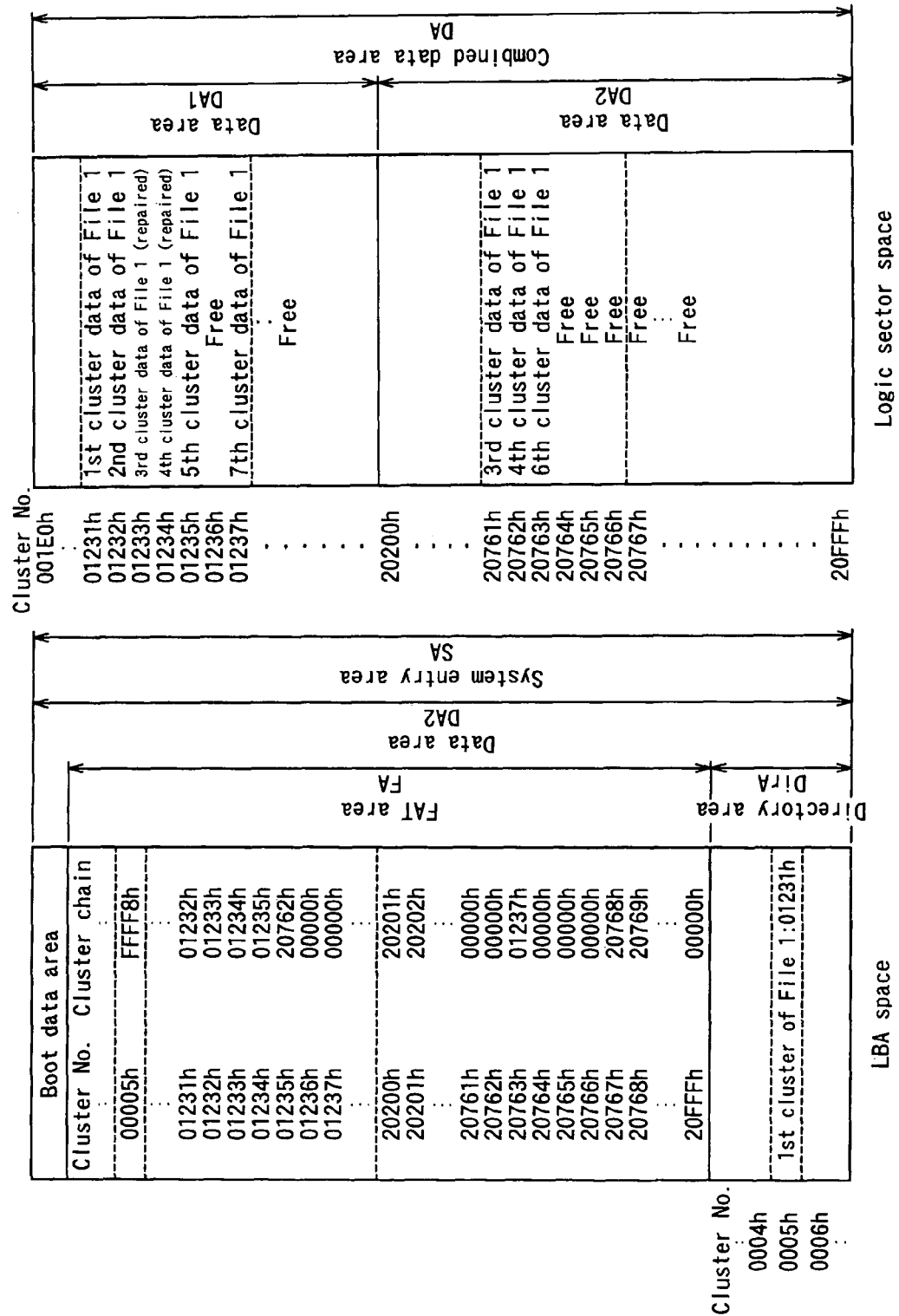
FIG. 38 is a schematic illustration of the condition of a file after the completion of a process of automatically moving the data recorded in the data area of a nonvolatile solid-state memory to a recording medium and repairing part of the data when related data are recorded over both the data area of the recording medium and that of the nonvolatile solid-state memory.

After completion of returning the data temporarily saved in the data area DA2, the HDD control section 27 deletes the data of the completed operation from the temporarily saved cluster table in Step ST157. It repeats the processing operations of Step ST153 through Step ST157 until the saved data are completely deleted from the temporarily saved cluster table. FIG. 35B illustrates a temporarily saved cluster table when two saved clusters are returned. FIG. 36 is a schematic illustration of the condition of File 1 when related data are recorded over both the data area DA1 and the data area DA 2. FIG. 37 is a schematic illustration of the condition of File 1 during a process where the data recorded in the data area DA2 are automatically being moved to the data area DA1. FIG. 38 is a schematic illustration of the condition of File 1 after the completion of the process of automatically moving the data recorded in the data area DA 2 to the data area DA1.

As a result of the above-described process, it is possible to secure a free region in the data area DA2 of the nonvolatile solid-state memory 26 without participation of the host appliance 4.

Thus, the data access system 1 having the above-described configuration includes a host appliance 4 and a composite memory device that are connected to each other by way of an interface section 3. The composite memory device has a nonvolatile solid-state memory 26 and a recording medium 20 and is adapted to integrally combine the data area DA1 of the recording medium 20 and the data area DA2 of the nonvolatile solid-state memory 26 and manage the data areas as combined data area DA. With this arrangement, the data recorded in the data area DA2 can be moved to the data area DA1 without transferring the data between the composite memory device and the host appliance and the FAT can be reconstructed according to the configuration of the moved cluster, while the data recorded in the data area DA1 can be moved to the data area DA2 without transferring the data between the composite memory device and the host appliance and the FAT can be reconstructed according to the configuration of the moved cluster. Additionally, the data recorded in the data area DA2 can be copied to the data area DA1 without transferring the data between the composite memory device and a host appliance and the FAT can be reconstructed according to the configuration of the copied cluster, while the data recorded in the data area DA1 can be copied to the data area DA2 without transferring the data between composite memory device and the host appliance and the FAT can be reconstructed according to the configuration of the copied cluster.

Additionally, according to the invention, a composite memory device 2 according to the invention is equipped with a sensor 31 for detecting impacts and vibrations and adapted to appropriately switch data from the data area DA2 to the data area DA1 or vice versa. Then, related data can be recorded over the data area DA1 and the data area DA2. However, according to the invention, the data saved in the data area DA2 are automatically written back to the data area DA1 so that a free region can be automatically secured in the nonvolatile solid-state memory 26 (data area DA2). Thus, it is possible to build a highly reliably hybrid storage system by using a nonvolatile solid-state memory 26 having a recording capacity much smaller than the recording capacity of the recording medium 20 (data area DA1).

Figure 39:
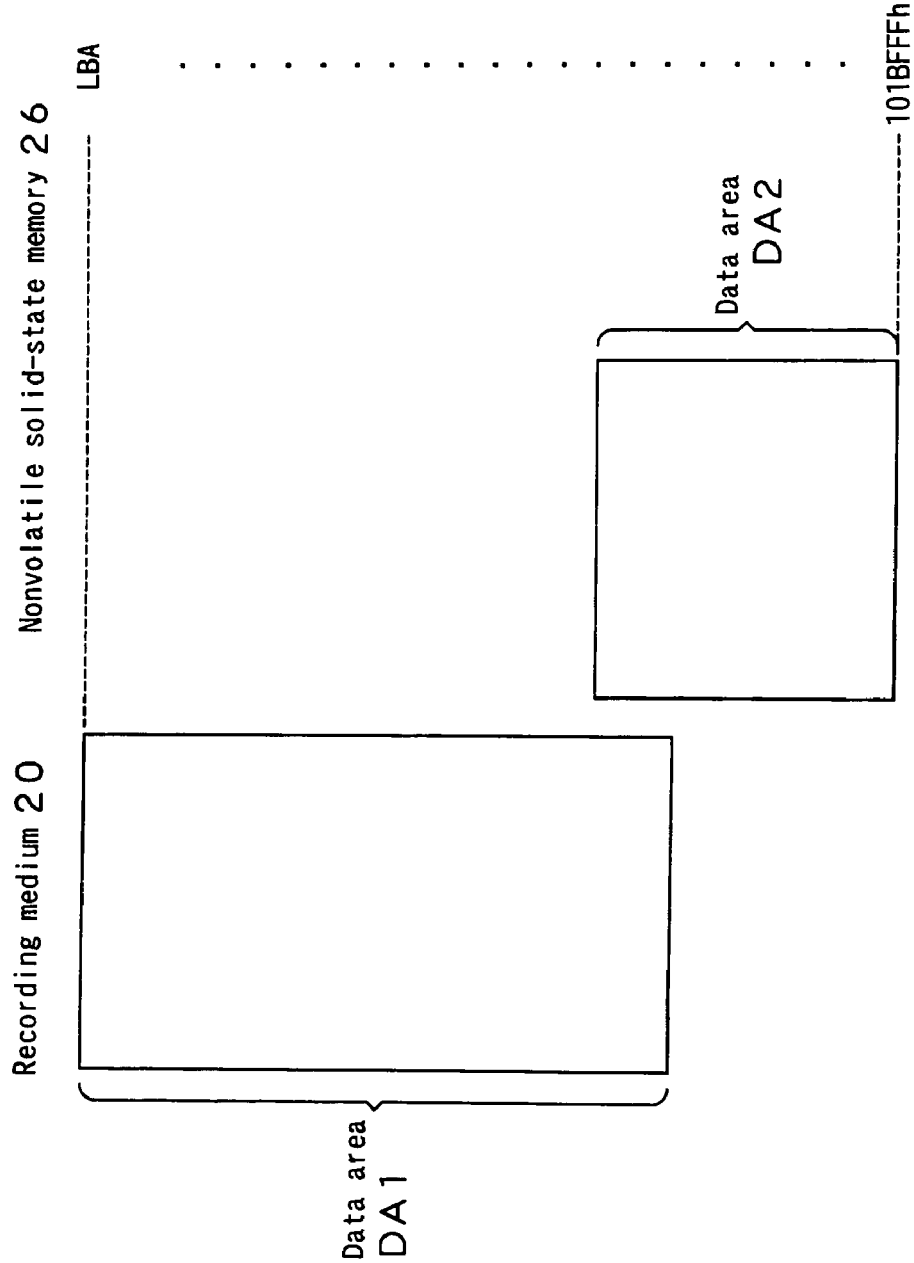
FIG. 39 is a schematic illustration of region X formed by part of the region of a recording medium and part of the region of a nonvolatile storage medium with an LBA applied in duplicate.

Still additionally, as pointed out above, the host appliance 4 accesses the composite memory device 2 not by using a logic sector number (LSN) but by using a logic block address (LBA). According to the invention, a region X where LBAs are assigned in duplicate may be formed in part of the memory region of the recording medium 20 and in part of the memory region of the nonvolatile solid-state memory 26 as shown in the conceptual illustration of FIG. 39. In FIG. 39, same LBAs are assigned to part of the data area DA2 and part of the data area DA1 to form region X. However, duplicated assignment of LBAs according to the invention is by no means limited to FIG. 39.

Then, for example, the HDD control section 27 operates to records the information and/or the important data that are written to the FAT region and the directory region in the region X.

Thus, when the region X is formed in a composite memory device 2 according to the invention, the FAT is recorded in both the recording medium 20 and the nonvolatile solid-state memory 26 so that it is possible to build a firm and reliable system.

While it is assumed that the recording medium 20 is a hard disc in the above description of the embodiment, it may alternatively be an optical disc such as a CD or a DVD so long as it is a randomly accessible memory medium for the purpose of the present invention.

While a FAT file system is used as file system for managing the combined data area DA of the composite memory device 2 in the above description, any other file system adapted to manage data as files may alternatively be used for the purpose of the present invention.

For the purpose of the present invention, the above-described series of processes may be executed by means of software. When a series of processes is executed by means of software, the program of the software is installed typically in a general purpose computer. The program may be recorded in a removable medium such as CD-ROM and delivered to the user. Alternatively, it may be downloaded to the user computer by way of a network.

It should be understood by those skilled in the art that various modifications, combinations, sub-combinations and alterations may occur depending on design requirements and other factors insofar as they are within the scope of the appended claims or the equivalents thereof.

The invention claimed is:

1. A composite memory device, comprising:
   a recording medium having a first data area with first addresses assigned to respective clusters of a predetermined size;
   a nonvolatile solid-state storage medium having a second data area with second addresses assigned to respective clusters of a predetermined size, a common directory area storing both the leading cluster addresses of the respective clusters of the first data area of the recording medium and the leading cluster addresses of the respective clusters of the second data area of the nonvolatile solid-state storage medium, and a common table storing both the addresses of cluster chains of the first data area of the recording medium that start from the leading cluster addresses of the respective clusters of the first data area of the recording medium and the addresses of cluster chains of the second data area of the nonvolatile solid-state storage medium that start from the leading cluster addresses of the respective clusters of the second data area of the nonvolatile solid-state storage medium;
   an interface section to be connected to a host appliance;
   retrieval means for retrieving the address of the leading cluster of data to be moved or copied by referring to the common directory area storing the leading cluster address of the data written to the first data area or the second data area at the time of moving or copying data written to the first data area to the second data area or data written to the second data area to the first data area;

first notification means for notifying the host appliance of the address of the leading cluster retrieved by the retrieval means by way of the interface section;

first reception means for receiving a first signal ordering to move or copy data from the first data area to the second data area or a second signal ordering to move or copy data from the second data area to the first data area in response to the notification by the first notification means;

read means for reading, from the common table, the addresses of the cluster chain of the data to be moved or copied starting from the leading cluster address of the data written to the first data area or the second data area, wherein the read means is operable to read the addresses of the cluster chain starting from the address of the leading cluster of the data to be moved or copied from the common table upon receiving the first signal or the second signal by the first reception means;

free area detection means for detecting a free area from the second data area at the time of moving or copying data from the first data area to the second data area and from the first data area at the time of moving or copying data from the second data area to the first data area;

moving/copying means for moving or copying the data to be moved or copied to the free area detected by the free area detection means;

updating means for updating the cluster chain read from the common table by the read means so as to carry the address of the site of move or copying at the time of move or copying of data by the moving/copying means;

second notification means for notifying the host appliance of the changed address of the leading cluster by way of the interface section at the time of completion of updating the cluster chain by the updating means;

second reception means for receiving a signal ordering to change the address of the leading cluster from the host appliance by way of the interface section in response to the notification by the second notification means;

changing means for changing the address of the leading cluster in the common directory area to the address of the leading cluster of the data moved or copied by the moving/copying means at the time of receiving a signal ordering to change the address of the leading cluster by the second reception means from the host appliance;

environmental condition detection means for detecting an abnormal environmental condition during the moving or copying of the data; and means for executing a process in response to detecting an abnormal environmental condition during the moving or copying of the data, the process including deleting the updated cluster chain, detecting a free area from the second data area, moving or copying the data to be moved or copied to the free area, and reconnecting the cluster chain.

2. The device according to claim 1, wherein the condition environmental detection means includes at least one of an acceleration sensor and a falling speed sensor.

3. The device according to claim 1, further comprising control means for detecting whether the recording medium is in an active state or a not ready state.

4. A data processing method, comprising:

providing a composite memory device having a recording medium having a first data area with first addresses assigned to respective clusters of a predetermined size, and a nonvolatile solid-state storage medium having a second data area with second addresses assigned to respective clusters of a predetermined size and an interface section to be connected to a host appliance, a common directory area storing both the leading cluster addresses of the respective clusters of the first data area of the recording medium and the leading cluster addresses of the respective clusters of the second data area of the nonvolatile solid-state storage medium, and a common table storing both the addresses of cluster chains of the first data area of the recording medium that start from the leading cluster addresses of the respective clusters of the first data area of the recording medium and the addresses of cluster chains of the second data area of the nonvolatile solid-state storage medium that start from the leading cluster addresses of the respective clusters of the second data area of the nonvolatile solid-state storage medium;

a retrieval step of retrieving the address of the leading cluster of data to be moved or copied by referring to the common directory area storing the leading cluster address of the data written to the first data area or the second data area at the time of moving or copying data written to the first data area to the second data area or data written to the second data area to the first data area;

a first notification step of notifying the host appliance of the address of the leading cluster retrieved in the retrieval step by way of the interface section;

a first reception step of receiving a first signal ordering to move or copy data from the first data area to the second data area or a second signal ordering to move or copy data from the second data area to the first data area in response to the notification in the first notification step;

a read step for reading, from the common table, the addresses of the cluster chain of the data to be moved or copied starting from the leading cluster address of the data written to the first data area or the second data area, wherein the read step comprises reading the addresses of the cluster chain starting from the address of the leading cluster of the data to be moved or copied from the common table upon receiving the first signal or the second signal in the first reception step;

a free area detection step of detecting a free area from the second data area at the time of moving or copying data from the first data area to the second data area and from the first data area at the time of moving or copying data from the second data area to the first data area;

a moving/copying step of moving or copying the data to be moved or copied to the free area detected in the free area detection step;

an updating step of updating the cluster chain read from the common table in the read step so as to carry the address of the site of move or copying at the time of move or copying of data in the moving/copying step;

a second notification step of notifying the host appliance of the changed address of the leading cluster by way of the interface section at the time of completion of updating the cluster chain in the updating step;

a second reception step of receiving a signal ordering to change the address of the leading cluster from the host appliance by way of the interface section in response to the notification in the second notification step;

a changing step of changing the address of the leading cluster in the common directory area to the address of the leading cluster of the data moved or copied in the moving/copying step at the time of receiving a signal ordering to change the address of the leading cluster in the second reception step from the host appliance;
a environmental condition detection step of detecting an abnormal environmental condition during the moving or copying of the data; and
a step of executing a process in response to detecting an abnormal condition during the moving or copying of the data, the process including deleting the updated cluster chain, detecting a free area from the second data area, moving or copying the data to be moved or copied to the free area, and reconnecting the cluster chain.

5. A non-transitory computer-readable information recording medium storing a computer-readable data processing program, the program being operable to perform a method for causing a computer to execute a data processing operation for a composite memory device having a recording medium having a first data area with first addresses assigned to respective clusters of a predetermined size, and a solid-state nonvolatile storage medium having a second data area with second addresses assigned to respective clusters of a predetermined size and an interface section to be connected to a host appliance, the program method comprising: a retrieval step of retrieving the address of the leading cluster of data to be moved or copied by referring to a common directory area storing the leading cluster address of the data written to the first data area or the second data area at the time of moving or copying data written to the first data area to the second data area or data written to the second data area to the first data area, the common directory area storing both the leading cluster addresses of the respective clusters of the first data area of the recording medium and the leading cluster addresses of the respective clusters of the second data area of the nonvolatile solid-state storage medium; a first notification step of notifying the host appliance of the address of the leading cluster retrieved in the retrieval step by way of the interface section; a first reception step of receiving a first signal ordering to move or copy data from the first data area to the second data area or a second signal ordering to move or copy data from the second data area to the first data area in response to the notification in the first notification step; a read step for reading, from a common table, the addresses of the cluster chain of the data to be moved or copied starting from the leading cluster address of the data written to the first data area or the second data area, the common table storing both the addresses of cluster chains of the first data area of the recording medium that start from the leading cluster addresses of the respective clusters of the first data area of the recording medium and the addresses of cluster chains of the second data area of the nonvolatile solid-state storage medium that start from the leading cluster addresses of the respective clusters of the second data area of the nonvolatile solid-state storage medium, wherein the read step comprises reading the addresses of the cluster chain starting from the address of the leading cluster of the data to be moved or copied from the common table upon receiving the first signal or the second signal in the first reception step; a free area detection step of detecting a free area from the second data area at the time of moving or copying data from the first data area to the second data area and from the first data area at the time of moving or copying data from the second data area to the first data area; a moving/copying step of moving or copying the data to be moved or copied to the free area detected in the free area detection step; an updating step of updating the cluster chain read from the common table in the read step so as to carry the address of the site of move or copying at the time of move or copying of data in the moving/copying step; a second notification step of notifying the host appliance of the changed address of the leading cluster by way of the interface section at the time of completion of updating the cluster chain in the updating step; a second reception step of receiving a signal ordering to change the address of the leading cluster from the host appliance by way of the interface section in response to the notification in the second notification step; a changing step of changing the address of the leading cluster in the common directory area to the address of the leading cluster of the data moved or copied in the moving/copying step at the time of receiving a signal ordering to change the address of the leading cluster in the second reception step from the host appliance; a environmental condition detection step of detecting an abnormal environmental condition during the moving or copying of the data; and a step of executing a process in response to detecting an abnormal condition during the moving or copying of the data, the process including deleting the updated cluster chain, detecting a free area from the second data area, moving or copying the data to be moved or copied to the free area, and reconnecting the cluster chain.

6. A composite memory device, comprising:
a recording medium having a first data area with first addresses assigned to respective clusters of a predetermined size;
a solid-state nonvolatile storage medium having a second data area with second addresses assigned to respective clusters of a predetermined size, a common directory area storing both the leading cluster addresses of the respective clusters of the first data area of the recording medium and the leading cluster addresses of the respective clusters of the second data area of the nonvolatile solid-state storage medium, and a common table storing both the addresses of cluster chains of the first data area of the recording medium that start from the leading cluster addresses of the respective clusters of the first data area of the recording medium and the addresses of cluster chains of the second data area of the nonvolatile solid-state storage medium that start from the leading cluster addresses of the respective clusters of the second data area of the nonvolatile solid-state storage medium;
an interface section to be connected to a host appliance;
a retrieval section that retrieves the address of the leading cluster of data to be moved or copied by referring to the common directory area storing the leading cluster address of the data written to the first data area or the second data area at the time of moving or copying data written to the first data area to the second data area or data written to the second data area to the first data area;
a first notification section that notifies the host appliance of the address of the leading cluster retrieved by the retrieval section by way of the interface section;
a first reception section that receives a first signal ordering to move or copy data from the first data area to the second data area or a second signal ordering to move or copy data from the second data area to the first data area in response to the notification by the first notification section;
a read section that reads, from the common table, the addresses of the cluster chain of the data to be moved or copied starting from the leading cluster address of the data written to the first data area or the second data area, wherein the read section is operable to read the addresses of the cluster chain starting from the address of the leading cluster of the data to be moved or copied from the common table upon receiving the first signal or the second signal by the first reception means;

a free area detection section that detects a free area from the second data area at the time of moving or copying data from the first data area to the second data area and from the first data area at the time of moving or copying data from the second data area to the first data area;

a moving/copying section that moves or copies the data to be moved or copied to the free area detected by the free area detection means;

an updating section that updates the addresses of the cluster chain read from the common table by the read means so as to carry the address of the site of move or copying at the time of move or copying of data by the moving/copying means;

a second notification section that notifies the host appliance of the changed address of the leading cluster by way of the interface section at the time of completion of updating the cluster chain by the updating means;

a second reception section that receives a signal ordering to change the address of the leading cluster from the host appliance by way of the interface section in response to the notification by the second notification means;

a changing section that changes the address of the leading cluster in the common directory area to the address of the leading cluster of the data moved or copied by the moving/copying means at the time of receiving a signal ordering to change the address of the leading cluster by the second reception means from the host appliance;

an environmental sensor for detecting an abnormal environmental condition during the moving or copying of the data; and a section for executing a process in response to detecting an abnormal condition during the moving or copying of the data, the process including deleting the updated cluster chain, detecting a free area from the second data area, moving or copying the data to be moved or copied to the free area, and reconnecting the cluster chain.

7. The device according to claim 1, further comprising control means for halting the moving or copying data if an abnormal condition is detected.

8. The data processing method of claim 4, further comprising a halting step of halting the moving or copying data if an abnormal condition is detected.

9. The non-transitory computer-readable information recording medium storing a computer-readable data processing program according to claim 5, wherein the method further comprises a halting step of halting the moving or copying data if an abnormal condition is detected.

10. The composite memory device of claim 6, further comprising a control unit for halting the moving or copying data if an abnormal condition is detected.

11. The method according to claim 4,
wherein the environmental condition detection step includes at least one of detecting acceleration and detecting speed.

12. The method according to claim 4, further comprising a step of detecting whether the recording medium is in an active state or a not ready state.

13. The non-transitory computer-readable information recording medium storing a computer-readable data processing program according to claim 5, wherein the environmental condition detection step includes at least one of detecting acceleration and detecting speed.

14. The non-transitory computer-readable information recording medium storing a computer-readable data processing program according to claim 5, wherein the method further comprises a step of detecting whether the recording medium is in an active state or a not ready state.

15. The device according to claim 14,
wherein the environmental sensor includes at least one of an acceleration sensor and a falling speed sensor.

16. The device according to claim 6, further comprising a control section for determining whether the recording medium is in an active state or a not ready state.

* * * * *